(12) United States Patent
Taylor et al.

US007759812B2

(10) Patent No.: US 7,759,812 B2
(45) Date of Patent: Jul. 20, 2010

(54) INTEGRATED POWER PLANT THAT UTILIZES RENEWABLE AND ALTERNATIVE ENERGY SOURCES

(75) Inventors: Ronald J. Taylor, Cheyenne, WY (US); Scott J. Taylor, Cheyenne, WY (US)

(73) Assignee: Terra Moya Aqua, Inc., Cheyenne, WY (US)

( * ) Notice: Subject to any disclaimer, the term of this patent is extended or adjusted under 35 U.S.C. 154(b) by 415 days.

(21) Appl. No.: 11/747,857

(22) Filed: May 11, 2007

(65) Prior Publication Data

US 2007/0267874 A1 Nov. 22, 2007

Related U.S. Application Data

(63) Continuation-in-part of application No. 11/685,365, filed on Mar. 13, 2007, now Pat. No. 7,347,660, which is a continuation of application No. 11/284,774, filed on Nov. 21, 2005, now Pat. No. 7,189,050, which is a continuation-in-part of application No. 10/831,515, filed on Apr. 23, 2004, now Pat. No. 6,966,747.

(60) Provisional application No. 60/467,773, filed on Apr. 30, 2003, provisional application No. 60/639,448, filed on Dec. 23, 2004.

(51) Int. Cl.
*F03D 9/00* (2006.01)
*H02P 9/04* (2006.01)
(52) U.S. Cl. .......................... 290/44; 290/55
(58) Field of Classification Search .................. 290/44, 290/55; 60/398, 698, 641.12, 659; 416/132 B; 415/191, 4.4, 126, 907, 2.1, 4.1, 4.5, 1; 210/153, 210/170, 262, 172.1, 252
See application file for complete search history.

(56) References Cited

U.S. PATENT DOCUMENTS 201,400 A 3/1878 Everhart (Continued)

OTHER PUBLICATIONS

Ben Kroposki and Carolyn Elam, Renewable Electrolysis Integrated System Development and Testing, National Renewable Energy Laboratory, May 25, 2004.

(Continued)

*Primary Examiner*—Julio Gonzalez
(74) *Attorney, Agent, or Firm*—William W. Cochran; Cochran Freund & Young LLC

(57) ABSTRACT

A large pressure differential is created between the leading face of the rotor blade and the trailing face of the rotor blade during the power cycle which creates a large amount of force that rotates the rotor blade about the central shaft. In some embodiments, gaps are provided between the inside edge of the rotor blade and a stationary shaft which vents wind collected by the rotor blade during certain portions of the rotation cycle. The vented wind increases the pressure on the trailing face of the rotor blades during the return cycle to further assist in the efficiency of this system. In addition, an integrated power plant is disclosed that provides a source of renewable energy in the form of a cross-flow wind turbine that includes solar cells mounted on south facing surfaces of the stators. The stators can be used to store liquids and fuels generated by the renewable energy sources. Electrical power generated by the renewable energy sources can be used in a desalination process to generate pure drinking water that can be stored in the stator devices. Electrical energy generated by the renewable energy sources can be used in an electrolysis device to generate oxygen and hydrogen gases. The oxygen and hydrogen gases can be used to operate a fuel cell to generate electricity when needed. The hydrogen can also be used to operate a hydrogen engine that runs an auxiliary generator to supply auxiliary electrical power when needed. A biofuel engine, propane gas engine, natural gas engine, or diesel engine can also be used to run the auxiliary generator. Mechanical power from the wind turbine can be used to run mechanical pumps to pump water to a reservoir at a higher elevation, which can then be used to run a water turbine that is connected to the auxiliary generator to generate electrical power when needed.

25 Claims, 53 Drawing Sheets

U.S. PATENT DOCUMENTS

| | | |
|---|---|---|
| 2,812,823 A | 11/1957 | Oviedo |
| 2,896,882 A | 7/1959 | Nelson |
| 3,876,925 A | 4/1975 | Stoeckert |
| 3,895,882 A | 7/1975 | Moyer |
| 3,922,012 A | 11/1975 | Herz |
| 3,938,907 A | 2/1976 | Magoveny et al. |
| 3,986,786 A | 10/1976 | Sellman |
| 4,031,405 A | 6/1977 | Asperger |
| 4,037,983 A | 7/1977 | Poeta |
| 4,057,270 A | 11/1977 | Lebost |
| 4,070,131 A | 1/1978 | Yen |
| 4,079,264 A | 3/1978 | Cohen |
| 4,084,918 A | 4/1978 | Pavlecka |
| 4,088,419 A | 5/1978 | Hope et al. |
| 4,115,027 A | 9/1978 | Thomas |
| 4,115,028 A | 9/1978 | Hintze |
| 4,116,581 A | 9/1978 | Bolie |
| 4,119,863 A | 10/1978 | Kelly |
| 4,132,282 A | 1/1979 | Sparks |
| 4,154,556 A | 5/1979 | Webster |
| 4,156,580 A | 5/1979 | Pohl |
| 4,164,382 A | 8/1979 | Mysels |
| 4,174,923 A | 11/1979 | Williamson |
| 4,204,796 A | 5/1980 | Pack |
| 4,234,289 A | 11/1980 | Lebost |
| 4,236,866 A | 12/1980 | Zapata Martinez |
| 4,260,325 A | 4/1981 | Cymara |
| 4,270,056 A | 5/1981 | Wright |
| 4,278,896 A | 7/1981 | McFarland |
| 4,288,200 A | 9/1981 | O'Hare |
| 4,295,783 A | 10/1981 | Lebost |
| 4,309,146 A | 1/1982 | Hein et al. |
| 4,350,900 A | 9/1982 | Baughman |
| 4,365,929 A | 12/1982 | Retz |
| 4,407,833 A | 10/1983 | Swartz |
| 4,423,368 A | 12/1983 | Bussiere |
| 4,452,562 A | 6/1984 | Hsu |
| 4,457,666 A | 7/1984 | Selman, Jr. |
| 4,474,529 A | 10/1984 | Kinsey |
| 4,486,143 A | 12/1984 | McVey |
| 4,490,232 A | 12/1984 | Lapeyre |
| 4,496,848 A | 1/1985 | Binder |
| 4,551,631 A | 11/1985 | Trigilio |
| 4,575,311 A | 3/1986 | Wood |
| 4,606,697 A | 8/1986 | Appel |
| 4,717,832 A | 1/1988 | Harris |
| 4,830,570 A | 5/1989 | Benesh |
| 4,838,757 A | 6/1989 | Benesh |
| 4,843,249 A | 6/1989 | Bussiere |
| 4,890,976 A | 1/1990 | Jansson |
| 4,960,363 A | 10/1990 | Bergstein |
| 4,979,871 A | 12/1990 | Reiner |
| 5,020,967 A | 6/1991 | Gual et al. |
| 5,037,268 A | 8/1991 | Fenlon |
| 5,038,049 A | 8/1991 | Kato |
| 5,126,584 A | 6/1992 | Ouellet |
| 5,133,637 A | 7/1992 | Wadsworth |
| 5,163,813 A | 11/1992 | Schlenker |
| 5,203,672 A | 4/1993 | Wolf |
| 5,246,342 A | 9/1993 | Bergstein |
| 5,269,647 A | 12/1993 | Moser |
| 5,280,827 A | 1/1994 | Taylor |
| 5,287,004 A | 2/1994 | Finley |
| 5,313,103 A | 5/1994 | Hickey |
| 5,333,996 A | 8/1994 | Bergstein |
| 5,336,933 A | 8/1994 | Ernster |
| 5,380,149 A | 1/1995 | Valsamidis |
| 5,386,146 A | 1/1995 | Hickey |
| 5,391,926 A | 2/1995 | Staley et al. |
| 5,454,694 A | 10/1995 | O'Dell |
| 5,463,257 A | 10/1995 | Yea |
| 5,503,525 A | 4/1996 | Brown et al. |
| 5,553,996 A | 9/1996 | Farrar |
| 5,810,284 A * | 9/1998 | Hibbs et al. ................... 244/13 |
| 5,844,324 A | 12/1998 | Spriggle |
| 5,852,331 A | 12/1998 | Giorgini |
| 5,895,201 A | 4/1999 | Huovinen |
| 6,000,907 A | 12/1999 | Bic |
| 6,015,258 A | 1/2000 | Taylor |
| 6,083,382 A | 7/2000 | Bird |
| 6,100,600 A * | 8/2000 | Pflanz ......................... 290/54 |
| 6,109,863 A | 8/2000 | Milliken |
| 6,113,350 A | 9/2000 | Liu |
| 6,138,781 A | 10/2000 | Hakala |
| 6,158,953 A | 12/2000 | Lamont |
| 6,191,496 B1 | 2/2001 | Elder |
| 6,309,172 B1 | 10/2001 | Gual |
| 6,406,251 B1 | 6/2002 | Vauthier |
| 6,448,669 B1 | 9/2002 | Elder |
| 6,538,340 B2 | 3/2003 | Elder |
| 6,581,873 B2 | 6/2003 | McDermott |
| 6,962,053 B2 * | 11/2005 | Gebel et al. ................. 60/641.1 |
| 6,966,747 B2 | 11/2005 | Taylor et al. |
| 7,029,576 B2 * | 4/2006 | Siegfriedsen ............... 210/153 |
| 7,075,189 B2 * | 7/2006 | Heronemus et al. .......... 290/44 |
| 7,189,050 B2 | 3/2007 | Taylor et al. |
| 7,347,660 B2 | 3/2008 | Taylor et al. |
| 2002/0192069 A1 | 12/2002 | Newman |
| 2003/0026684 A1 | 2/2003 | Bohn |
| 2009/0115190 A1* | 5/2009 | Devine ........................ 290/44 |
| 2009/0200249 A1* | 8/2009 | Zimhoni ..................... 210/808 |

OTHER PUBLICATIONS www.avalence.com, Avalence LLC, Milford, Ct, 2007.
Hogen Hydrogen Generators for Industrial Applications flier, Distributed Energy Systems, Wallingford, CT.
www.distributed-energy.com, Distributed Energy Systems, Wallingford, CT.
www.mahler-ags.com, Mahler Advanced Gas Systems, Stuttgart, Germany.

* cited by examiner

|  | | |
|---|---|---|
| ROTOR | 25 KW | 1000 KW |
| LENGTH STATOR 102 | ÿ12' X 24' | ÿ90' X 210' |
| LENGTH STATOR 104 | 15'-5" | 115'-7 1/2" |
| LENGTH STATOR 106 | 12' | 90' |
| GAP 124 | 12' | 90' |
| GAP 126 | 16-1/2" | TBD |
| GAP 128 | 18" | TBD |
| TOTAL HEIGHT | 27-3/4" | TBD |
|  | 33' | 230' |

FIG. 1B

100
CROSS-FLOW
WIND TURBINE

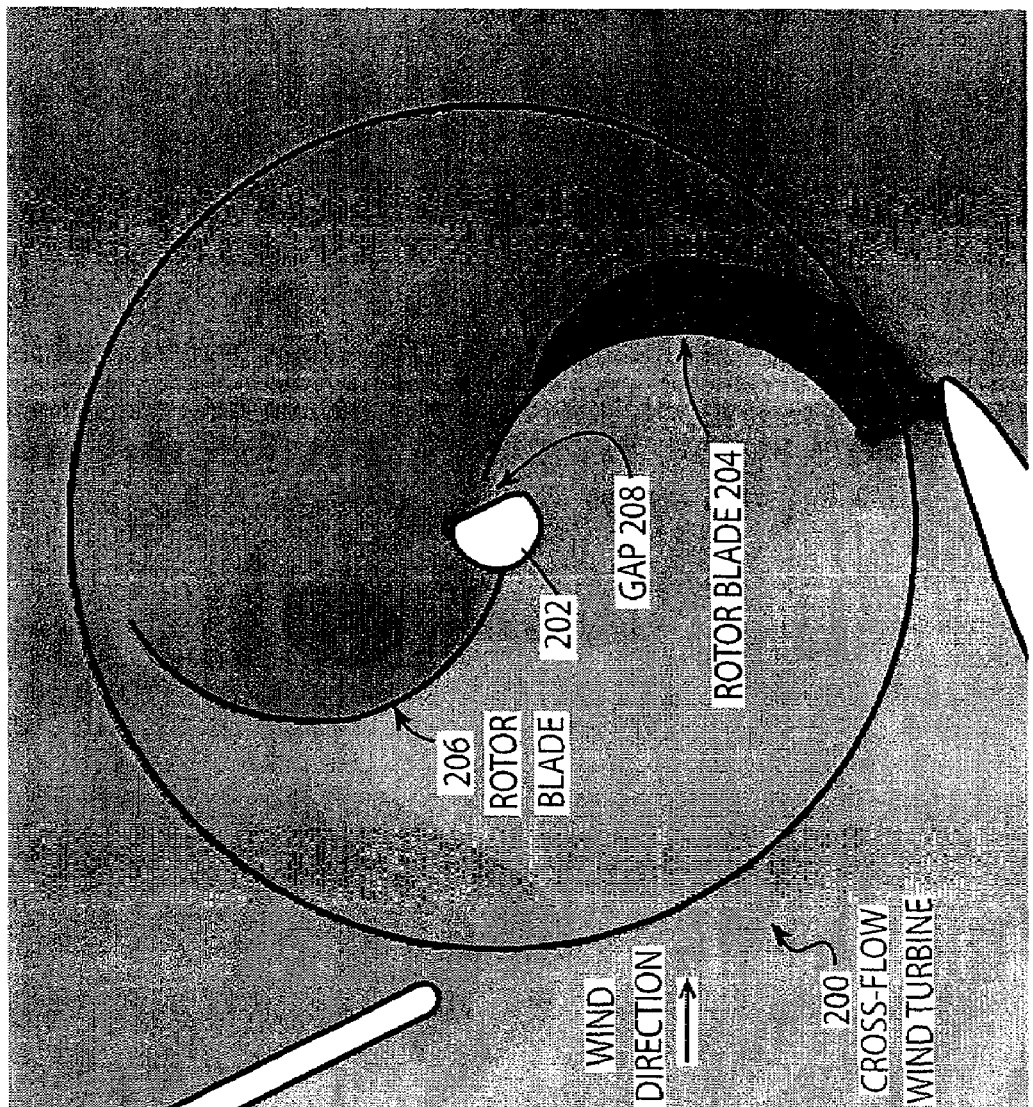
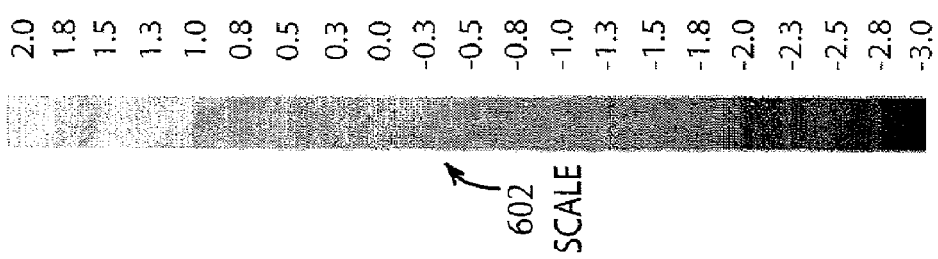
FIG. 6A

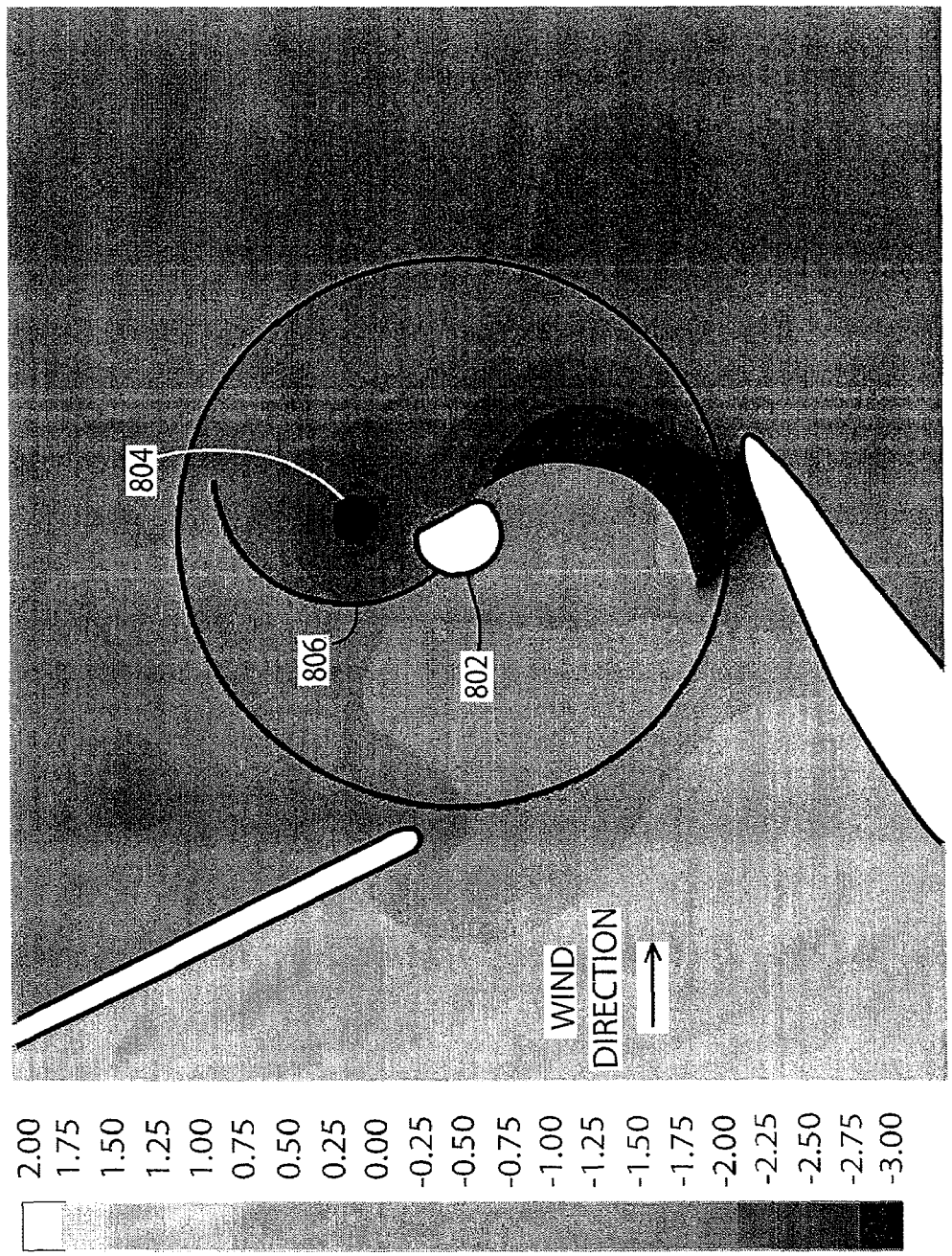

INTEGRATED POWER PLANT THAT UTILIZES RENEWABLE AND ALTERNATIVE ENERGY SOURCES

CROSS REFERENCE TO RELATED APPLICATIONS

This application is a continuation-in-part of U.S. patent application Ser. No. 11/685,365, entitled "Cross-Flow Wind Turbine," filed Mar. 13, 2007, which is a continuation of U.S. patent application Ser. No. 11,284,774, entitled "Cross-Flow Wind Turbine," filed Nov. 21, 2005, which is a continuation-in-part of U.S. patent application Ser. No. 10/831,515 entitled "Wind Turbine Having Airfoils for Blocking and Directing Wind and Rotors With or Without a Central Gap" by Ronald Taylor and Scott Taylor, filed Apr. 23, 2004, which claims the benefit of and priority to U.S. Provisional Patent Application Ser. No. 60/467,773 entitled "Wind Turbine" by Ronald Taylor and Scott Taylor, filed Apr. 30, 2003. U.S. patent application Ser. No. 11,284,774 further claims the benefit of U.S. Provisional Patent Application Ser. No. 60/639,448, filed on Dec. 23, 2004, entitled "Cross-Flow Wind Turbine." The entire contents of the above mentioned applications are hereby specifically incorporated herein by reference for all they disclose and teach.

BACKGROUND OF THE INVENTION

Renewable and alternative energy sources are playing a greater role in reducing the dependence on oil as a primary energy source. Wind energy has played a significant role in generating electrical power that is applied to the electrical grid. In addition, the use of solar energy in this same fashion has increased substantially over the past few years. The use of these and other alternative energy sources will play an increasingly important role in the future with respect to the sourcing and distributing of energy.

SUMMARY OF THE INVENTION

Embodiments of the present invention may therefore comprise a method of providing and storing energy and water using a renewable energy integrated power plant comprising: providing a cross-flow wind turbine that has an airfoil stator and that generates electrical power and mechanical power in response to wind energy; providing solar cells that are mounted on the airfoil stator that generate electrical power; using the electrical power in local electrical devices; using the electrical power to desalinate and purify water so as to provide a source of purified drinking water; and storing the purified drinking water in a tank in the airfoil stator.

The present invention may further comprise a renewable energy integrated power plant that provides electrical energy and that generates and stores purified water comprising: a cross-flow wind turbine that uses an airfoil stator and generates electrical power; solar cells mounted on the cross-flow wind turbine that generate electrical power; a desalinator that desalinates and purifies saltwater and brackish water and generates purified drinking water in response to the electrical power; and a water storage tank formed in the airfoil stator that stores the purified drinking water.

BRIEF DESCRIPTION OF THE DRAWINGS

In the drawings,

FIG. 1B provides typical dimensions of the embodiment of FIG. 1A.

FIG. 6A is an illustration of pressure gradients that are produced by the embodiment of FIG. 6A as calculated from computer simulations using computational fluid dynamics.

FIG. 8A is an illustration of pressure gradients that are produced by the embodiment of FIG. 8A as calculated from computer simulations using computational fluid dynamics.

DETAILED DESCRIPTION OF THE EMBODIMENTS

Figure 1A:
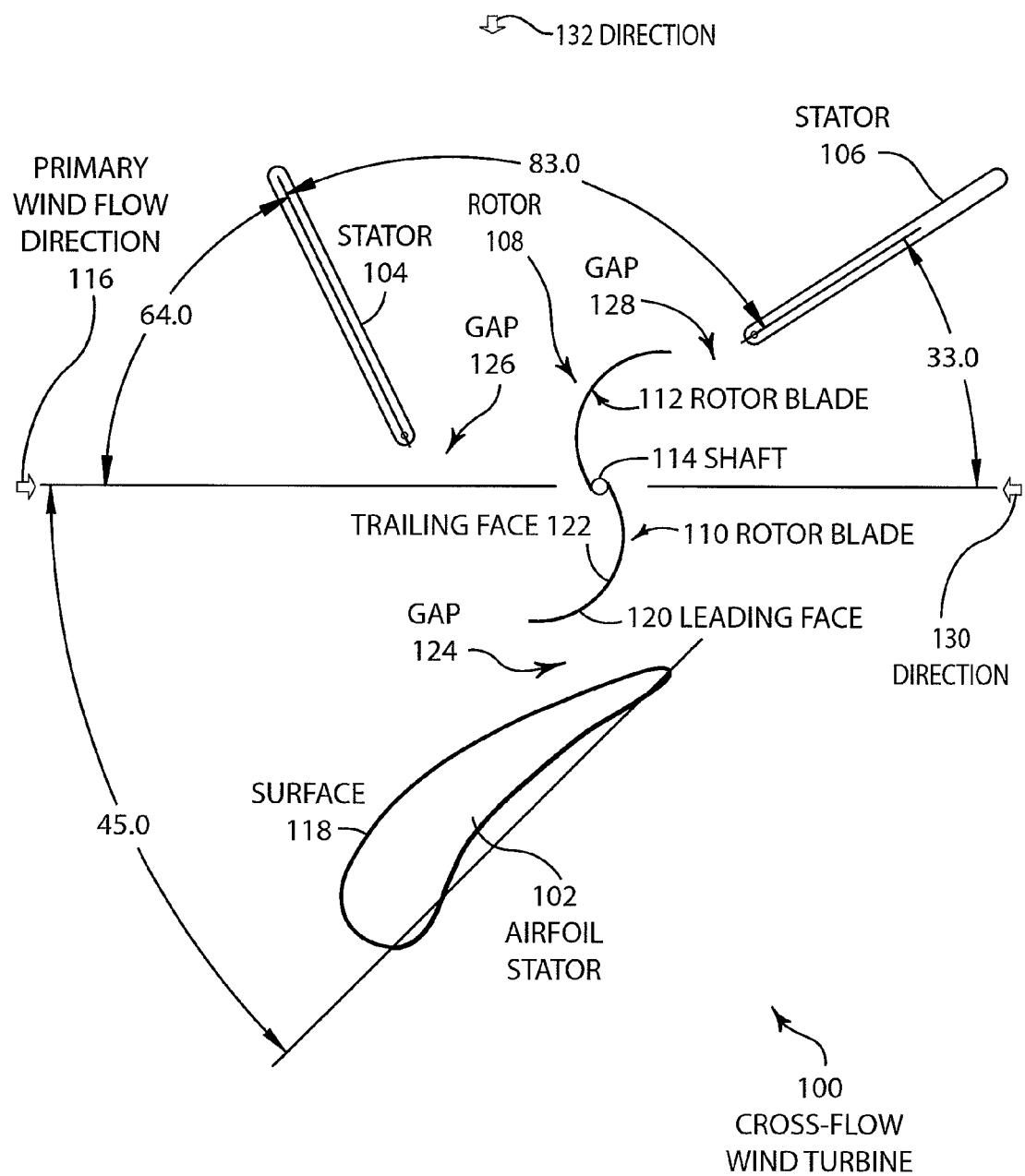
FIG. 1A is a top schematic view of one embodiment of the invention.

FIG. 1A is an illustration of one embodiment of a cross-flow wind turbine 100. The cross-flow wind turbine includes an airfoil stator 102 that is fixed, stator 104 that is fixed and stator 106 that is also fixed. The rotor 108 rotates in response to forces created by wind. Rotor 108 includes rotor blade 110, rotor blade 112 and a rotating shaft 114. The cross-flow wind turbine 100, illustrated in FIG. 1A, is designed for maximum efficiency for wind flowing in a primary direction 116 which may be aligned with the prevailing wind at a specific geographical location. However, the cross wind flow turbine 100 also produces high efficiencies for winds flowing from other directions, as described in more detail below with respect to FIG. 3.

As also shown in FIG. 1A, the angular positions of the stators are shown with respect to the primary wind flow direction 116. The cross-flow wind turbine 100 that is illustrated in FIG. 1A shows each of the elements generally in their relative proportional sizes with respect to each other. It is believed that scaling of the cross-flow wind turbine 100 will not change the relative proportional sizes of the various elements or their location with respect to each other. It is anticipated that as the cross-flow wind turbine 100 is scaled to larger sizes that Reynolds numbers and differences in flow characteristics on larger scales will result in higher efficiencies as compared to wind tunnel testing of the cross-flow wind turbine 100. Rotor blade 110 and rotor blade 112 are attached to the shaft 114 so that as the rotor blades 110, 112 are moved by the wind, shaft 114 rotates. Rotor blades 110, 112, as illustrated in FIG. 1A, have shapes that are circular arcs of 120°. These arcs can vary between approximately 120° and 135° without significantly reducing efficiency. Empirical data gathered from both wind tunnel testing and computational fluid dynamics indicate that the 120° circular arc shape of rotor blades provides the highest efficiency.

The airfoil stator 102 that is shown in FIG. 1A has a cambered profile that acts like an airplane wing so that air flowing across surface 118 of airfoil stator 102 is accelerated. The accelerated flow of air across surface 118 creates a low pressure region on the leading face 120 of rotor blade 110 which helps to pull the rotor blade 110 through its power stroke. Because the wind flowing in the primary wind flow direction 116 is pushing on the trailing face 122 of rotor blade 110, a large pressure differential exists between the trailing face 122 and the leading face 120 of rotor blade 110. This large pressure differential assists the rotor blade 110 in moving in a counterclockwise direction around the shaft 114. The pressure gradients created are disclosed in more detail in FIG. 4A. Stator 104 is positioned to block wind, flowing from the primary wind flow direction 116, from impinging upon the leading face of the rotor blades during the return cycle, which is illustrated by the position of the rotor blade 112 in FIG. 1A. Stator 104 not only blocks wind from hitting the rotor blades during the return cycle, but also redirects the wind flowing from direction 116 to impinge upon the trailing face 122 of the rotor blade 110.

Stator 106 of FIG. 1A functions to guide the air flow on the downwind side of the rotor 108 away from the cross-flow wind turbine 100. Stator 106 also provides a third leg of a tripod structure to add structural rigidity to the system. Stator 106 also can perform other valuable functions. Wind flow studies for many geographical locations have provided data that the prevailing wind flows from a predominant direction during the windy season, which may, for example, be Winter season at many geographical sites. During the opposite season (off-season), such as Summer, the wind typically comes from a substantially opposite direction. Although the wind flow in the off-season may be only a fraction of the wind flow from the primary season, it still may be advantageous to capture the off-season wind with some degree of efficiency and convert it to mechanical energy. As can be seen from FIG. 1A, stator 106 can assist in redirecting wind into rotor blade 112 when the wind is from a direction 130 that is opposite to the primary wind flow direction 116. In that regard, it may also be desirable in some embodiments to provide camber to the stator 106 so that it creates an airfoil, in a manner similar to the air flow stator 102. However, the primary purpose of the stator 106 is to provide structural rigidity and to assist the flow of wind in exiting the turbine without creating back pressure that would impede the performance of the cross-flow wind turbine 100.

Of course, to provide structural rigidity, stator 106 could be replaced with simply a structural member. Depending on the wind studies of a particular area, replacement of stator 106 with a structural member may make sense if the wind flow direction is almost exclusively from direction 116. Wind flow from direction 132 would allow stator 106 to function in a manner similar to stator 104, i.e., stator 106 would block wind from direction 132 during the return cycle of the rotor blades and redirect the wind to the trailing face of the rotor blades during the power stroke. Hence, if off-season wind comes from direction 132, as shown in FIG. 1A, stator 106 may provide advantageous properties for the cross-flow wind turbine 100.

Collected wind data from wind studies at a large majority of geographical sites have shown that a very large percentage (up to 90% or more) of the wind comes from the same quadrant as the prevailing wind direction. These studies have also shown that winds during the off-season are usually from the opposite quadrant, as indicated above. For example, if the primary wind flow direction 116 is the primary wind direction during the windy season, wind typically flows from direction 130 during the off season, at most geographical sites. However, the off-season winds carry only a fraction of the energy that is available from the winds in the primary wind flow direction in most geographical sites. Hence, the system of FIG. 1A is optimized for wind coming from the quadrant of the prevailing wind such that the primary flow direction 116 is aligned with the prevailing wind flow direction when the cross-flow wind turbine is installed at a site. As discussed in more detail with respect to FIG. 3, the system shown in FIG. 1A is an omni-directional system which has optimized efficiencies for a primary wind flow direction 116 and reduced efficiencies when the wind flows from a direction other than the primary wind flow direction 116. Again, however, the largest overall efficiency and the best return on investment comes from optimization of a system that captures wind from the prevailing wind direction for most geographical sites.

Figure 2:
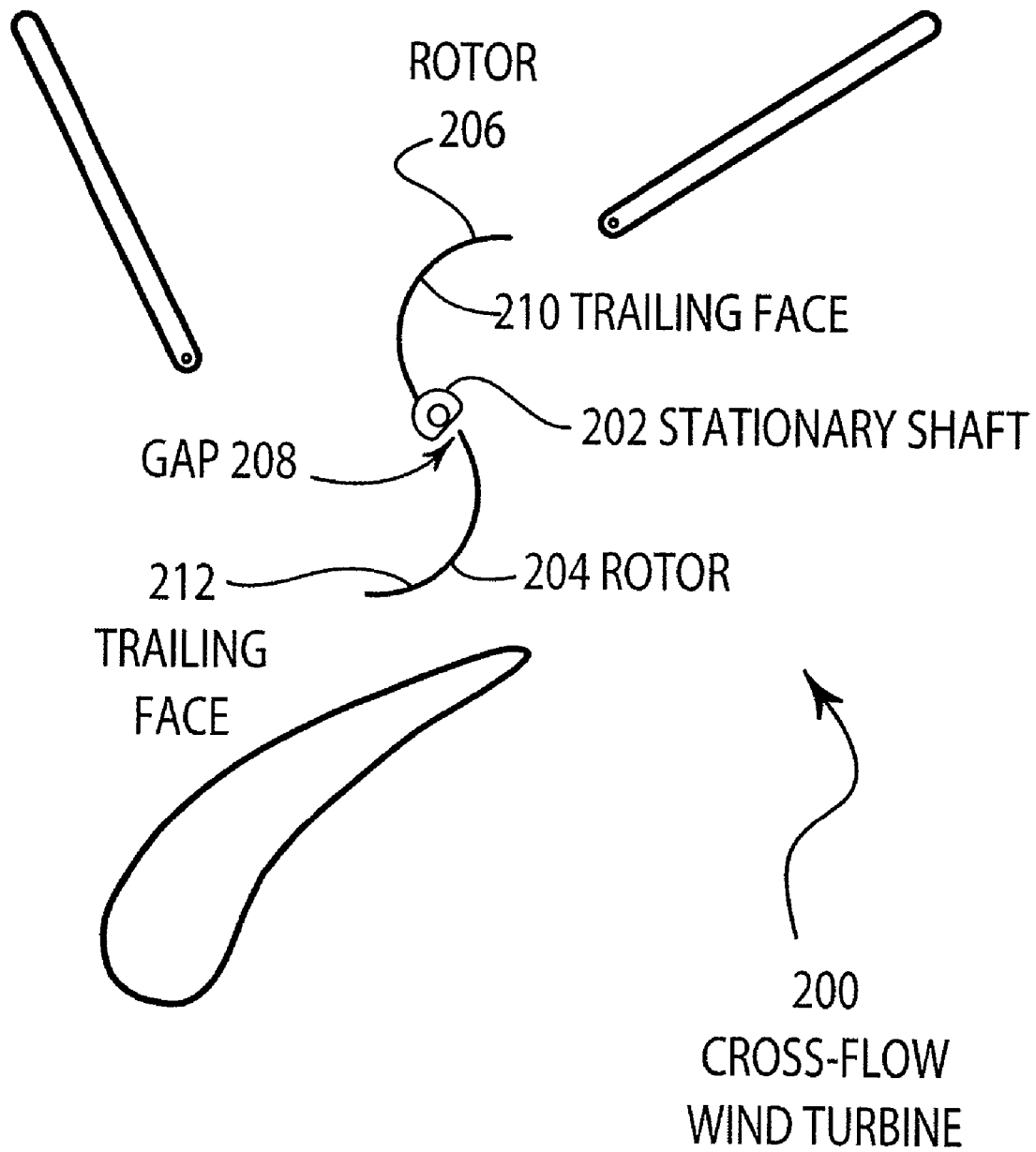
FIG. 2 is a schematic illustration of another embodiment of the invention.

The embodiment of FIG. 1A has produced the highest efficiencies of the various embodiments disclosed herein for wind tunnel testing. Computer simulations using computational fluid dynamics have shown that the embodiment of FIG. 2 provides the highest efficiencies. Empirical data collected from live testing of full scale systems will provide the best data as to which embodiment provides the highest efficiencies.

FIG. 1B provides a list of dimensions for both a 25 kilowatt cross-flow wind turbine having a total height of 33 feet and 1000 kilowatt turbine having a total height of 230 feet for the embodiment of FIG. 1A. Again, it is believed that the dimensions of these devices scale linearly with size.

FIG. 2 illustrates another embodiment 200 of a cross-flow wind turbine. The embodiment of FIG. 2 utilizes a stationary shaft 202. The shaft 202 remains stationary as the rotor blades 204, 206 rotate around the shaft 202. As can be seen from FIG. 2, stationary shaft 202 has a recessed portion which causes a gap 208 to form between the end of the rotor blade 206 adjacent to the shaft and the recessed portion of the shaft. Hence, a gap opens up between the inside end of the rotor and the shaft during certain portions of the cycle which causes deventing of the wind captured by the rotor blades during the power stroke. The wind that is vented through the gap 208 is directed towards rotor blade 206 to assist rotor blade 206 in moving through the return cycle. This is disclosed in more detail below. In other words, wind captured by the trailing face 212 of the rotor blade 204 is directed through the gap 208 and flows onto the trailing face 210 of the rotor blade 206 to create positive pressure on the trailing face 210.

Figure 3:
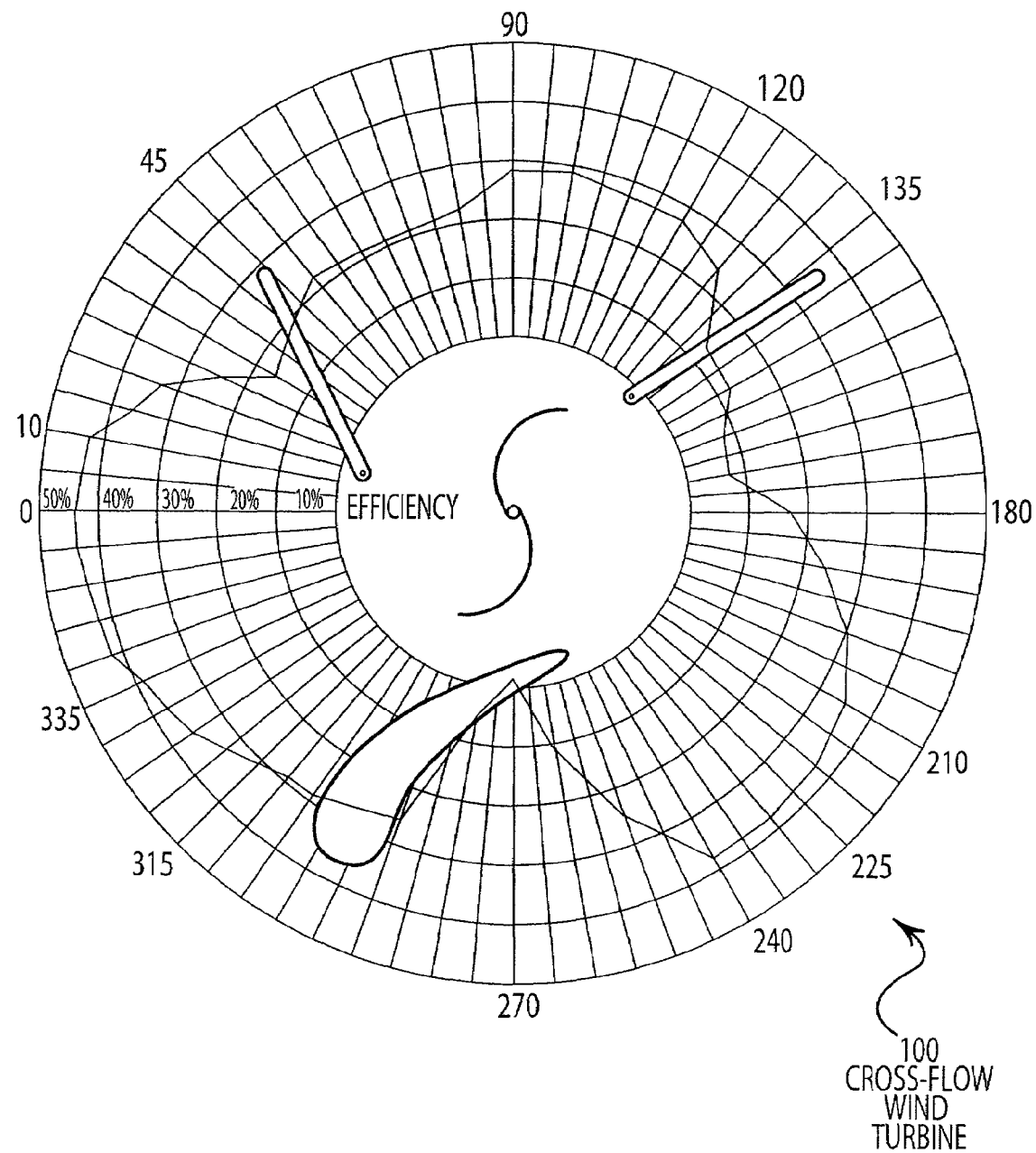
FIG. 3 is an efficiency graph illustrating efficiencies of the embodiment of FIG. 1A based on wind direction.

FIG. 3 is a graph illustrating efficiencies of the cross-flow wind turbine 100 that is illustrated in FIG. 1A, versus the direction of wind flow. As can be seen from FIG. 3, the highest efficiencies are obtained from wind flowing from directions of approximately 10° to 335°. In these directions, efficiencies of 40% to 45% are achieved. When the wind flows from the directions of approximately 210° to 240°, efficiencies range from 35% to 37%. In addition, reasonable efficiencies can be obtained in the range of 27% to 29% when the wind flows from the direction of 90° to 120°. Hence, the cross-flow wind turbine 100 illustrated in FIG. 3 is somewhat omni-directional, but clearly achieves the highest efficiencies of over 40% between 10° and 335°.

Figure 4A:
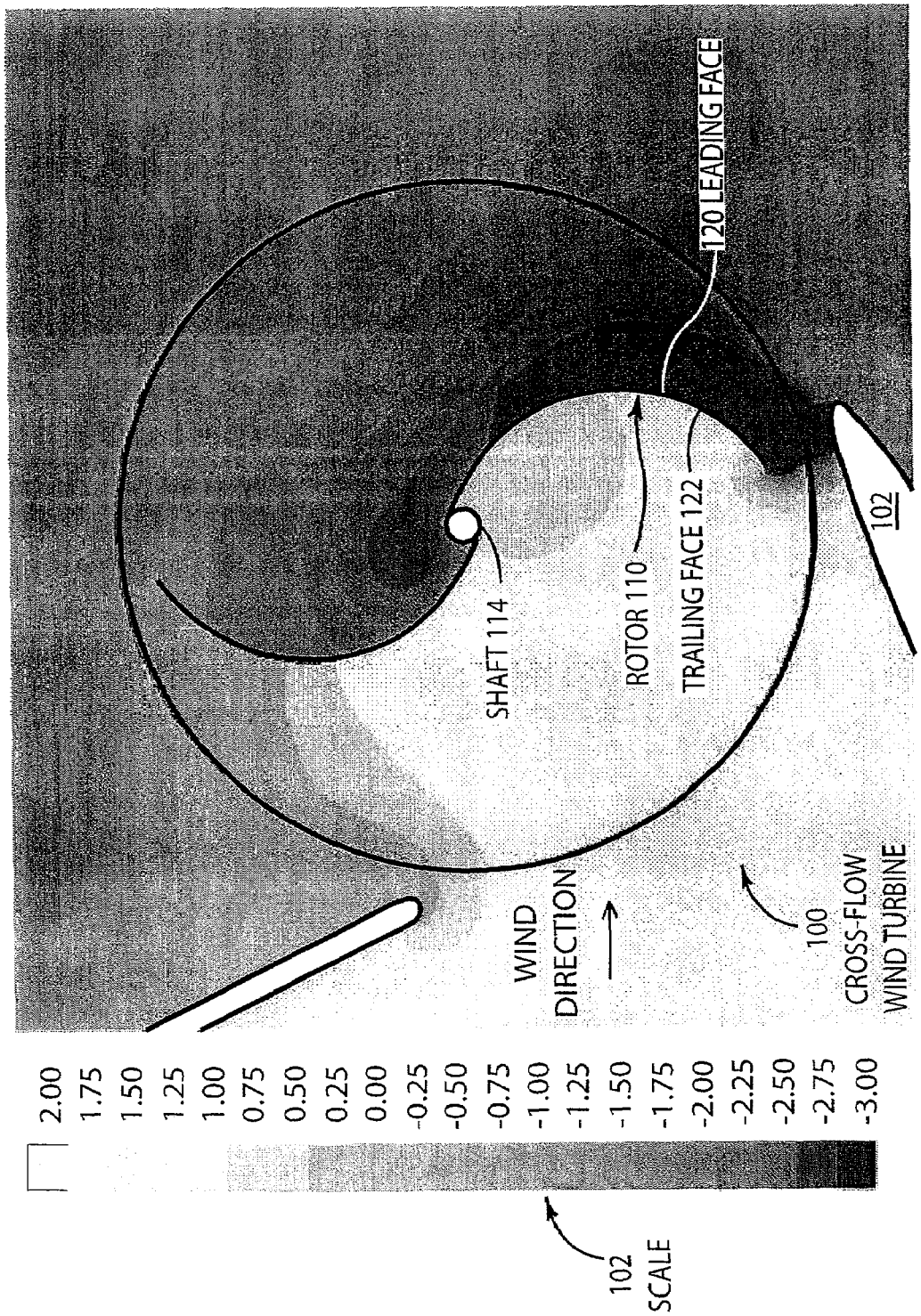
FIG. 4A is an illustration of pressure gradients that are produced by the embodiment of FIG. 1A as calculated from computer simulations using computational fluid dynamics.

FIG. 4A illustrates pressure gradients calculated by computer simulations using computational fluid dynamics for cross-flow wind turbine 100. The scale 102 shows positive pressures as lighter shades and negative pressures as darker shades. As can be seen from Figure 4A, large negative pressures are created on the leading face 120 of rotor blade 110 as rotor blade 110 passes by airfoil stator 102 during the power stroke. The large negative pressures created on the leading face 120 of rotor blade 110 result from the accelerated air flow across the surface of airfoil stator 102. These negative pressures function to pull the rotor blade 110 in a counterclockwise direction around the shaft. Positive pressure indicated by lighter shades is created on the trailing face 122 of the rotor blade 110. The large differential in pressure created between the trailing face 122 and the leading face 120 of the rotor blade 110 creates a large amount of force on rotor blade 110 to cause the rotor blade 110 to rotate in a counterclockwise direction around the shaft 114. This large amount of force created during the power stroke of the cross-flow wind turbine 100 results in higher efficiencies.

Figure 4B:
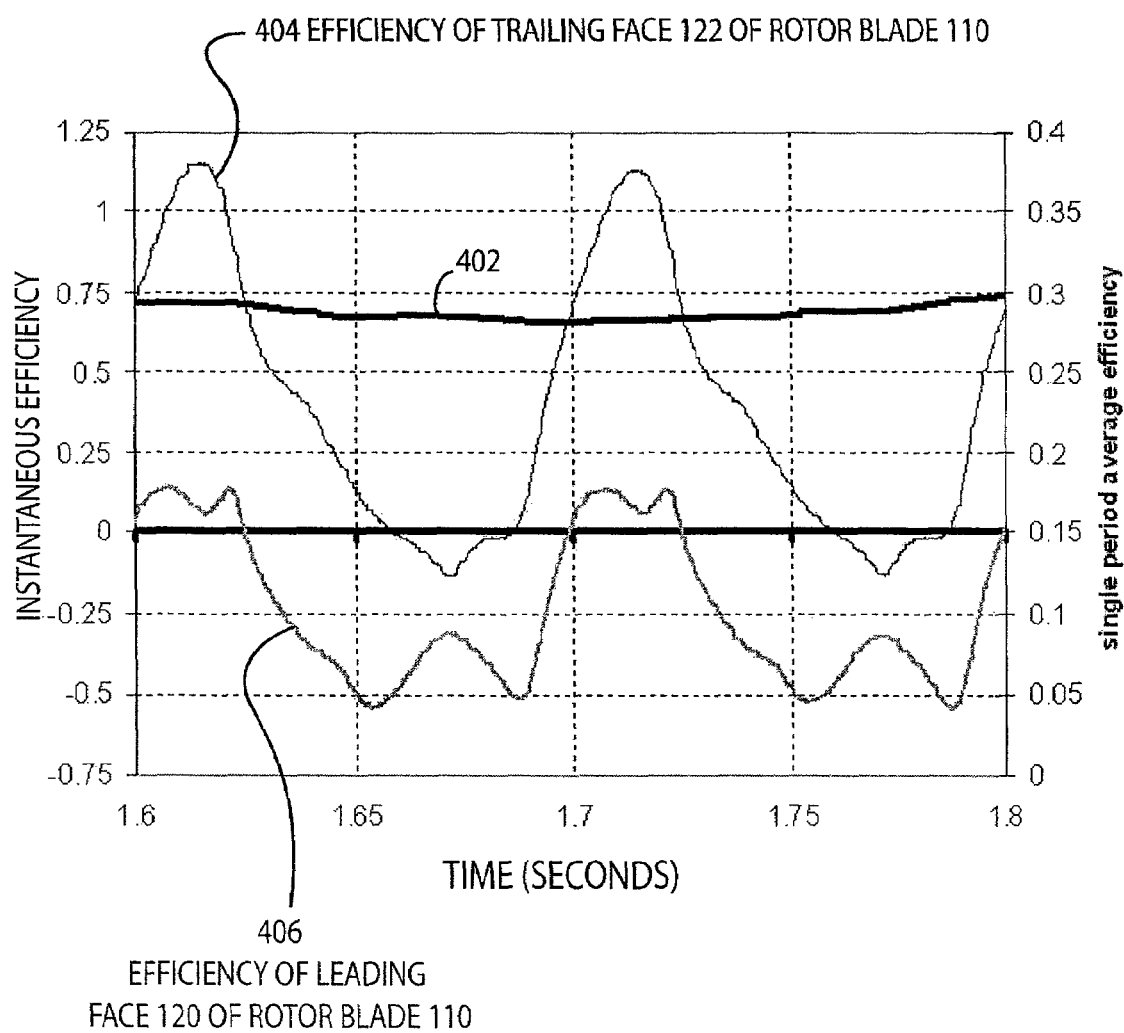
FIG. 4B is an efficiency graph of the embodiment of FIG. 4A.

FIG. 4B is an illustration of instantaneous efficiency and average efficiency of a single rotor blade versus time for the embodiment of FIG. 1A. As can be seen from FIG. 4B, the average efficiency illustrated by plot 402 ranges between 28% and 32%. The plot 404 is the instantaneous calculated efficiency for the leading face 120 of rotor blade 110 of the embodiment illustrated in FIG. 1A.

The efficiency graphs, such as graph 4B are calculated from computational fluid dynamics simulations on a computer. In the computational fluid dynamics simulations, the blades complete a full rotation every second. The dynamic loads on the blades are shown for one half revolution. A half second window shows all of the cyclical force patterns as the patterns repeat over the next half revolution with the forces on the blades reversed. Non-dimensional pressure coefficients are measured at each time step as the blades rotate through this half cycle. The pressure on the blades is a function of the pressure coefficient and the reference flow head, $P = C_P \times q_{ref}$; where $q_{ref}$ is the reference flow head.

$q_{ref} = \frac{1}{2} p (U_{ref})^2$ where $p$=air density $U_{ref}$=upstream velocity measured at mid-rotor height The moments on each blade face, which act to produce energy when they are positive, are then summed and plotted as the overall efficiency. The graphs only illustrate a single blade. Hence, the average efficiency plot 402 is generated from the addition of efficiencies calculated for both blades. The practical result is that another set of plots that are 180° out of phase with the plots shown are added to the plots that are shown in FIG. 4B, as well as the other efficiency graphs illustrated herein.

The efficiency of the turbine in the wind tunnel and full scale is calculated from the following formulas:

Power Available in the Wind:

$$P_w = 1/2 pAS^3 \text{[Watts]}$$

$P_w$ = power available in the wind $p$ = air density, kg/m$^3$

= 1.225 kg/m$^3$ @ sea level $A$ = rotor swept area, m$^2$

= rotor height $x$ rotor diameter $S$ = wind speed, m/s

Turbine Power:

$P_t$=Rotor Torque (Nm)×Rotational Velocity (rad/sec) [Watts]

Turbine Efficiency:

% Efficiency=$(P_t/P_w)$×100

Once the turbine's efficiency is determined, the turbine power can also be calculated by:

$P_t = P_w \times \text{efficiency} = \frac{1}{2} pAS^3 \times \text{eff}$

Figure 5:
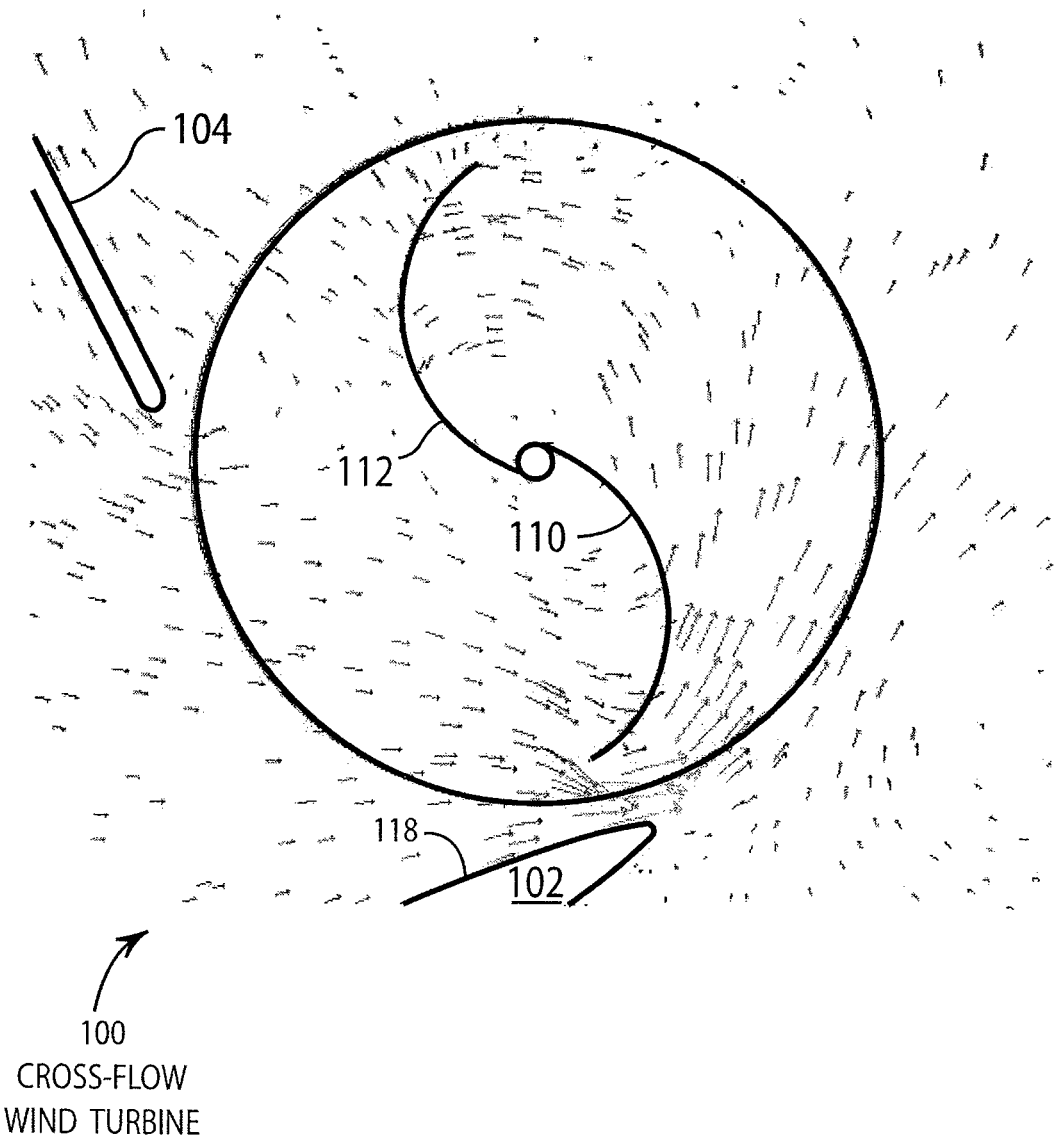
FIG. 5 is a wind velocity and directional flow diagram of the embodiment of FIG. 4A.

FIG. 5 is a wind velocity and directional flow diagram that illustrates the direction of flow of the wind and its intensity. As is illustrated in FIG. 5, the wind accelerates in the gap between the airfoil stator 102 and rotor blade 110 as a result of the air flow characteristics of the airfoil stator 102 that causes the wind to accelerate on the surface 118 of airfoil stator 102. The length of the arrows in FIG. 5 illustrate the magnitude of the speed of the wind. As shown in FIG. 5, large wind velocities are created along the leading face of the rotor blade 120 which are directed to the trailing face of rotor 112. The large velocities along the surface of the leading face of the rotor blade 110 create a negative pressure while the wind impinging upon the trailing face of rotor 112 create a positive pressure. In addition, stator 104 directs the wind so that it impinges upon the trailing face of rotor blade 110.

FIG. 6A illustrates pressure gradients calculated by computer simulations using computational fluid dynamics for the cross-flow wind turbine 200 that is illustrated in FIG. 2. Scale 602 shows positive pressures as lighter shades and negative pressures as darker shades. In a manner similar to FIG. 4A, large negative pressures are created on the leading face of rotor blade 204 as the rotor blade 204 passes by the airfoil stator 214 during the power stroke. The large negative pressures created on the leading face of rotor blade 204 result from the accelerated air flow across the surface of airfoil stator 214. These negative pressures function to pull the rotor blade 204 in a counter-clockwise direction around the shaft 202. Positive pressure indicated by lighter shades is created on the trailing face of the rotor blade 204. The large differential pressure created between the leading face and the trailing face of the rotor blade 204 creates a large amount of force on the rotor blade 204 to cause the rotor blade 204 to rotate in a counter-clockwise direction around the shaft 202. This large amount of force created during the power stroke of the cross-flow wind turbine 200 results in higher efficiencies. The gap 208 functions to devent the trailing face of the rotor blade 204, as described above. Wind flows through the gap 208 an impinges upon the trailing face of rotor blade 206. This helps to increase the pressure on the trailing face of rotor blade 206 and minimize the effect of any negative pressures on the trailing face of rotor blade 206 during the return cycle of the rotor blades.

Figure 6B:
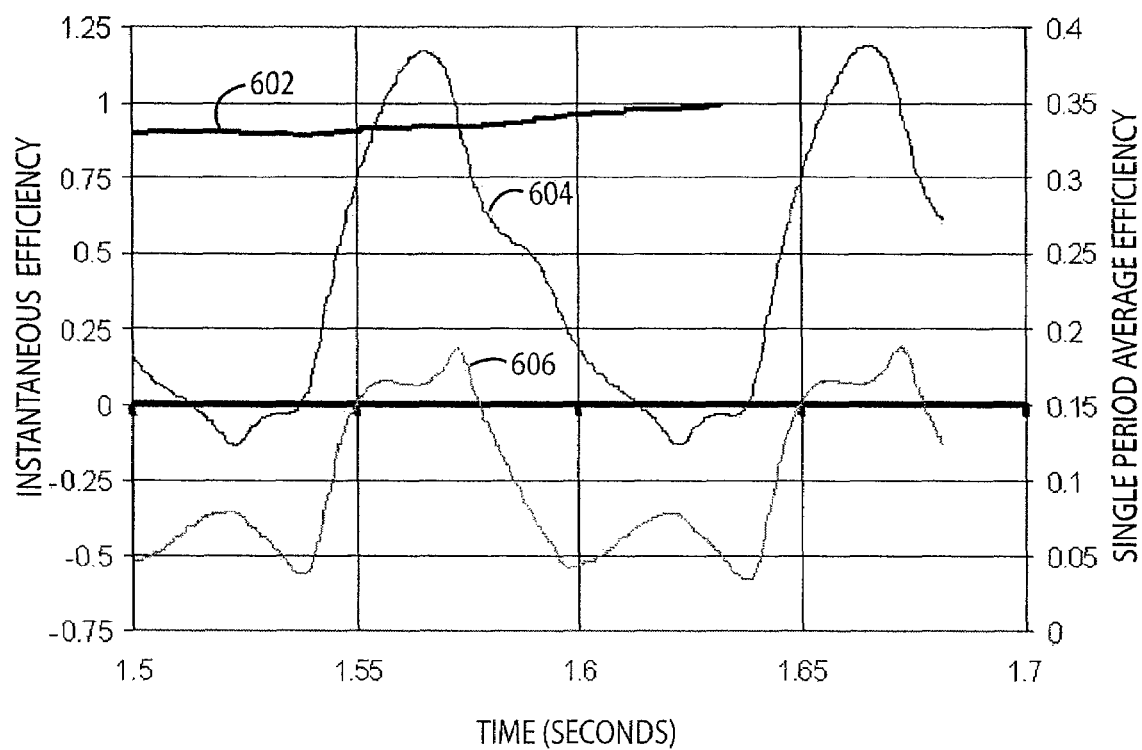
FIG. 6B is an efficiency graph of the embodiment of FIG. 6A.

FIG. 6B is an illustration of the instantaneous efficiency and average efficiency of a single rotor blade versus time for the embodiment of FIG. 2. As can be seen from FIG. 6B the average efficiency illustrated by plot 602 ranges between 33% and 35%. Plot 604 is the instantaneous efficiency of the leading face of the rotor blades of the embodiment of FIG. 2, while plot 606 illustrates the instantaneous efficiency of the trailing face of the rotor blades of the embodiment of FIG. 2.

Figure 7:
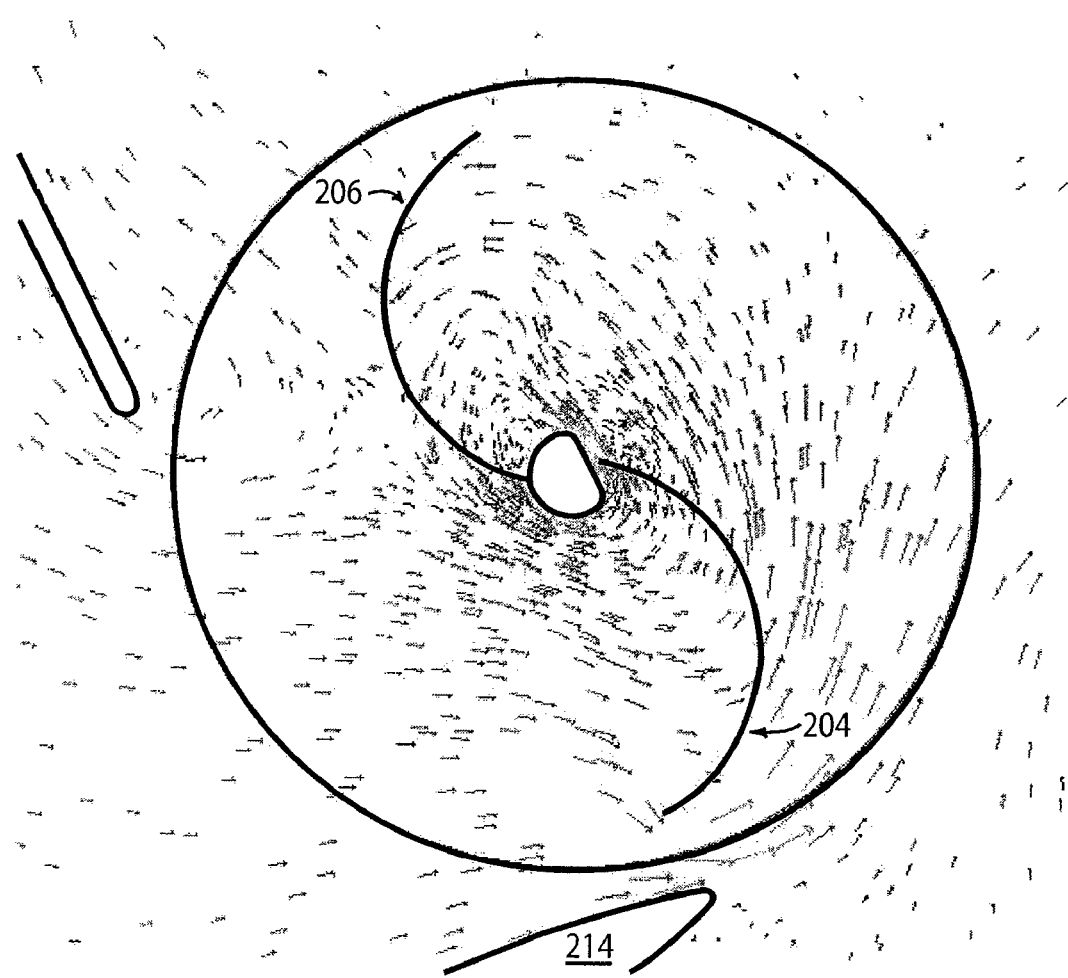
FIG. 7 is a wind velocity and directional flow diagram of the embodiment of FIG. 6A.

FIG. 7 is a wind velocity and directional flow diagram that illustrates the direction of flow of the wind and its intensity for the embodiment of FIG. 2. As illustrated in FIG. 7, the wind accelerates in the gap between the airfoil stator 214 and the rotor blade 204 as a result of the flow characteristics of the airfoil stator 214 that cause the wind to accelerate on the surface of the airfoil stator 214. The length of the arrows in FIG. 7 illustrate the magnitude of the speed of the wind. As also shown in FIG. 7, large wind velocities are created along the leading face of the rotor blade 204 that are directed to the trailing face of rotor blade 206. In addition, wind flowing through the gap 208 also impinges on the trailing face of rotor blade 206. FIG. 7 provides a good visual impression of the wind flow characteristics of the embodiment of FIG. 2.

Figure 8B:
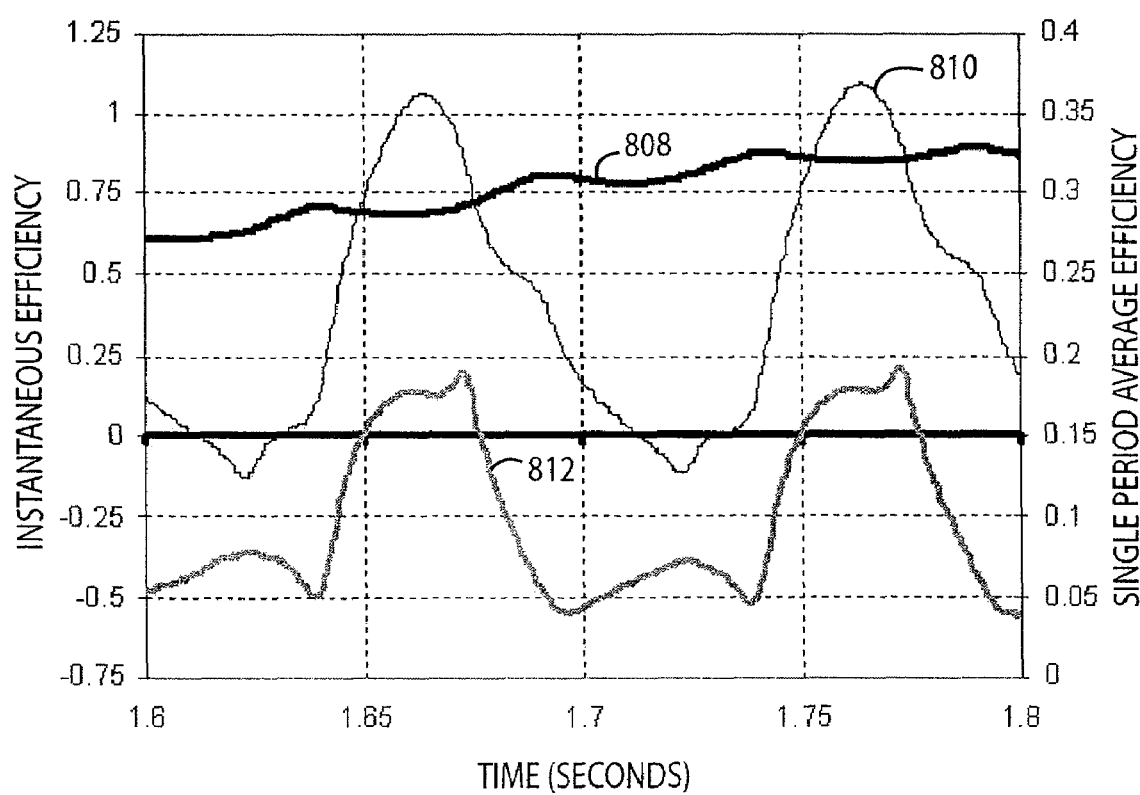
FIG. 8B is an efficiency graph of the embodiment of FIG. 8A.

FIG. 8A illustrates the pressure gradients calculated by computer simulations using computational fluid dynamics for the embodiment of the cross-flow wind turbine that is illustrated in FIG. 8A. The embodiment of the cross-flow wind turbine illustrated in FIG. 8A is very similar to the embodiment illustrated in FIG. 2, with the exception that the stationary shaft 802 is somewhat larger, thereby creating a larger gap during certain portions of the cycle of rotation. In addition, the rotors are slightly shorter. As can be seen from FIG. 8A, the wind flow patterns create a vortex 804 on the trailing face of rotator blade 806 during the return cycle. This vortex is not created in the embodiment of FIG. 2, as shown in FIG. 6A. As a result, the efficiencies of the embodiment of FIG. 8A are not quite as high as the efficiencies of the embodiment of FIG. 2, as illustrated with more specificity in FIG. 8B.

FIG. 8B is an illustration of instantaneous efficiency and average efficiency of a single rotor blade versus time for the embodiment illustrated in FIG. 8A. As can be seen from FIG. 8B, the average efficiency illustrated by plot 808 ranges between 27% and 33%. Plot 810 illustrates the instantaneous efficiency of the leading face of the rotor blades of the embodiment of FIG. 8A, while plot 812 illustrates the instantaneous efficiency of the trailing face of the rotor blades of the embodiment of FIG. 8A.

Figure 9:
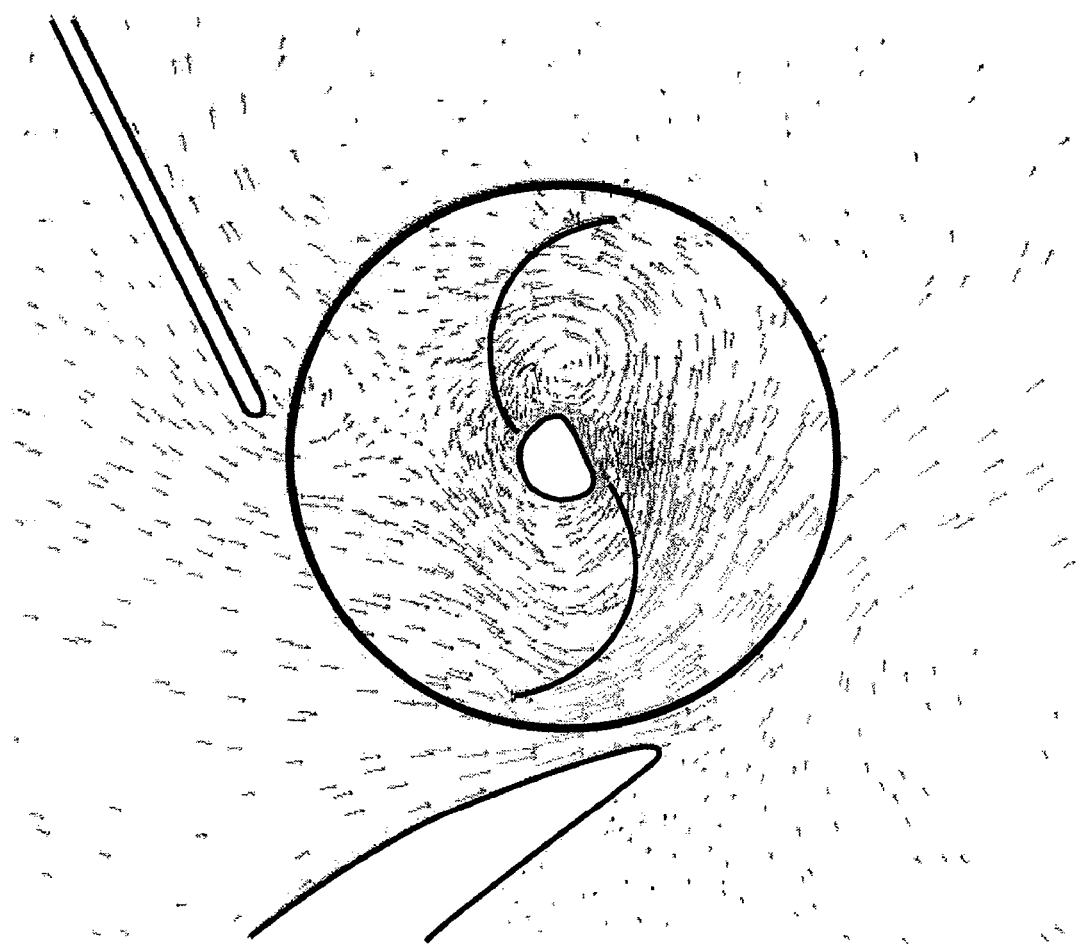
FIG. 9 is a wind velocity and directional flow diagram of the embodiment of FIG. 8A.

FIG. 9 is a wind velocity and directional flow diagram that illustrates the direction of flow of the wind and its intensity for the embodiment of FIG. 8A. FIG. 9 illustrates the manner in which large negative pressures are created on the leading face of the rotor blade as a result of the accelerated air flow on the airfoil. FIG. 9 also illustrates the manner in which the vortex is formed from wind flowing between the gap caused by the recessed portion of the shaft 802 and the rotor blade, as well as the accelerated wind from the airfoil.

Figure 10A:
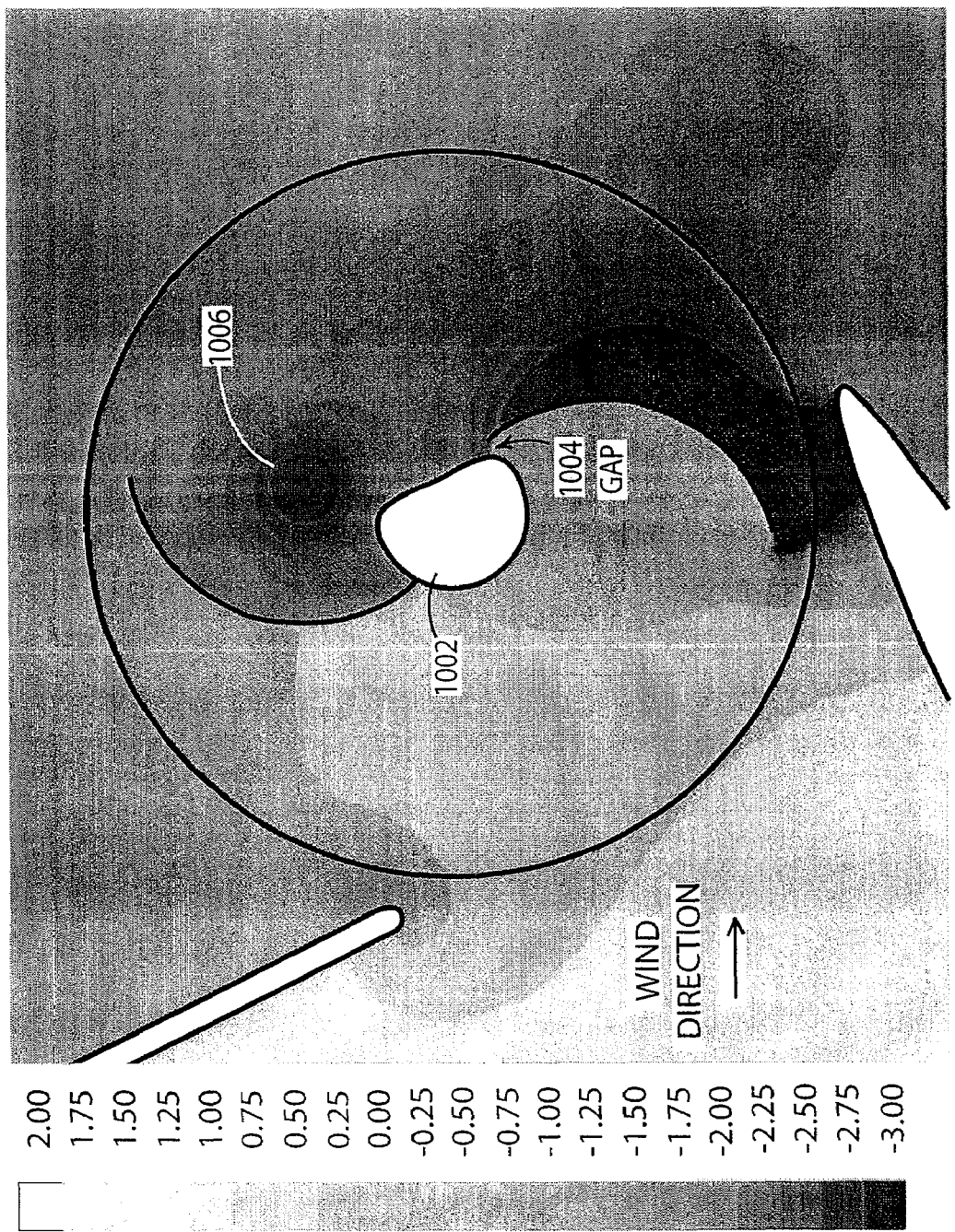
FIG. 10A is an illustration of pressure gradients that are produced by the embodiment of FIG. 10A as calculated from computer simulations using computational fluid dynamics.

FIG. 10A illustrates pressure gradients calculated by computer simulations using computational fluid dynamics for the cross-flow wind turbine embodiment illustrated in F*igure* 10A. The embodiment illustrated in FIG. 10A is similar to the embodiment of FIG. 8A but includes a stationary shaft 1002 that is larger than the stationary shaft 802 of FIG. 8A. As a result, a larger gap 1004 is formed between the rotor blades in the stationary shaft 1002 during certain portions of the cycle of rotation. A vortex 1006 is also created by the embodiment of FIG. 10A.

Figure 10B:
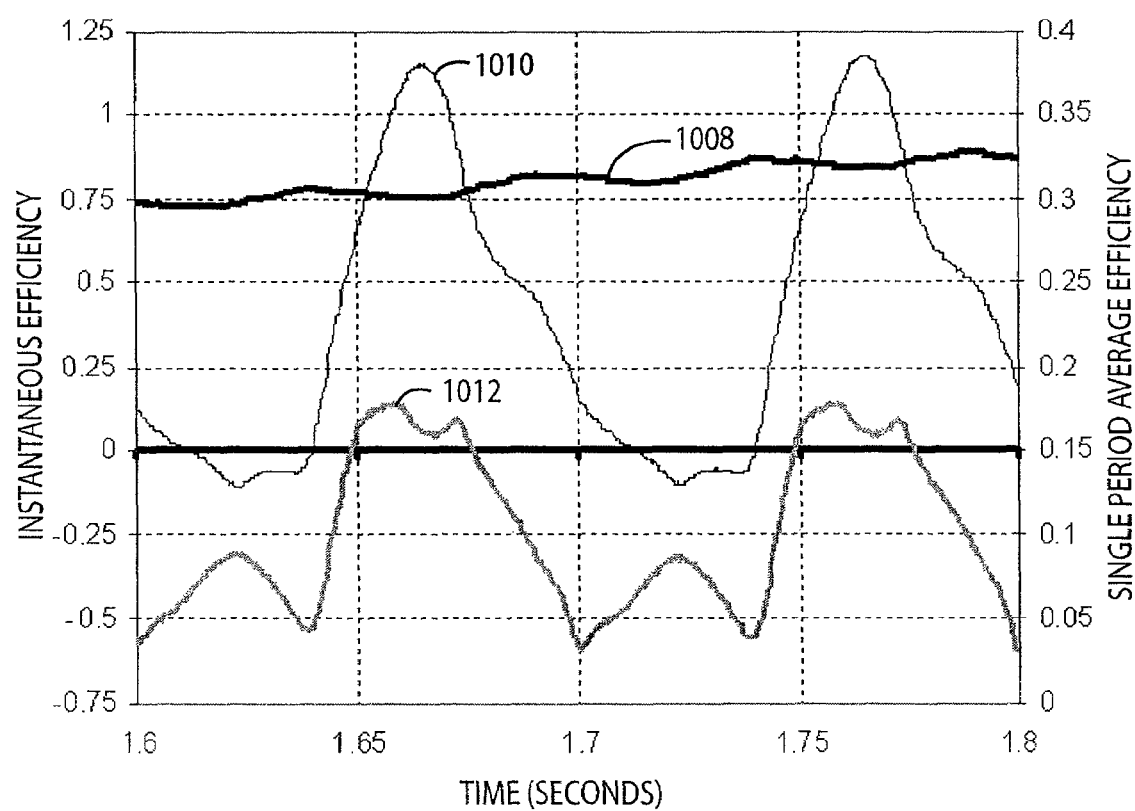
FIG. 10B is an efficiency graph of the embodiment of FIG. 10A.

FIG. 10B is an illustration of instantaneous efficiency and average efficiency of a single rotor blade versus time for the embodiment of FIG. 10A. As can be seen from FIG. 10B, the average efficiency illustrated by plot 1008 ranges between 29% and 33%. Plot 1010 illustrates the instantaneous efficiency of the leading face of the rotor blades of the embodiment of FIG. 10A. Plot 1012 illustrates the instantaneous efficiency of the trailing face of the rotor blades. Average efficiencies are calculated in the manner described above.

Figure 11:
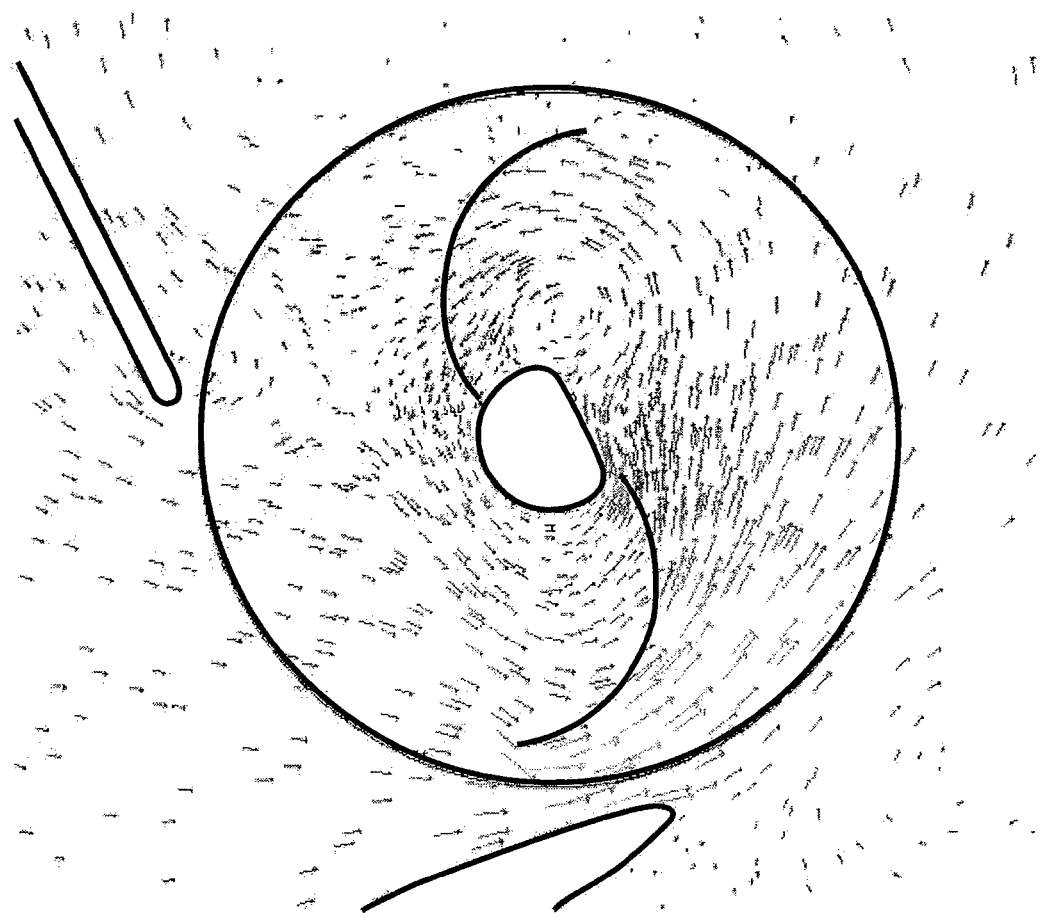
FIG. 11 is a wind velocity and directional flow diagram of the embodiment in FIG. 10A.

FIG. 11 is a wind velocity and directional flow diagram that illustrates the direction of flow of the wind and its intensity for the embodiment of FIG. 10A. FIG. 11 provides a good visual manner of disclosing the operation of the embodiment of FIG. 10A.

Figure 12A:
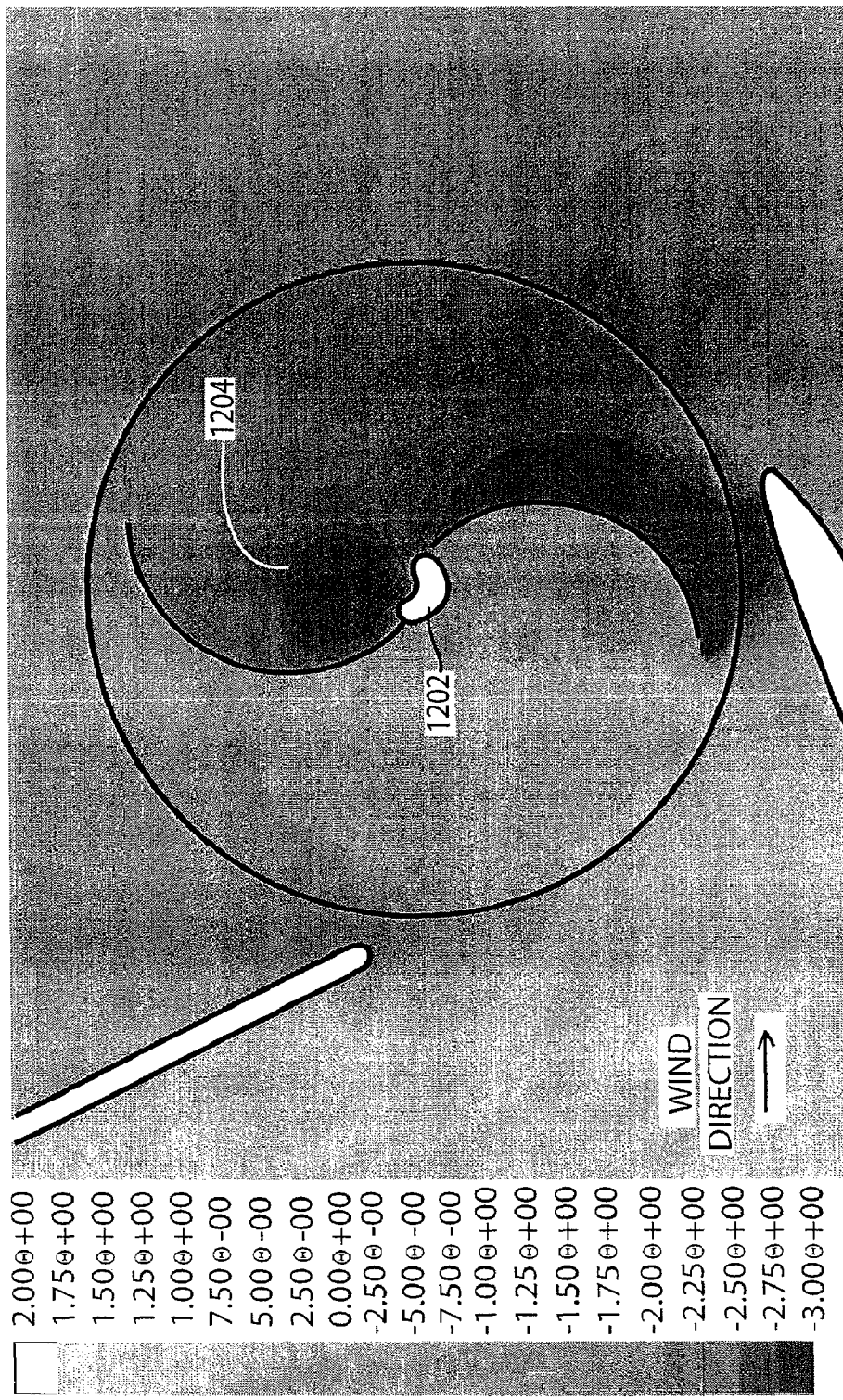
FIG. 12A is an illustration of pressure gradients that are produced by the embodiment of FIG. 12A as calculated from computer simulations using computational fluid dynamics.

FIG. 12A illustrates pressure gradients calculated by computer simulations using computational fluid dynamics for the embodiment of the cross-flow wind turbine that is illustrated in FIG. 12A. Stationary shaft 1202 is a kidney bean shaped stationary shaft that forms a large gap during certain portions of the rotational cycle of the rotor blades around the stationary shaft 1202. As can be seen from FIG. 12A, a fairly large low pressure vortex is formed on the trailing face of the rotors during the return cycle.

Figure 12B:
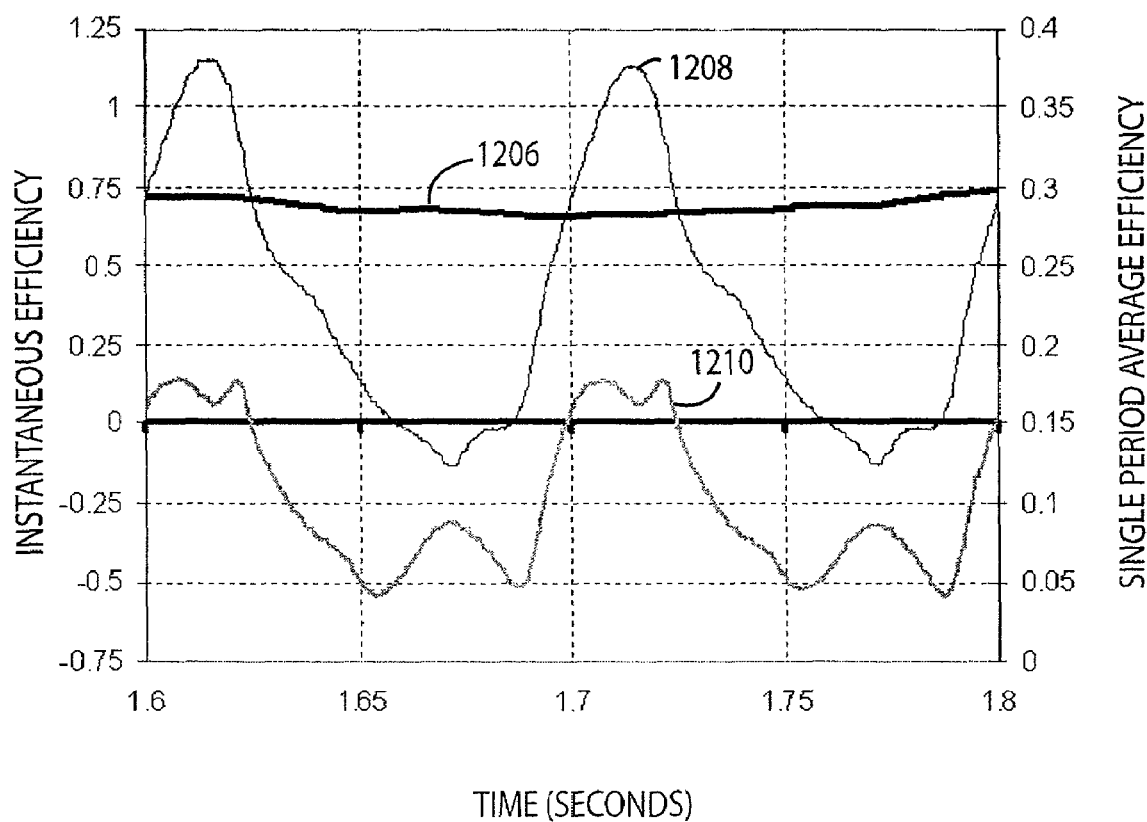
FIG. 12B is an efficiency graph of the embodiment of FIG. 12A.

FIG. 12B is an illustration of the instantaneous efficiency and average efficiency of a single rotor blade versus time for the embodiment illustrated in FIG. 12A. As can be seen from FIG. 12B, the average efficiency that is illustrated by plot 1206 ranges between 28% and 30%. The instantaneous efficiency of the leading face of the rotor blades is illustrated by plot 1208. The instantaneous efficiency of the trailing face of the rotor blades is illustrated by plot 1210. The average efficiency illustrated by plot 1206 is calculated in the manner described above.

Figure 13:
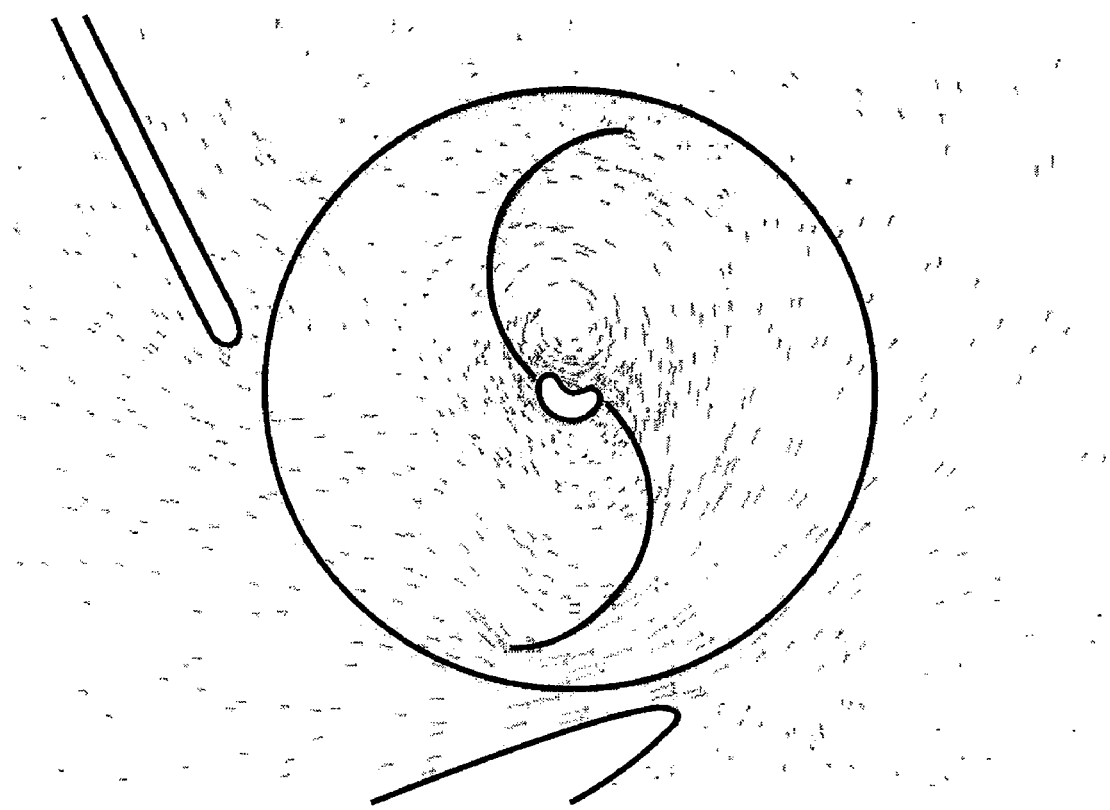
FIG. 13 is a wind velocity and directional flow diagram of the embodiment of FIG. 12A.

FIG. 13 is a wind velocity and directional flow diagram that illustrates the direction of flow of the wind and its intensity for the embodiment illustrated in FIG. 12A. The diagram of FIG. 13 illustrates the manner in which the vortex 1202 is formed.

Figure 14A:
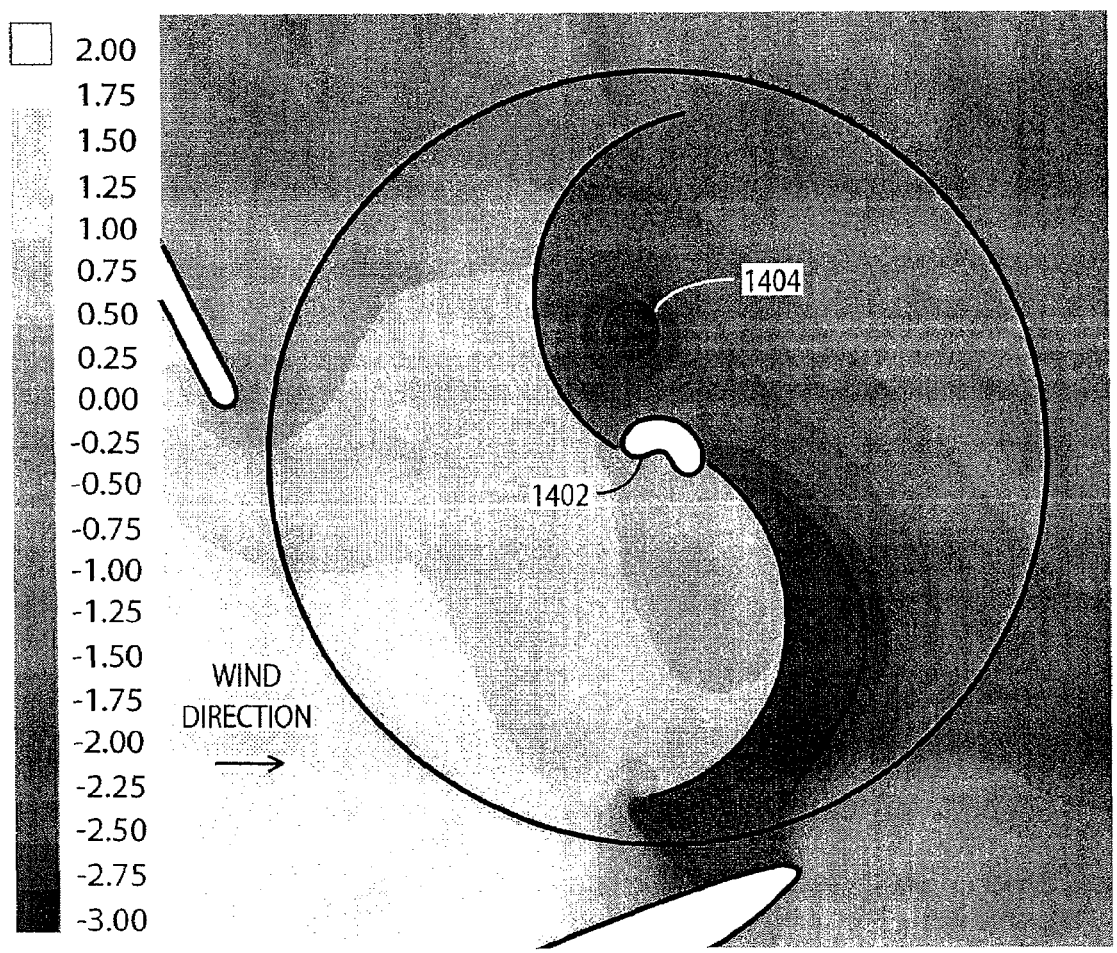
FIG. 14A is an illustration of pressure gradients that are produced by the embodiment of FIG. 14A as calculated from computer simulations using computational fluid dynamics.

FIG. 14A illustrates pressure gradients calculated by computer simulations using computational fluid dynamics for the embodiment of a cross-flow wind turbine illustrated in FIG. 14A. The embodiment of FIG. 14A uses a kidney shaped stationary shaft 1402 that is similar to the kidney shaped stationary shaft 1202 of the embodiment of FIG. 12A, but stationary shaft 1402 is positioned so that a gap is formed during a different portion of the rotational cycle. Again, a vortex 1404 is formed near the trailing face of the rotor blades during the return cycle.

Figure 14B:
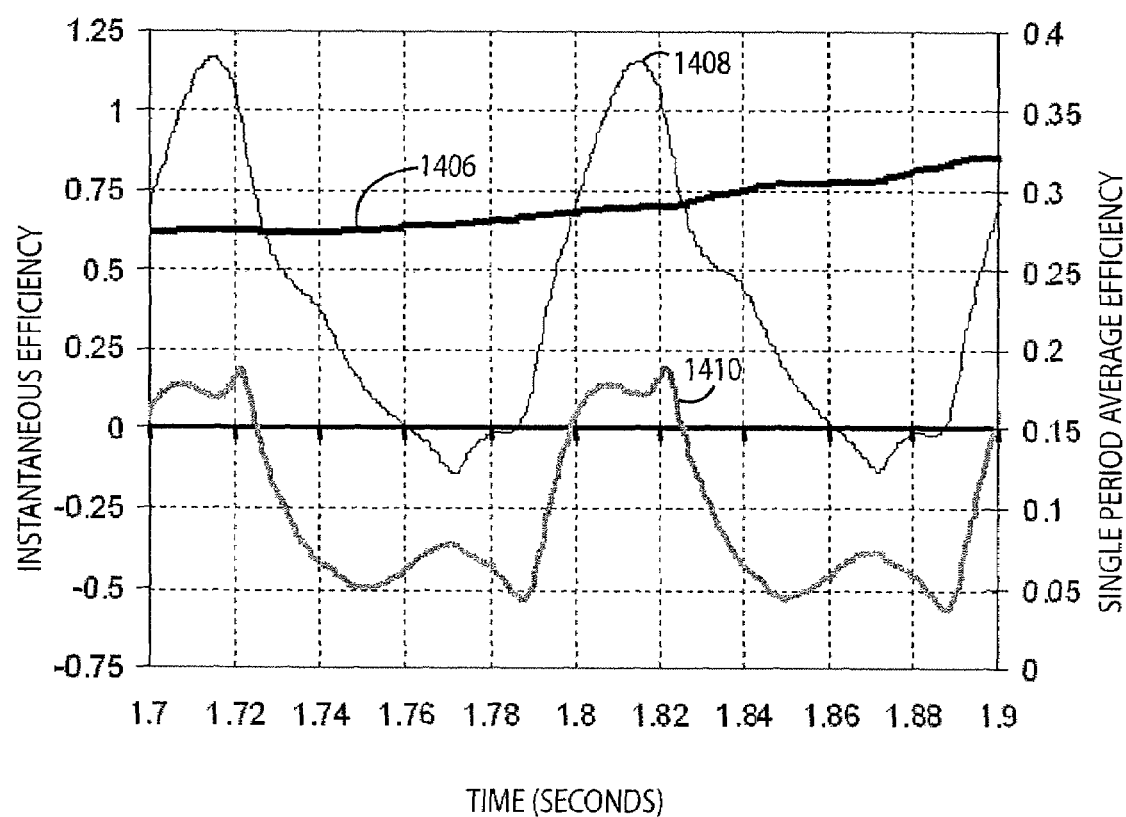
FIG. 14B is an efficiency graph of the device of FIG. 14A.

FIG. 14B is a illustration of the instantaneous efficiency and average efficiency of a single rotor blade versus time for the embodiment illustrated in FIG. 14A. As can be seen from FIG. 14B, the average efficiency illustrated by plot 1406 ranges between 27% and 32%. Plot 1408 illustrates the instantaneous efficiency of the leading face of the rotor blades of the embodiment of FIG. 14A. Plot 1410 illustrates the instantaneous efficiency of the trailing face of the rotor blades.

Figure 15:
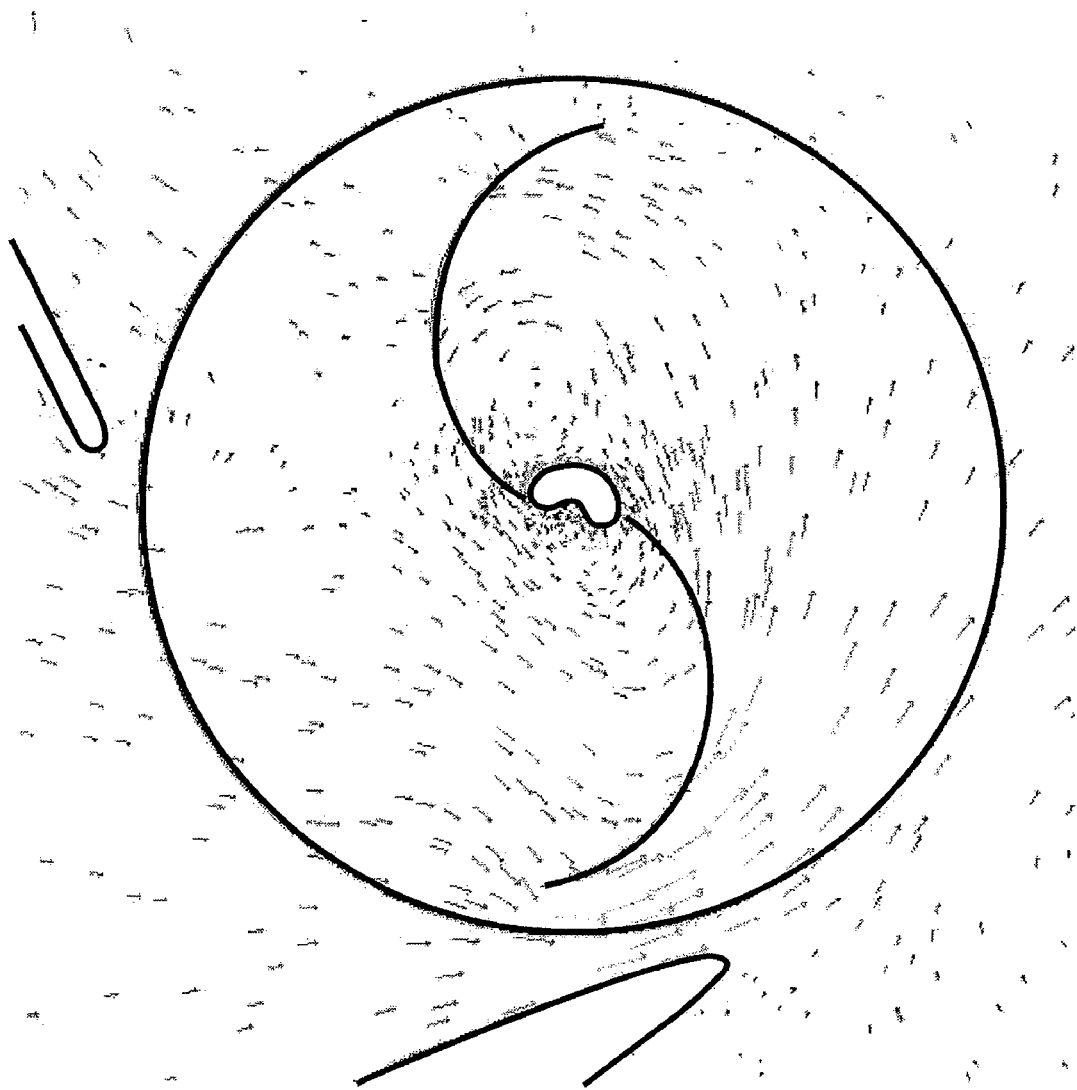
FIG. 15 is a wind velocity and directional flow diagram of the embodiment of FIG. 14A.

FIG. 15 is a wind velocity and directional flow diagram that illustrates the direction of flow of the wind and its intensity for the embodiment of FIG. 14A. FIG. 15 illustrates the flow patterns and intensities that allows a visual interpretation of the manner of operation of the cross-flow wind turbine illustrated in FIG. 14A.

Figure 16A:
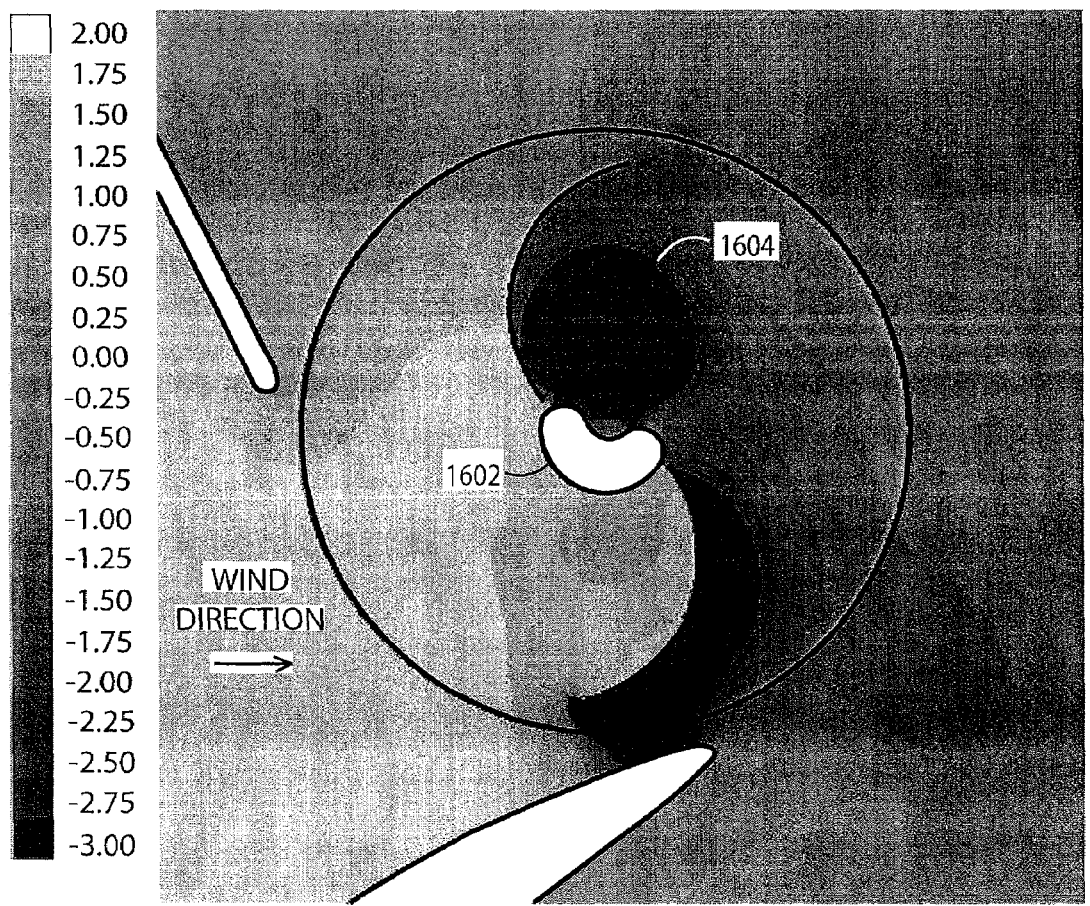
FIG. 16A is an illustration of pressure gradients that are produced by the embodiment of FIG. 16A as calculated from computer simulations using computational fluid dynamics.

FIG. 16A illustrates pressure gradients calculated by computer simulations using computational fluid dynamics for an embodiment of a cross-flow wind turbine that is illustrated in FIG. 16A. FIG. 16A is similar to the embodiment of FIG. 12A, except that FIG. 16A uses a kidney bean shaped stationary shaft 1602 that is larger than stationary shaft 1202 of FIG. 12A. The larger shaft reduces the size of the rotor blades and provides a larger gap between the shaft and the rotor blades. The result is a large vortex 1604 that creates a large negative pressure area on the trailing face of the rotor blades during the return portion of the rotational cycle.

Figure 16B:
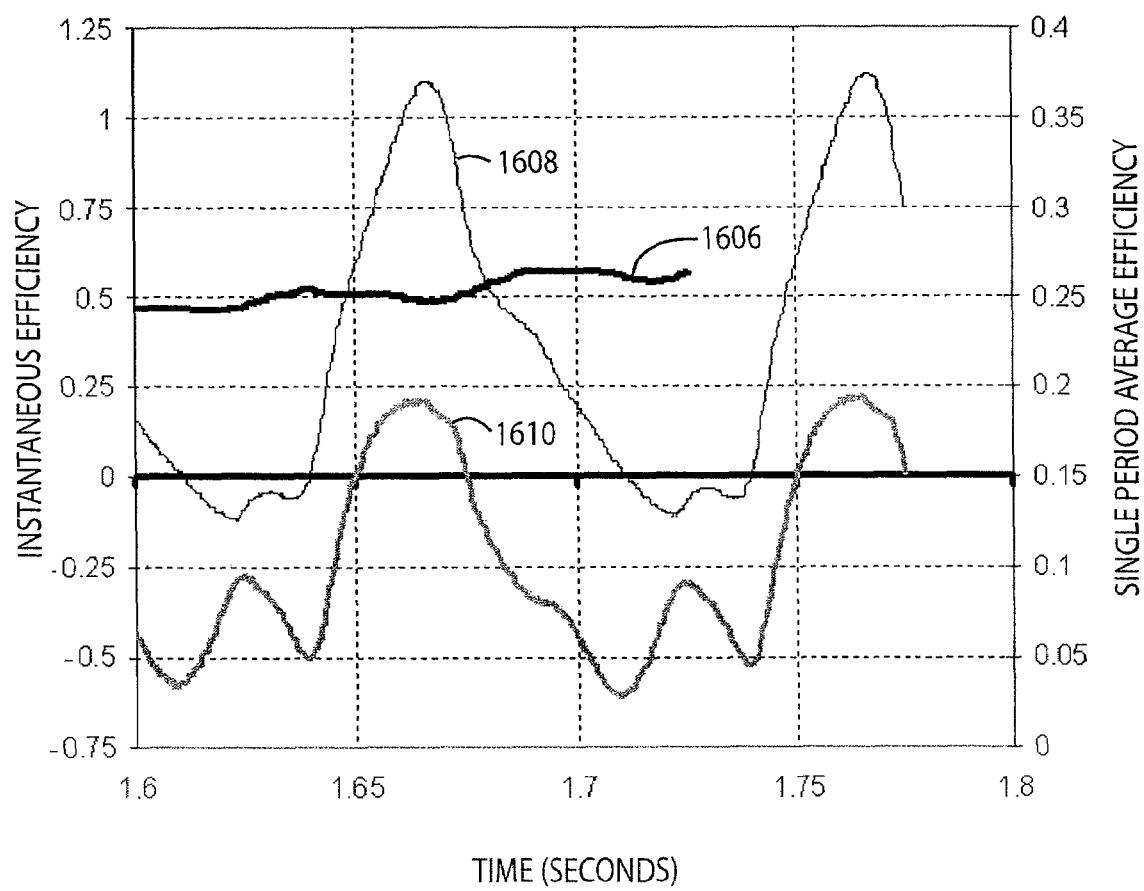
FIG. 16B is an efficiency graph of the embodiment of FIG. 16A.

FIG. 16B is an illustration of instantaneous efficiency and average efficiency of a single rotor blade versus time for the embodiment illustrated in FIG. 16A. As can be seen from FIG. 16B, the average efficiency, illustrated by plot 1606, ranges between 24% and 26%. Plot 1608 illustrates the instantaneous efficiency of the leading face of the rotor blades of the embodiment illustrated in FIG. 16A. Plot 1610 illustrates the instantaneous efficiency of the trailing face of the rotor blades.

Figure 17:
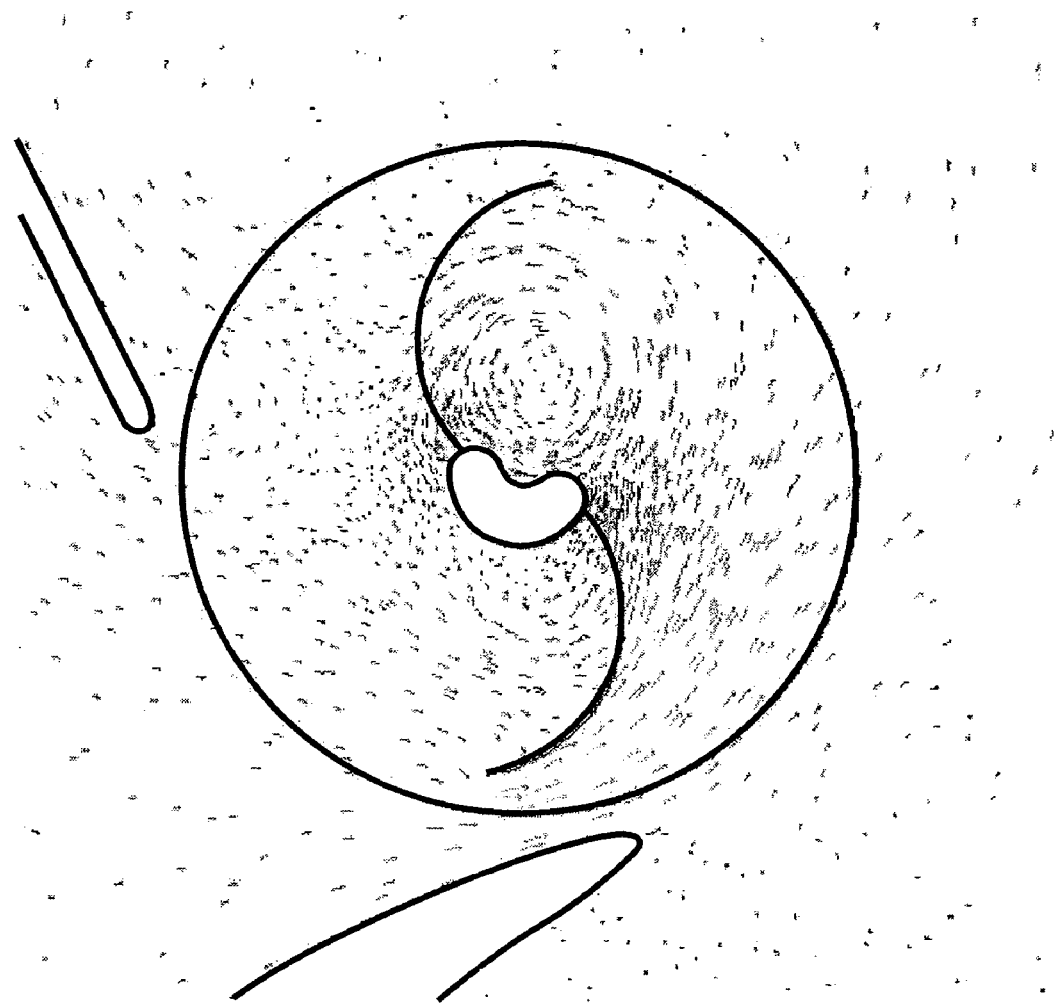
FIG. 17 is a wind velocity and directional flow diagram of the device of FIG. 16A.

FIG. 17 is a wind velocity and directional flow diagram that illustrates the direction of flow of the wind and its intensity for the embodiment illustrated in FIG. 16A. FIG. 17 provides a good visual interpretation of the operation of the embodiment of FIG. 16A.

Figure 18A:
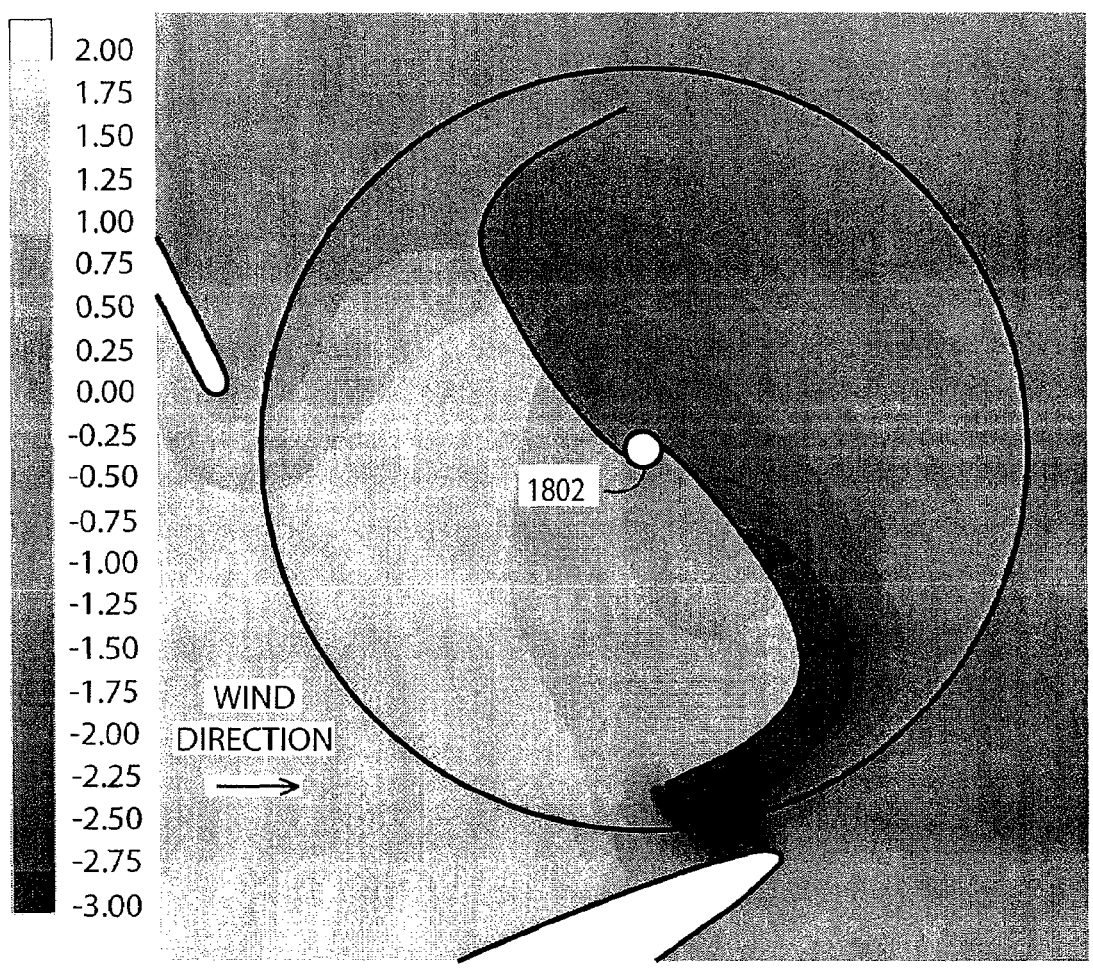
FIG. 18A is an illustration of pressure gradients that are produced by the embodiment of FIG. 18A as calculated from computer simulations using computational fluid dynamics.

FIG. 18A illustrates pressure gradients calculated by computer simulations using computational fluid dynamics for the embodiment of a cross-flow wind turbine that is illustrated in FIG. 18A. The rotor blades illustrated in FIG. 18A have a J-shaped pattern rather than the semi-circular 120° arc pattern used in other embodiments disclosed herein. Shaft 1802 is a rotating shaft that is connected to the rotor blades of the embodiment illustrated in FIG. 18A.

Figure 18B:
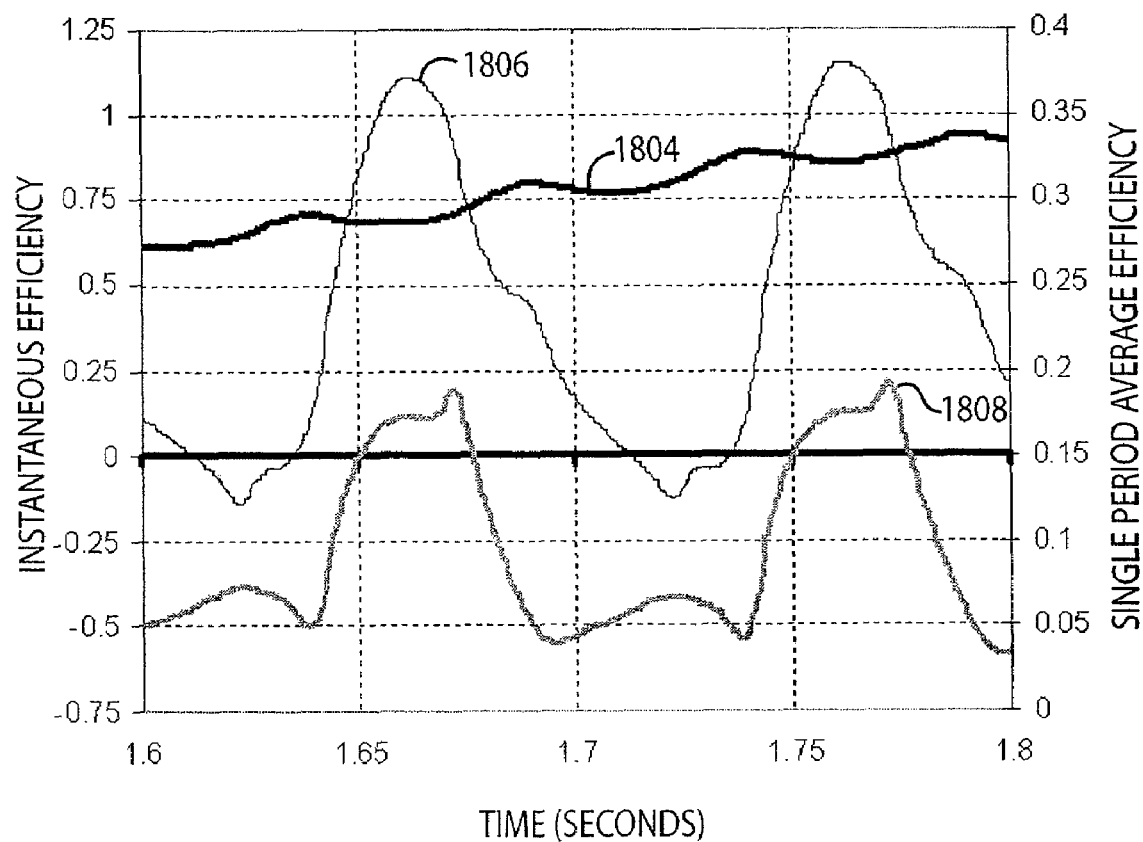
FIG. 18B is an efficiency graph of the embodiment illustrated in FIG. 18A.

FIG. 18B is an illustration of the instantaneous efficiency and average efficiency of a single rotor blade versus time for the embodiment illustrated in FIG. 18A. As can be seen from FIG. 18B, the average efficiency illustrated by plot 1804 ranges between 27% and 34%. Plot 1806 illustrates the instantaneous efficiency of the leading face of the rotor blades of the embodiment of FIG. 18A. Plot 1808 illustrates the instantaneous efficiency that is calculated for the trailing face of the rotor blades using the methods described above.

Figure 19:
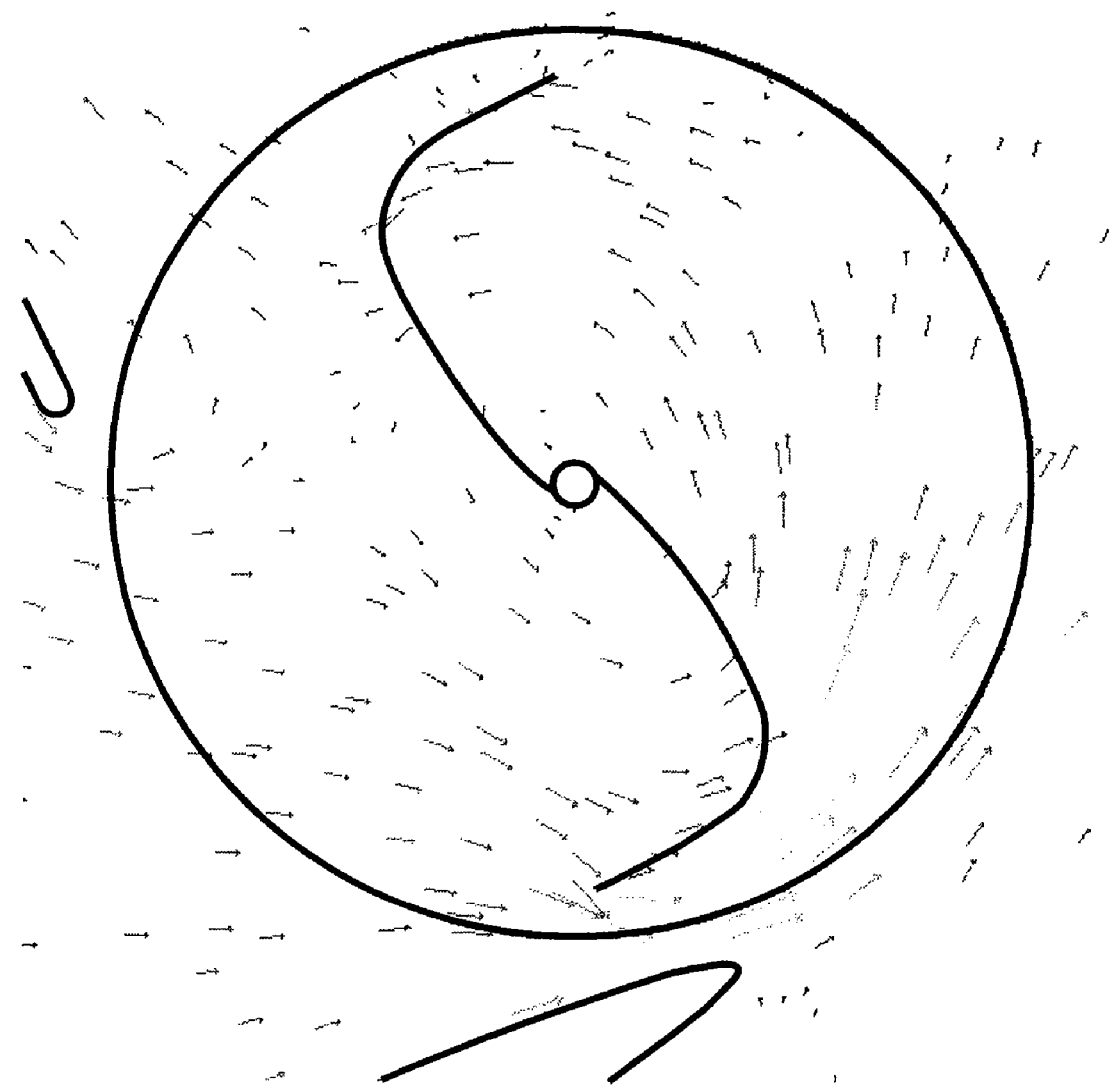
FIG. 19 is a wind velocity and directional flow diagram of the embodiment illustrated in FIG. 18A.

FIG. 19 is a wind velocity and directional flow diagram that illustrates the direction of flow of the wind and its intensity for the embodiment illustrated in FIG. 18A. FIG. 19 provides a good visual interpretation of the operation of the embodiment of the cross-flow wind turbine illustrated in FIG. 18A.

Figure 20A:
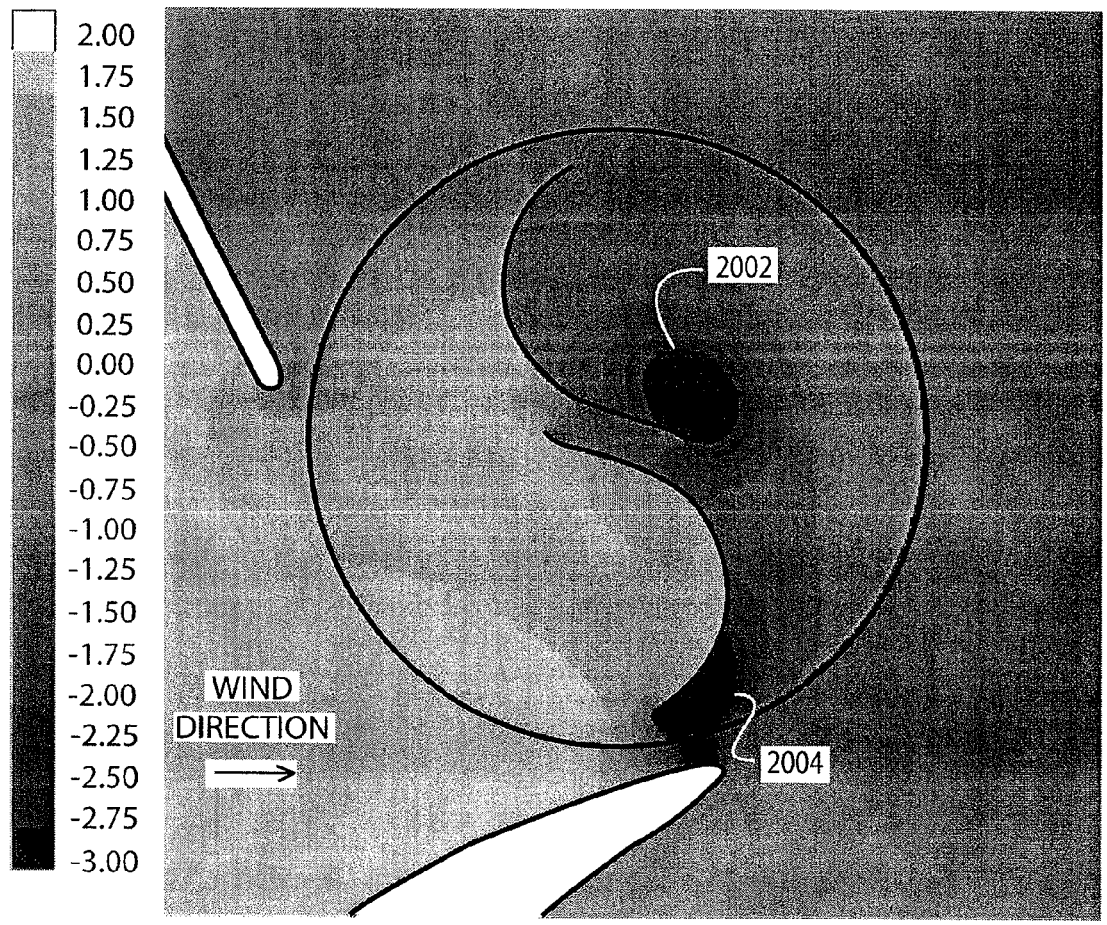
FIG. 20A is an illustration of pressure gradients that are produced by the embodiment of FIG. 20A as calculated from computer simulations using computational fluid dynamics.

FIG. 20A illustrates pressure gradients calculated by computer simulations using computational fluid dynamics for the embodiment of a cross-flow wind turbine that is illustrated in FIG. 20A. As shown in FIG. 20A, the rotor blades are arranged in a reverse offset configuration so that a gap is formed between the rotor blades. This simulation shows the creation of a vortex 2002 that is located more centrally on the trailing face of the rotor blades during the return cycle. The negative pressure area 2004 formed between the rotor blade and the airfoil during the power stroke is much smaller than the negative pressure areas in other embodiments disclosed herein.

Figure 20B:
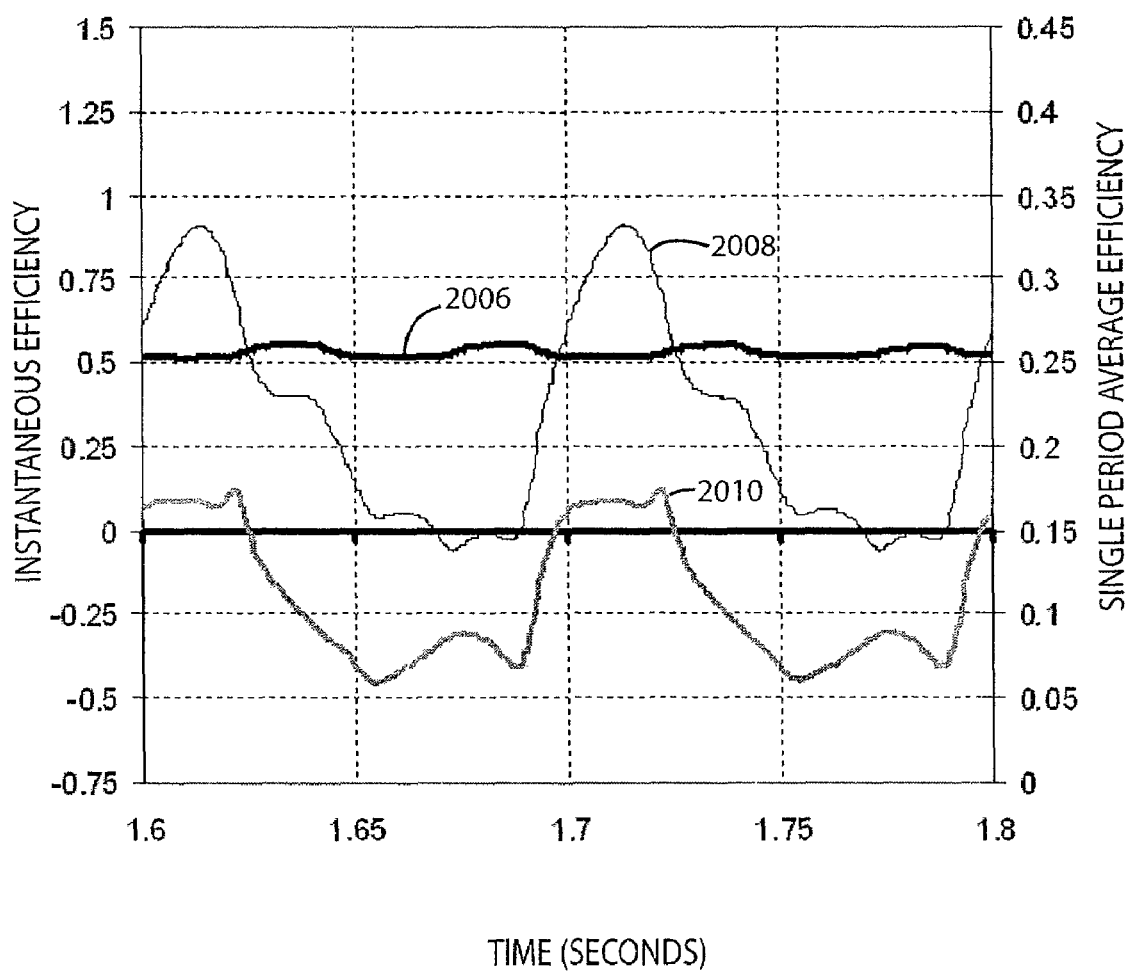
FIG. 20B is an efficiency graph of the embodiment illustrated in FIG. 20A.

FIG. 20B is an illustration of instantaneous efficiency and average efficiency of a single rotor blade versus time for the embodiment illustrated in FIG. 20A. As can be seen from FIG. 20B, the average efficiency illustrated by plot 2006 ranges between 25% and 26%. Plot 2008 illustrates the instantaneous efficiency of the leading face of the rotor blades of the embodiment of FIG. 20A. Plot 2010 illustrates the instantaneous efficiency of the trailing face of the rotor blades. As is apparent from FIG. 20B, the smaller negative pressure area during the power stroke results in much lower efficiencies in the embodiment of FIG. 20A.

Figure 21:
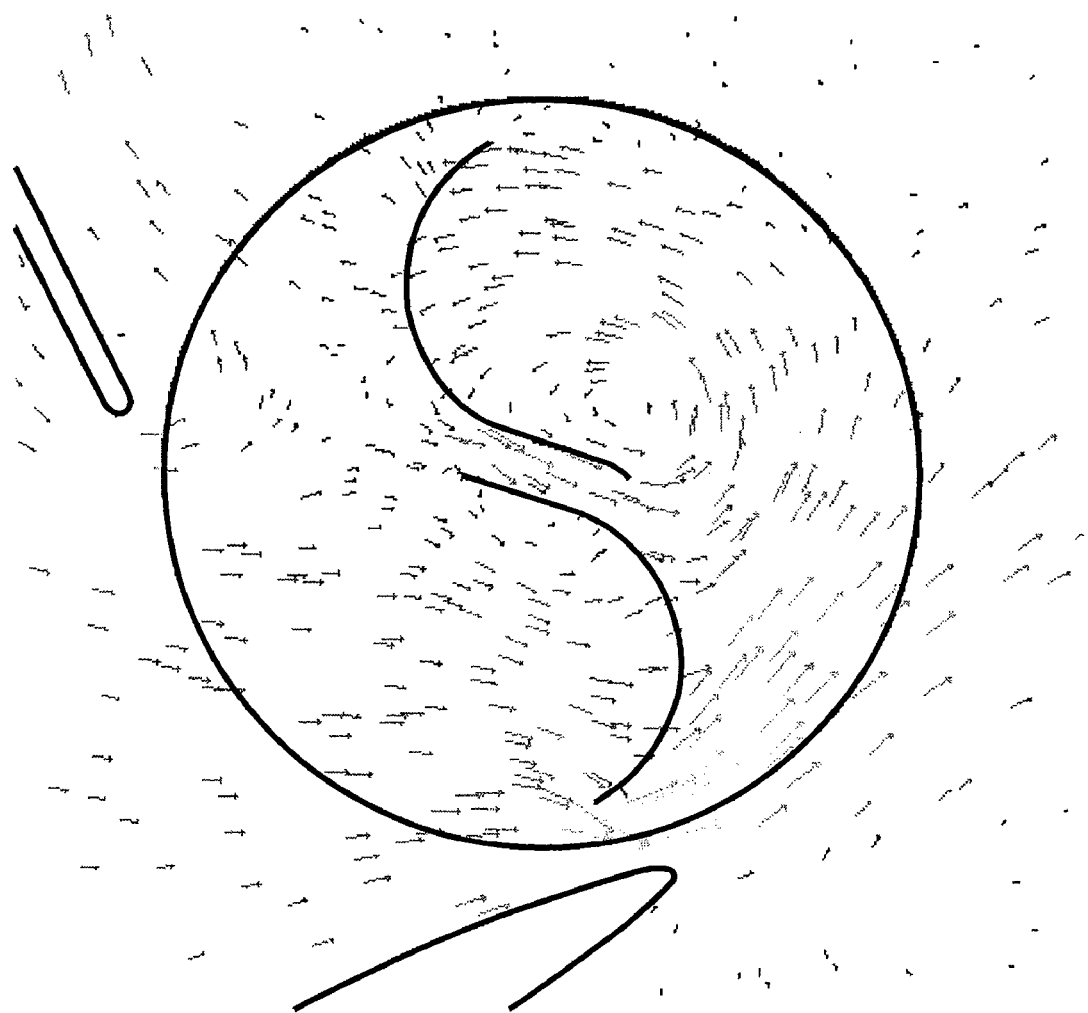
FIG. 21 is a wind velocity and directional flow diagram of the embodiment illustrated in FIG. 20A.

FIG. 21 is a wind velocity and directional flow diagram that illustrate the direction and flow of the wind and its intensity for the embodiment of FIG. 20A. FIG. 21 provides a good visual indication of the operation of the embodiment of FIG. 20A.

Figure 22A:
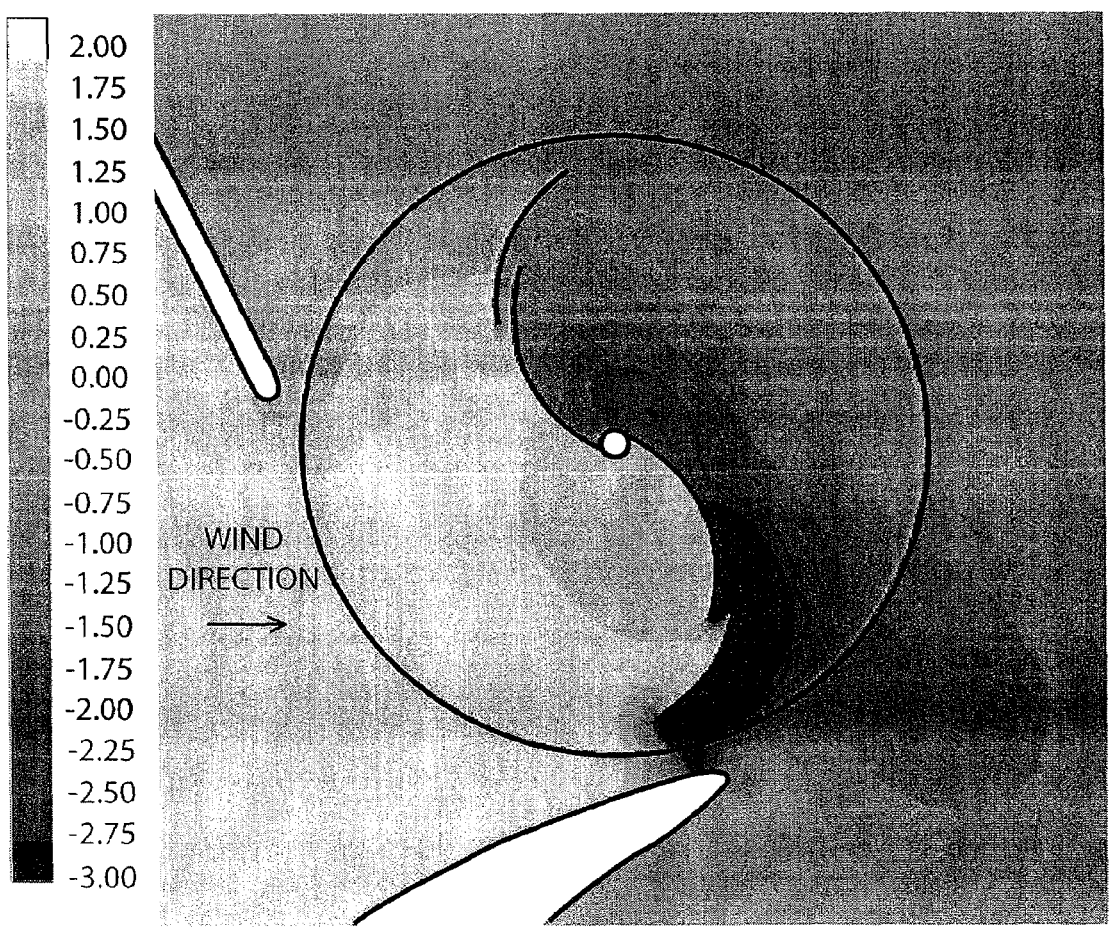
FIG. 22A is an illustration of pressure gradients that are produced by the embodiment of FIG. 22A as calculated from computer simulations using computational fluid dynamics.

FIG. 22A illustrates pressure gradients calculated by computer simulations using computational fluid dynamics for an embodiment of the cross-flow wind turbine that is illustrated in FIG. 22A. The embodiment of FIG. 22A uses a split rotor blade and a small rotating shaft.

Figure 22B:
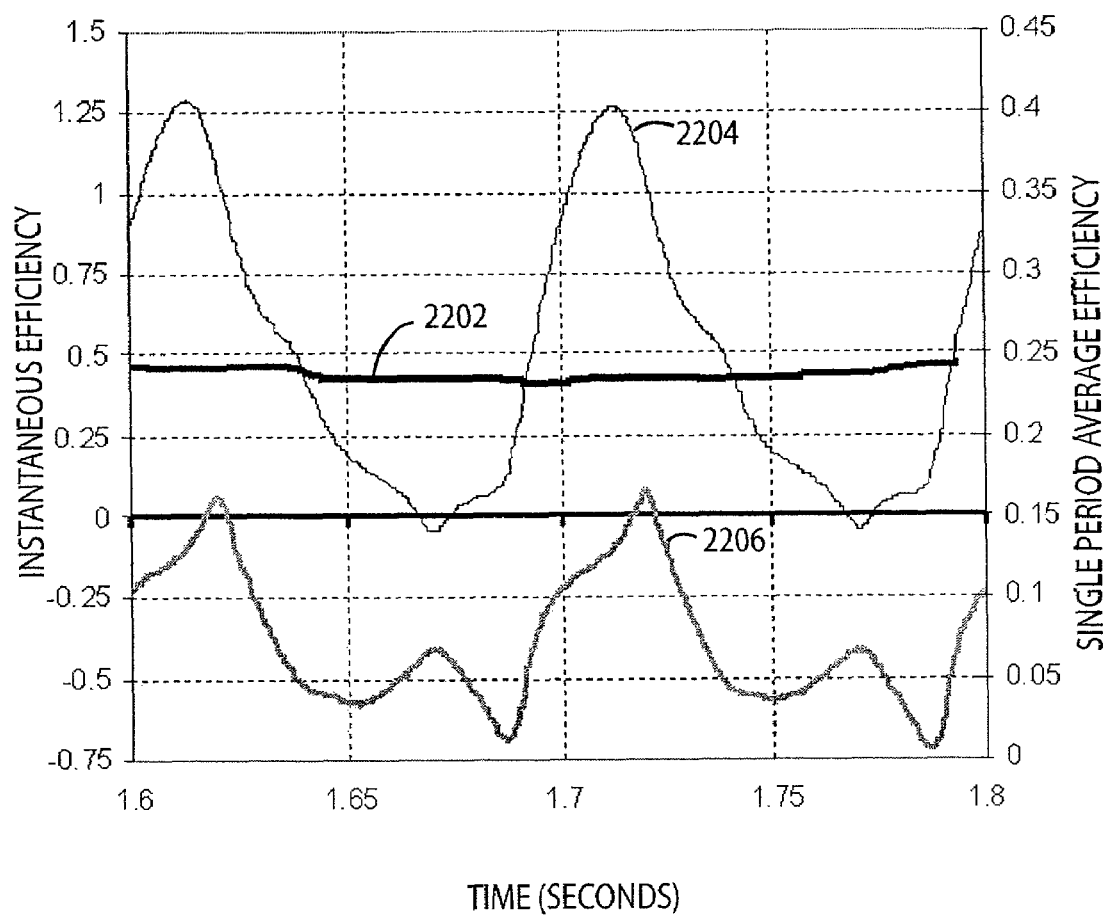
FIG. 22B is an efficiency graph of the embodiment of FIG. 22A.

FIG. 22B is an illustration of instantaneous efficiency and average efficiency of a single rotor blade versus time for the embodiment of FIG. 22A. As can be seen from FIG. 22B, the average efficiency illustrated by plot 2202 ranges between 23% and 24%. Plot 2204 illustrates the calculated instantaneous efficiency of the leading face of the rotor blades of the embodiment of FIG. 22A. Plot 2206 illustrates the instantaneous efficiency calculated for the trailing face of the rotor blades. Efficiencies are calculated in the manner described above.

Figure 23:
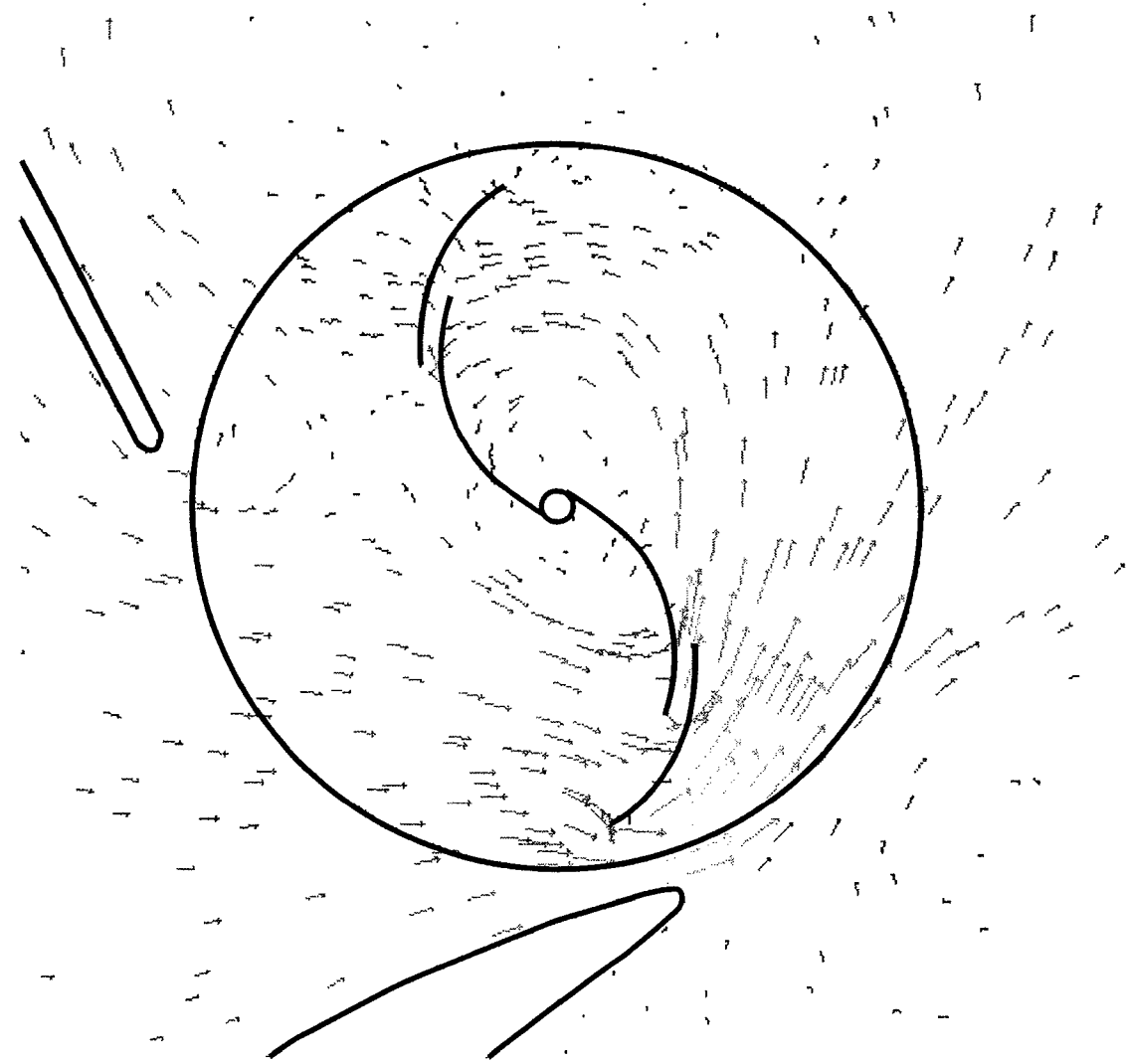
FIG. 23 is a wind velocity and directional flow diagram of the embodiment of FIG. 22A.

FIG. 23 is a wind velocity and directional flow diagram that illustrates the direction of flow of the wind and its intensity for the embodiment of FIG. 22A. FIG. 23 provides a good visual interpretation of the manner of operation of the embodiment illustrated in FIG. 22A.

Figure 24:
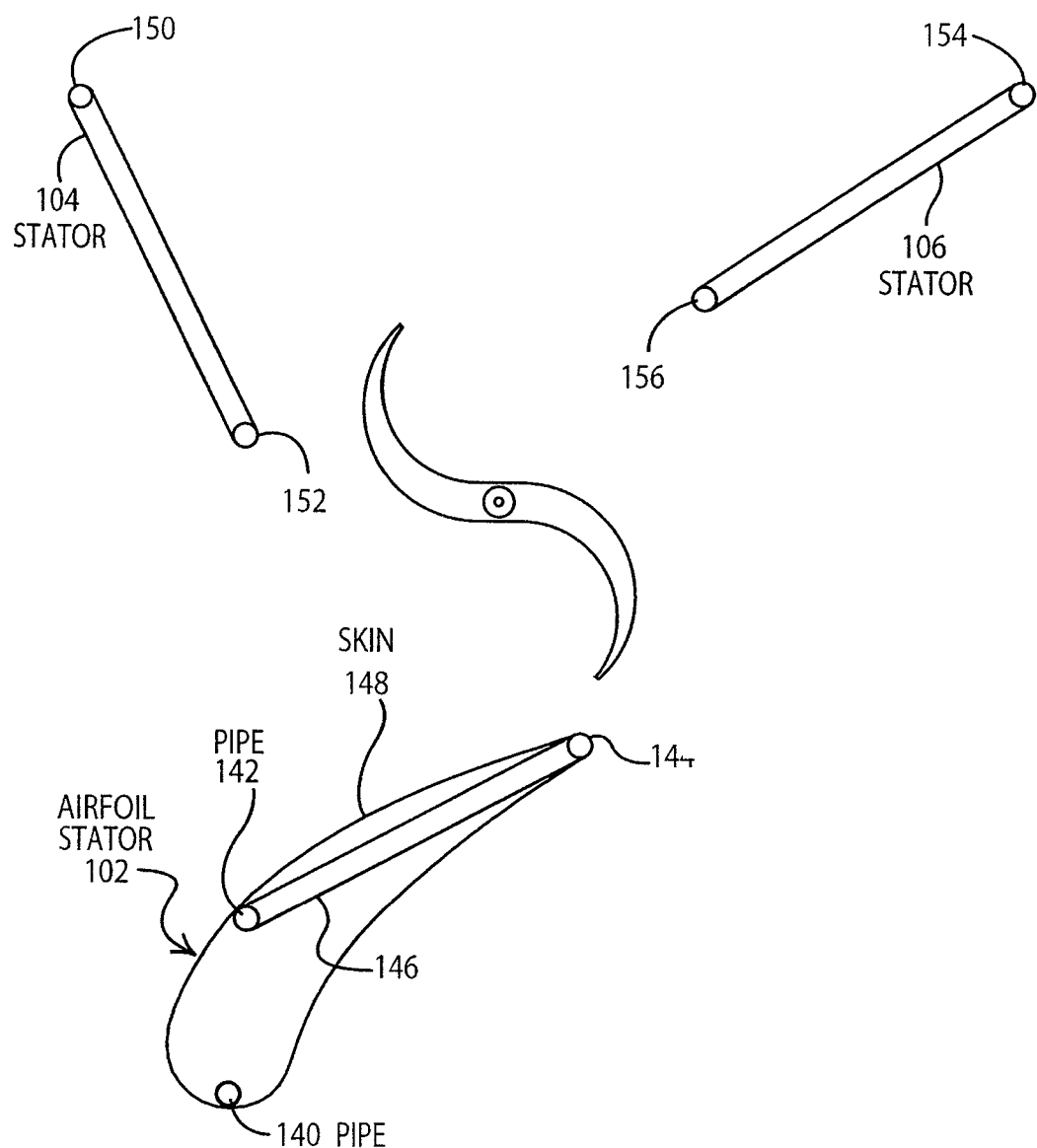
FIG. 24 is a schematic illustration of the manner in which the embodiment of FIG. 1A can be constructed.

FIG. 24 is a schematic illustration of the manner in which the embodiment of FIG. 1A can be constructed. Airfoil stator 102 can be formed by using pipes 140, 142 and 144 to provide structural support. A braced framework 146 can be formed between pipe 142 and 144 to add further structural rigidity. The skin 148 of the airfoil stator 102 can be formed from sheet metal, or any other desired material and can be laser cut to the desired shape shown in FIG. 24. Sheet metal having thicknesses of 14 gauge or 16 gauge, such as used in car fenders, can be employed to provide the desired shape. Other materials can also be used such as light weight laminates. Similarly, stator 104 can be formed by pipes 150 and 152 with standard braced framework that is covered with a sheet metal skin. Stator 106 can include pipes 154, 156 to form a structural member in the same manner as described above. Stators 102, 104, 106 may also be constructed from pre-cast concrete forms, or cast in place concrete forms, or any other construction technique known in the art.

Figure 25:
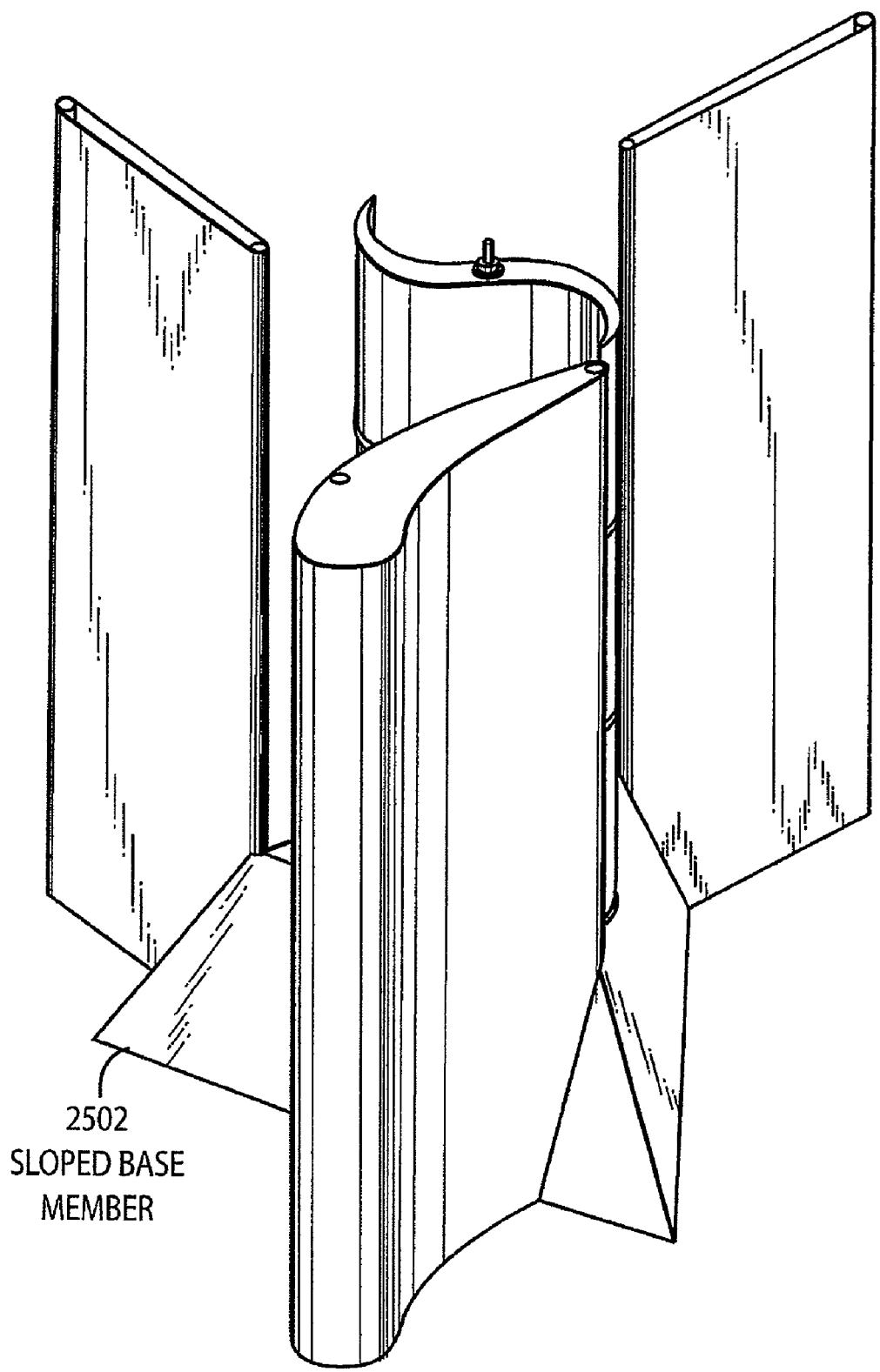
FIG. 25 is an isometric view of the embodiment of FIG. 1A.

FIG. 25 is an isometric view of the embodiment illustrated in FIG. 24 without a top lid. A low base member 2502 may be provided to direct ground winds into the device. This low base member is not a required element of the embodiment illustrated in FIG. 25 and can be replaced with simply a flat base plate.

Figure 26:
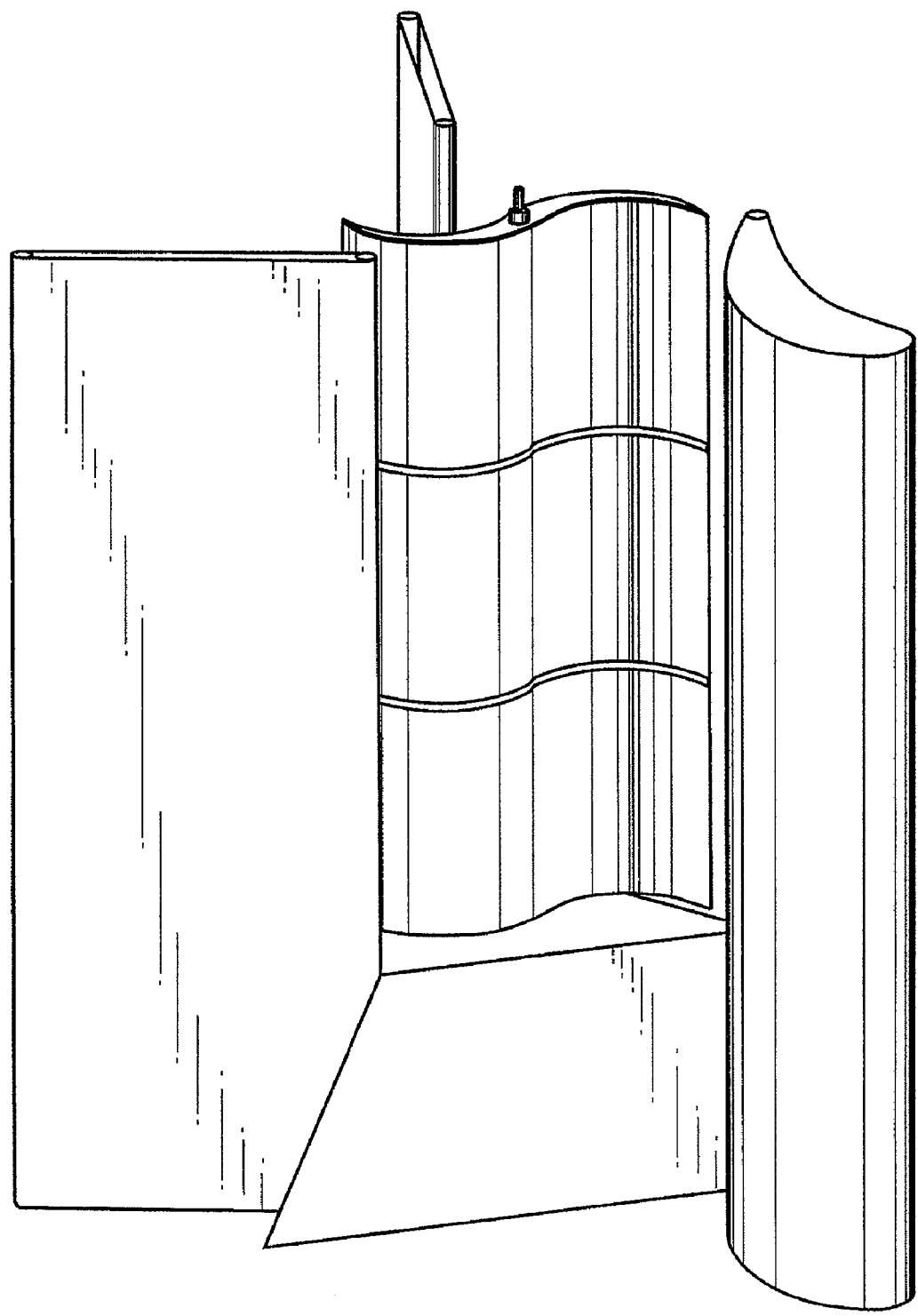
FIG. 26 is an isometric view of the embodiment of FIG. 1A viewed from a different orientation.

FIG. 26 is an isometric view of the embodiment of FIG. 25 that is viewed from a different direction. Again, the embodiment of FIG. 26 is shown without a top plate.

Figure 27:
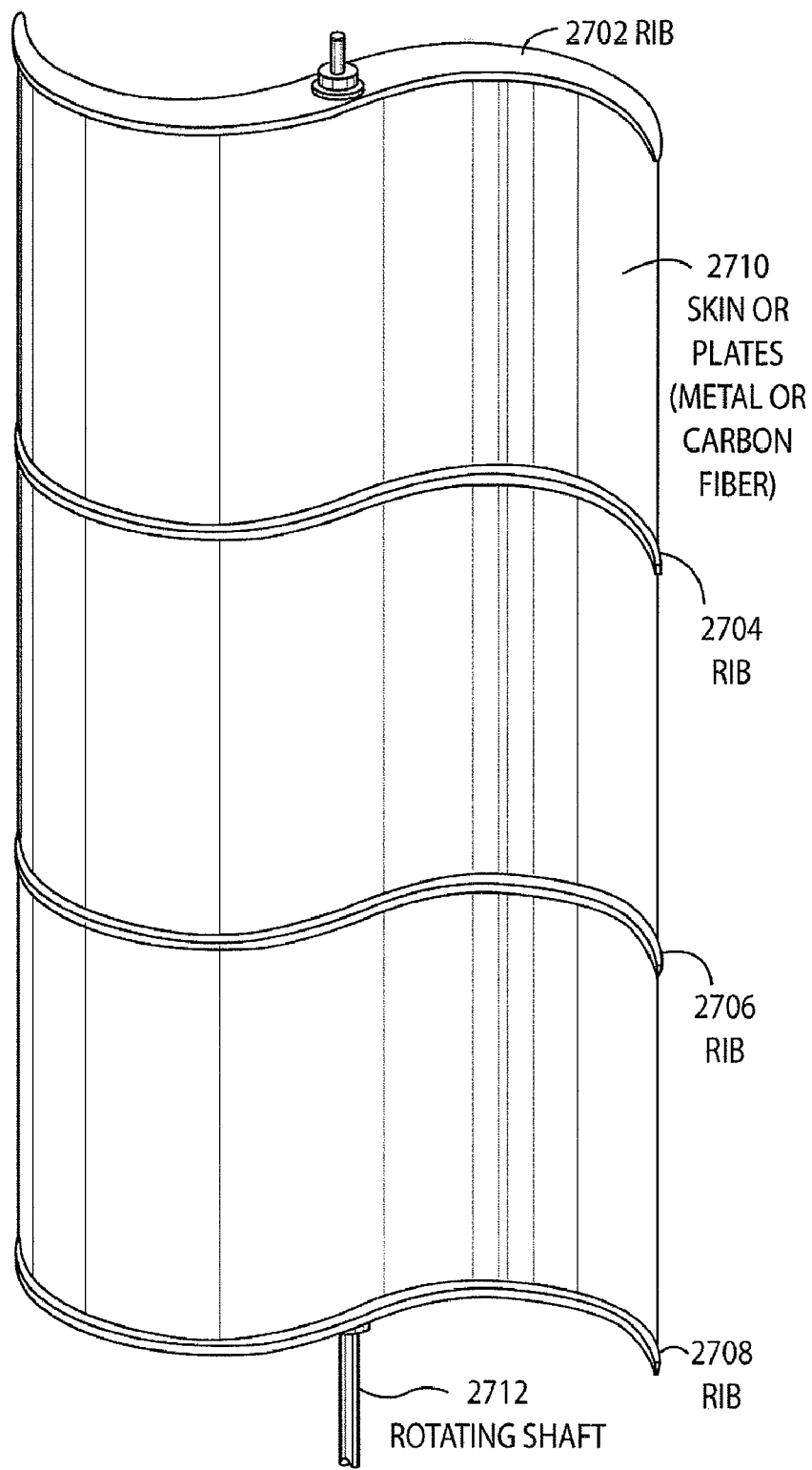
FIG. 27 is an isometric view of the rotor of the embodiment of FIG. 1A.

FIG. 27 is an isometric view of the manner in which the rotor blades can be constructed. As shown in FIG. 27, ribs 2702, 2704, 2706 and 2708 provide structural rigidity and the desired shape of each of the rotor blades. A braced framework (not shown) can be provided between each of the ribs 2702-2708. Skin 2710 is then applied to the surface of the braced framework to form the leading and trailing faces of the rotor blades. Rotating shaft 2712 is connected to each of the ribs 2702-2708 and to the skin 2710. The skin 2710 may be constructed from metal, aluminum, composites, or any other material known in the art.

Figure 28:
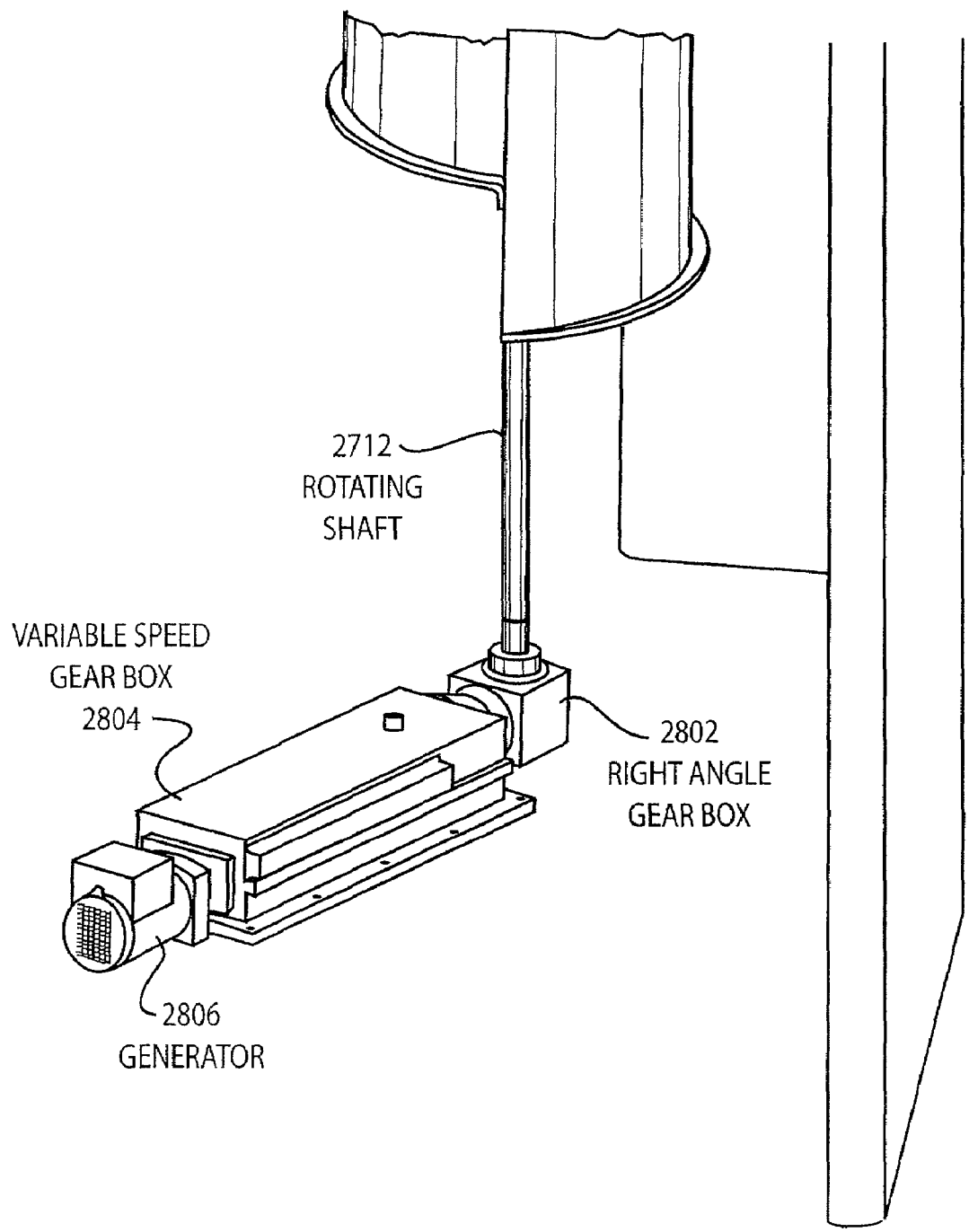
FIG. 28 is a schematic illustration that shows one manner of coupling the shaft of the rotor to a generator.

FIG. 28 is a schematic illustration of one embodiment of a power generation plant that can be used with any of the embodiments disclosed herein. As shown in FIG. 28, a rotating shaft 2712 is connected to a right-angle gear box 2702. Rotational energy is transferred in a horizontal direction to the variable speed gear box 2804. Generator 2806 then generates electrical energy from the mechanical energy of the variable speed gear box 2804.

Figure 29:
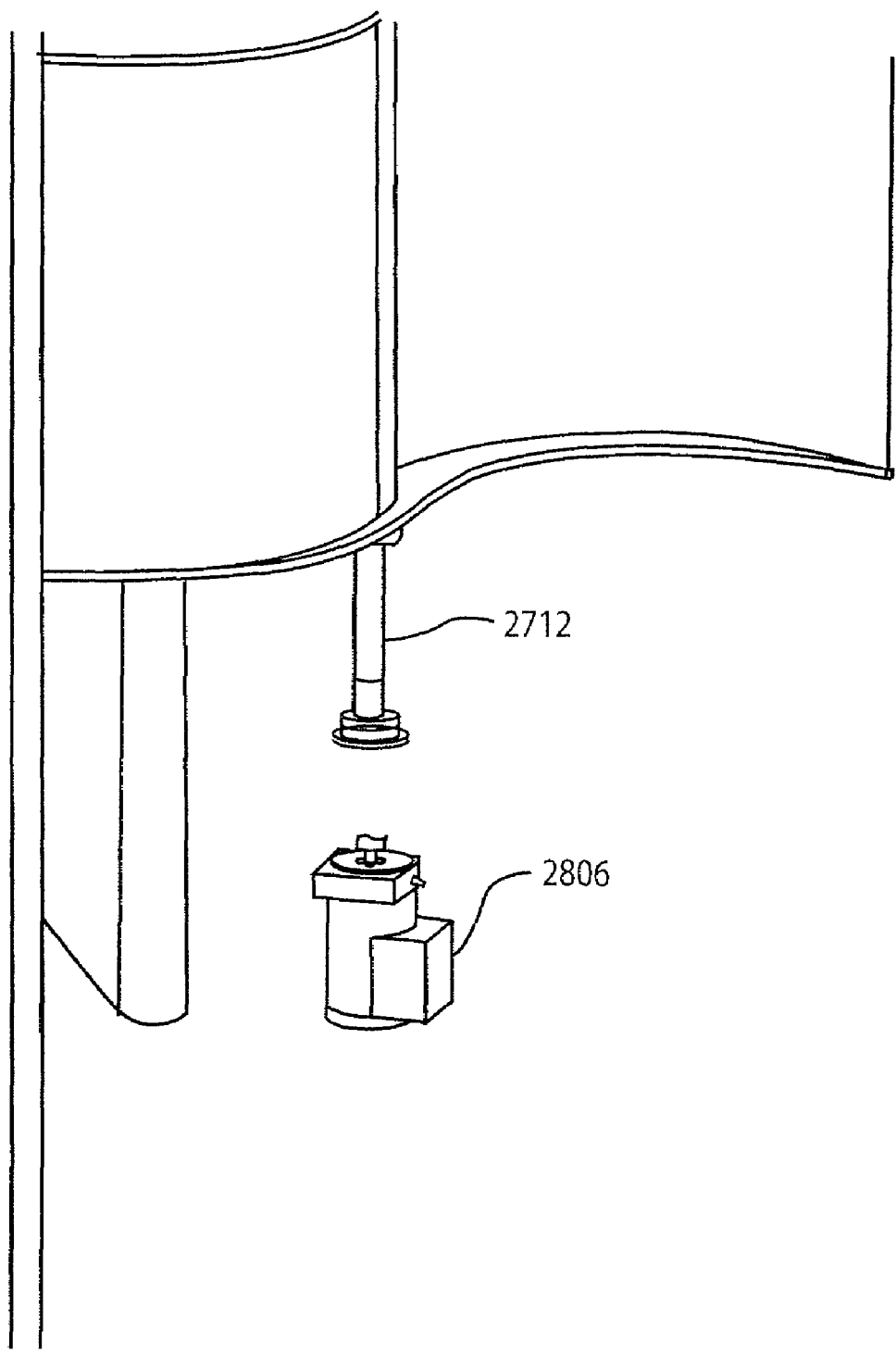
FIG. 29 is a schematic illustration that shows another manner of coupling the shaft to the generator.

FIG. 29 illustrates the manner in which the generator 2806 can be connected directly to the rotating shaft 2712. This direct connection in a vertical manner eliminates mechanical losses resulting from the right angle gear box 2802 and the variable speed gear box 2804. The rotating shaft 2712 may also be directly connected to a direct drive generator. This configuration eliminates any mechanical losses from the gearbox by eliminating the gearbox altogether. Various electrical techniques, known in the art, can be used to generate a 60-cycle signal that can be applied to the electrical grid.

Figure 30A:
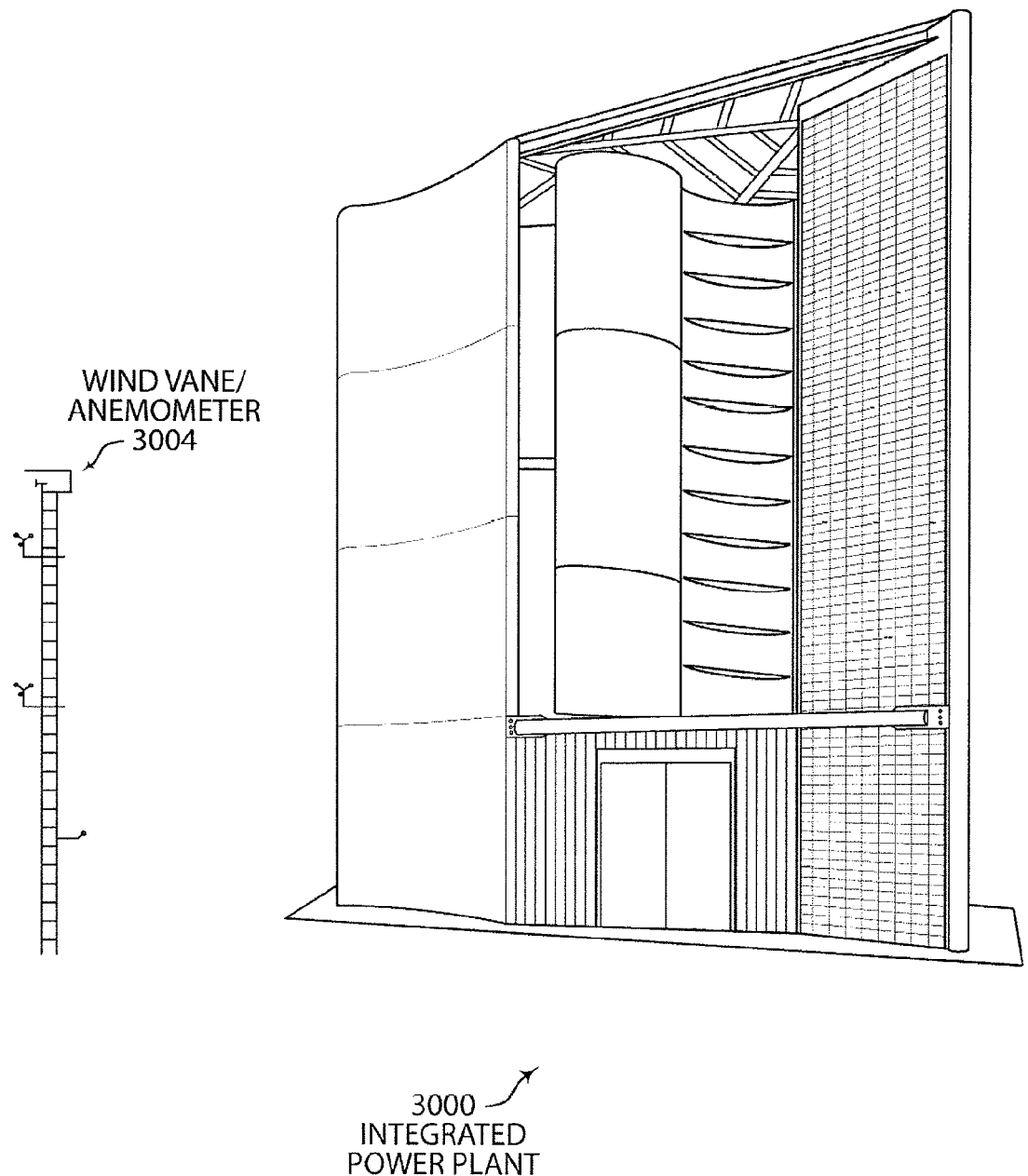
FIG. 30A is a pictorial representation of one embodiment of a cross-flow wind turbine.

FIG. 30A is a schematic block diagram of an embodiment of an integrated power plant 3000. The integrated power plant 3000 may use information generated by a wind vane/anemometer 3004 that provides data relating to wind direction and wind speed. The integrated power plant 3000 and related embodiments are described in more detail below.

Figure 30B:
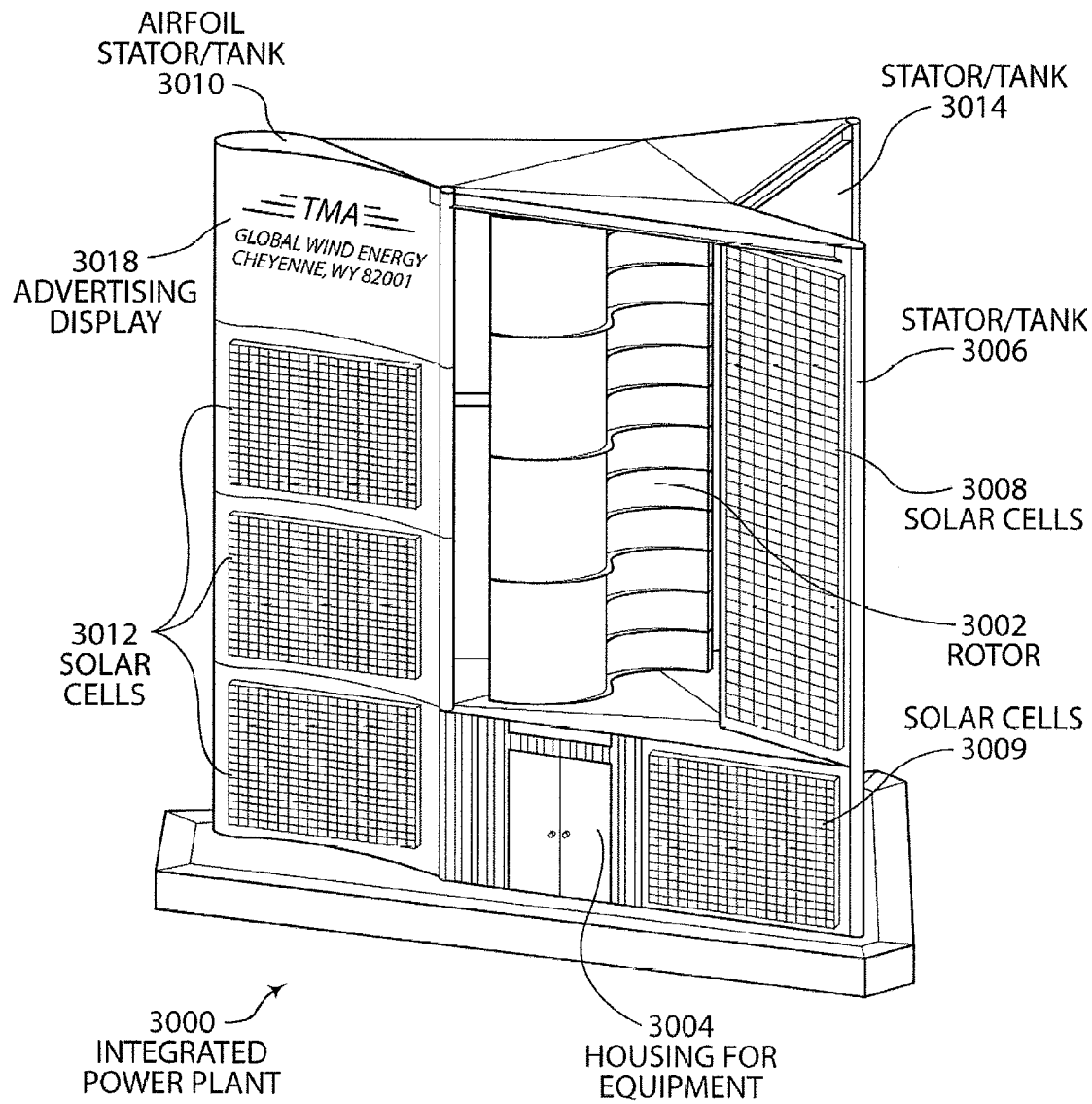
FIG. 30B is a schematic illustration of the cross-flow wind turbine of FIG. 30A.

FIG. 30B is a schematic illustration of the embodiment of the integrated power plant illustrated in FIG. 30A. The integrated power plant 3000 includes a rotor 3002 and three stators 3006, 3010 and 3014. In addition, there is a housing 3004 for housing the various equipment that performs the various tasks of the integrated power plant 3000. As also shown in FIG. 30B, solar cells 3008 are attached to a south facing surface of the stator/tank 3006. Similarly, solar cells 3012 are attached to the south facing surface of the airfoil stator/tank 3010. Solar cells 3009 are attached to a south facing surface of the housing 3004. The stators illustrated in FIG. 30B can be used as tanks for storing various liquids and gases, as disclosed in more detail below. In addition, the surfaces of one or more of the rotors can be used for advertising. For example, as shown in FIG. 30B, the airfoil stator/tank 3010 has an advertising display 3018 on a surface that may face a highway or roadway, or other area where people can observe the advertising display 3018. Companies may wish to place advertising displays, such as advertising display 3018, on the stator surfaces to show their support for renewable energy. If a billboard is going to be built in a windy area, it may be more economically feasible and will generate more goodwill to construct a renewable energy cross-flow wind turbine and place advertising on the stators. Since the cross-flow wind turbine can send energy to the grid in many locations, the capital expenditures for the construction of an advertising display can be reduced.

Of course, any of the surfaces of the stators/tanks 3006, 3010, 3014 can be used for advertising in addition to, or in place of, the solar cells. For surfaces that do not face south, the entire surface of the stators/tanks may be illustrated with advertising material. In addition, the surfaces of the rotor 3002 may also be illustrated with advertising material and can provide an interesting motion to the billboard display. For example, the illustration on the rotor 3002 may provide movement to the overall advertising display that will catch the eye of the viewer. For example, the movement of the rotor may provide the impression of a waving flag or a bucking horse, or any other type of movement that can catch the eye of the viewer and provide an esthetic and unique display.

Figure 31A:
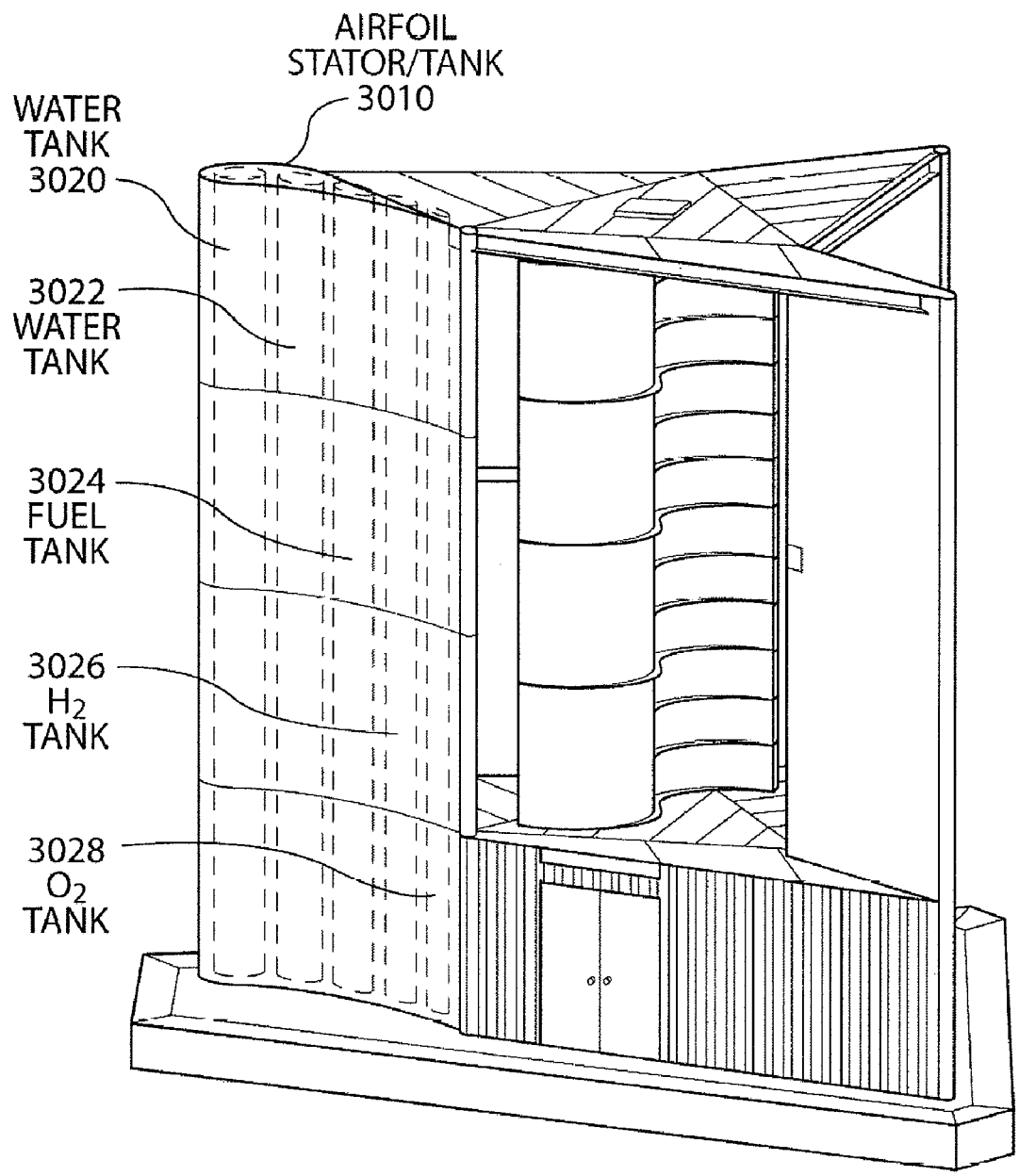
FIG. 31A is a schematic diagram of an embodiment of a cross-flow wind turbine showing the use of tanks in the stators.

FIG. 31A is an illustration of the manner in which various types of tanks may be included in the airfoil stator/tank 3010. As shown in FIG. 31A, round or oval water tanks 3020, 3022 can be included in the interior portion of the airfoil stator 3010. In addition, a fuel tank 3024 that may store propane gas, natural gas, diesel fuel, or other fuel may also be included in the interior portion of the airfoil stator 3010. Further, a hydrogen tank 3026 and an oxygen tank 3028 may also be included in the interior portion of the airfoil stator 3010. Of course, any of the stators can include any of the various types of tanks for storing various liquids and gases, as desired.

Figure 31B:
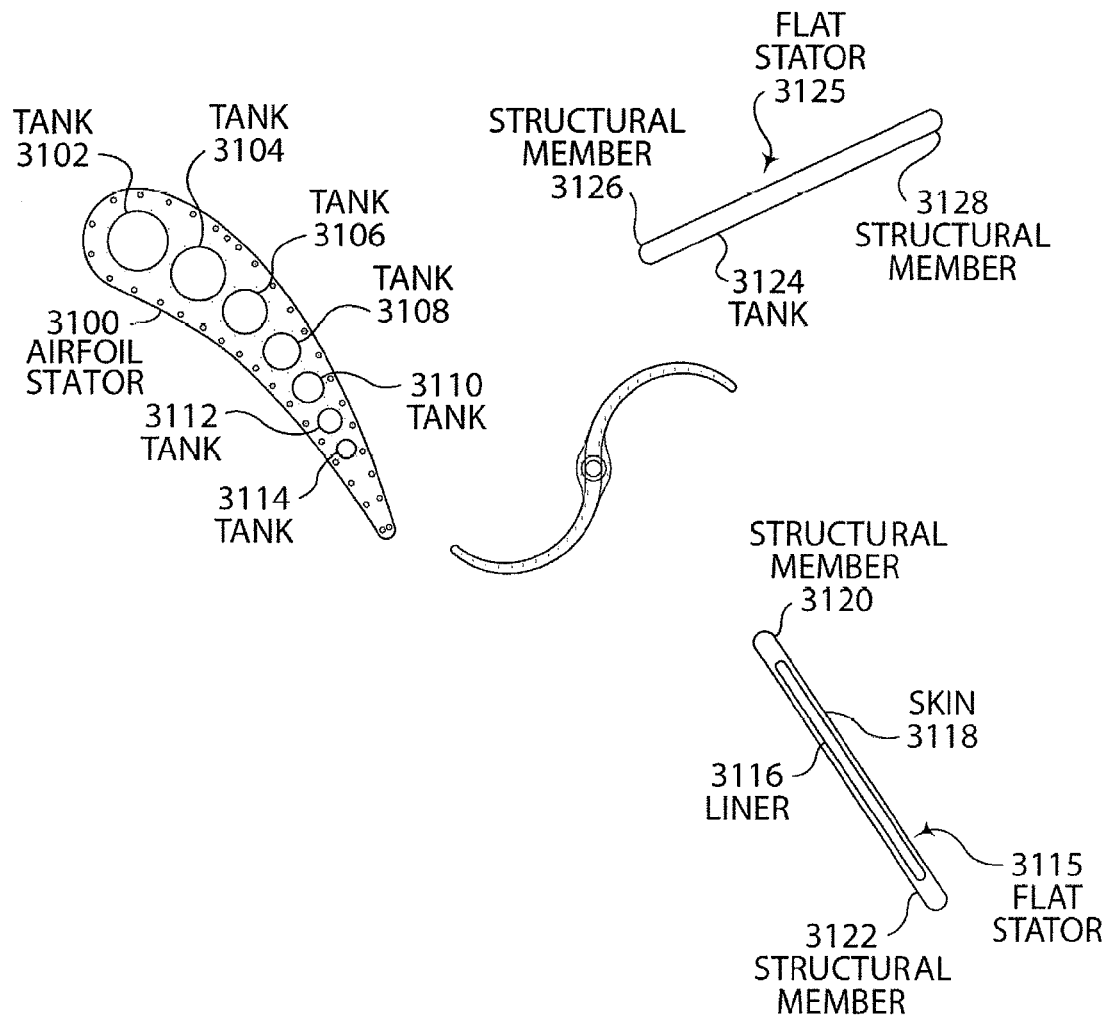
FIG. 31B is a top view of the embodiment of FIG. 31A.

FIG. 31B illustrates the various types of tanks that can be included in the stators. As shown on FIG. 31B, airfoil stator 3100 includes multiple tanks 3102, 3104, 3106, 3108, 3110, 3112, and 3114. Each of these tanks can carry any desired type of liquid or gas. For example, any one of the tanks 3102-3114 could be used to store water that is purified by the integrated power plant. Further, diesel fuel, propane fuel, or natural gas could also be stored in any one of the tanks 3102-3114 for supplying a fuel to operate the integrated power plant, as described in more detail below, or to store hydrogen and oxygen in a compressed form for various purposes, as also described below.

As also disclosed in FIG. 31B, flat stator 3115 utilizes a liner 3116 that lines the interior portion of the flat stator 3115 to form a tank for holding fluids or gases. Liner 3116 may be made of plastic, steel or other liner material that is capable of holding liquids or gases. A skin 3118 can then be placed over the outside portion of the liner 3116 between the structural members 3120, 3122 that form the outer surface of the flat stator 3115.

As also shown in FIG. 31B, flat stator 3125 may include a tank 3124 that is disposed between the structural members 3126, 3128, such that the outer surface of the tank 3124 comprises the outer surface of the flat stator 3125. The tank 3124 can be made from composite materials, steel or other metals, and can be made to hold various liquids and gases. Any of the stators can store liquids or gases in any of the ways illustrated.

Figure 32:
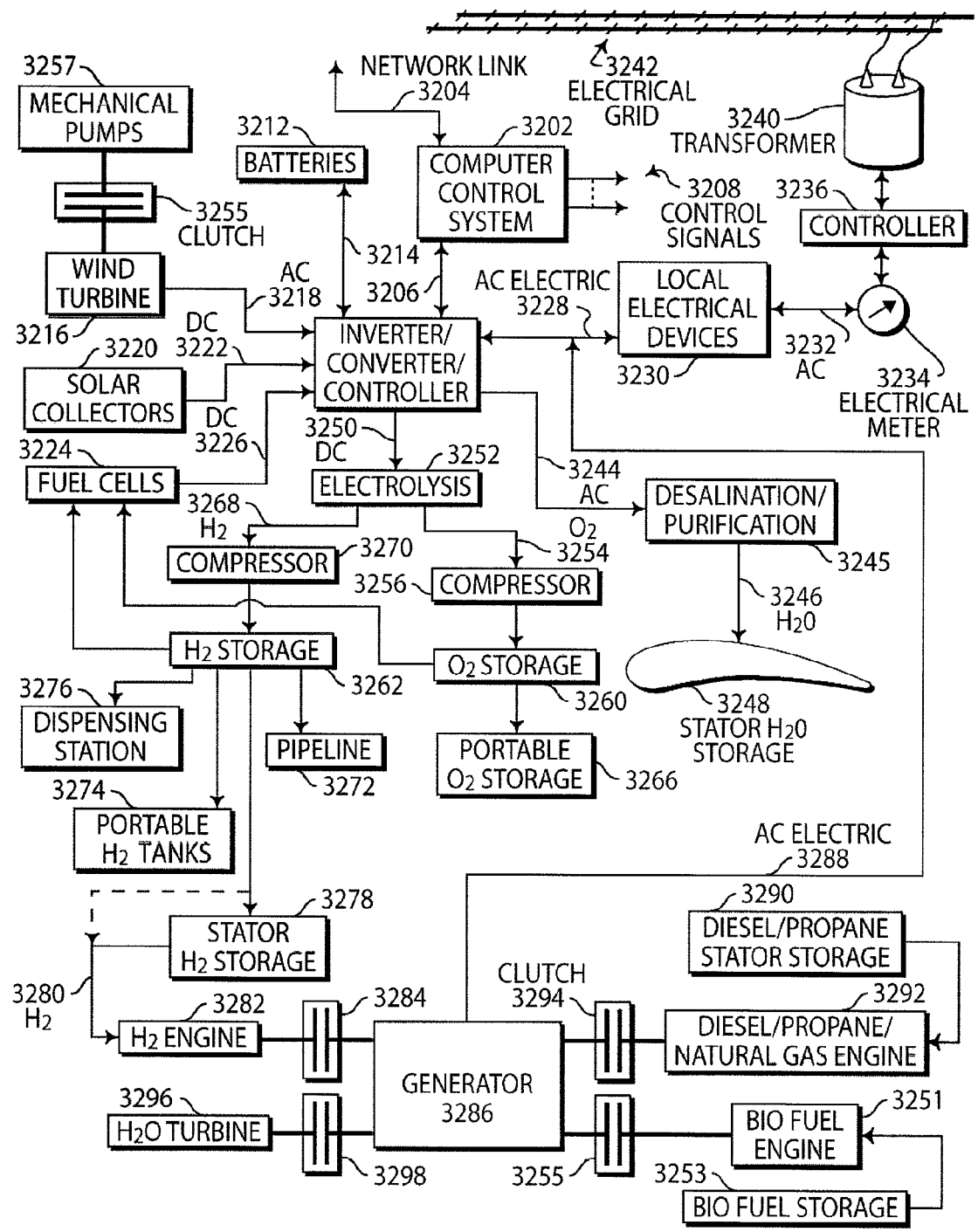
FIG. 32 is a schematic block diagram illustrating operating components of one embodiment of an integrated power system.

FIG. 32 is a block diagram illustrating the various operational features that can be included in one or more embodiments of an integrated power plant. As illustrated in FIG. 32, a computer control system 3202 is connected to a network link 3204 that allows for the communication of programming controls to the computer control system 3202 by a computer system (not shown) over the network link 3204. The computer control system 3202 generates various control signals 3208 that control the operation of the various devices illustrated in FIG. 32, in accordance with a programmable logic controller, a processor, or programmable state machine that is used in the computer control system 3202. The logic decisions to be used by the computer control system 3202 can be transmitted over the network link 3204. The logic stored in the computer control system 3202 can be modified, as desired, by a systems operator connected to the network link 3204. A communications link 3206 is also provided between the computer control system 3202 and the inverter/converter/controller 3210. Data signals, as well as control signals, are provided between the computer control system 3202 and inverter/converter/controller 3210 over communications link 3206. The inverter/converter/controller performs various functions. For example, the inverter portion of device 3210 generates a 60 Hz, 220 volt RMS AC electrical signal that is locked to the phase of the electrical grid 3242.

As also illustrated in FIG. 32, solar collectors may be included on the south facing surfaces (in the northern hemisphere) of the integrated power plant that generates a DC signal 3222 that is applied to the inverter/converter/controller 3210. Similarly, fuel cells may be housed in housing 3004 (FIG. 30B) that generate a DC signal 3226 that is also applied to the inverter/converter/controller 3210. Wind turbine 3216 generates an AC electrical signal 3218 that is also applied to the inverter/converter/controller 3210. Batteries 3212 are connected to the inverter/converter/controller 3210 via connection 3214. Batteries 3212 can be charged from the inverter/converter/controller 3210 or supply a DC voltage to the controller 3210.

As further shown in FIG. 32, the controller 3210 provides an AC electrical signal 3244 that is applied to the desalinization/purification device 3245. Desalination/purification device 3245 may use any acceptable process for desalination and purification of water. For example, if the integrated power plant is located near a body of salt water, the desalination/purification device 3245 is capable of both desalinating the salt water and purifying the desalinated water 3246 that can then be stored in a stator, such as stator 3248. An example of a system that can be used is a system provided by Tomorrows Energy Choices, Inc., 6255 North Main Street, Atlanta, Ga., 30101, that uses steam capitation technology and distillation processes for generating clean, fresh water. If the supply of water does not contain salt, but merely requires purification, other processes, such as reverse osmosis, can also be used to purify the water.

The controller 3210 can also generate a DC electrical signal 3250 that can be applied to an electrolysis device 3252 to generate oxygen and hydrogen from water. Any type of suitable electrolysis system can be used, such as the Hogan Hydrogen Generator available from Distributed Energy Systems, located at 10 Technology Drive, Wallingford, Conn. 06492, or the Hydrofiller from Avalence, LLC, located at 1240 Oronoque Road, P.O. Bos 2246, Milford, Conn., 06460-1146. The oxygen 3254 that is generated by the electrolysis system 3252 can be sent to a compressor 3256, which compresses the oxygen and supplies the compressed oxygen to an oxygen storage tank 3260. The oxygen storage tank can be used to fill portable oxygen tanks 3266 for transport to other locations. The oxygen 3254 generated by the electrolysis system 3252 is medical grade oxygen. Currently, in the United States, supplies of oxygen must be transported long distances because of the dearth of oxygen generating plants. Generation of oxygen using wind energy will greatly reduce the cost of oxygen supplies that can be used for both medical and industrial purposes, as a result of the reduced transportation costs and reduced operational cost, as the integrated power plant is amortized over time. The oxygen stored in oxygen storage tank 3260 can also be applied to fuel cell 3224. The hydrogen 3268 generated by the electrolysis system 3254 can be compressed by a compressor 3270 and stored in a hydrogen storage tank 3270. The hydrogen stored in hydrogen storage tank 3262 can also be applied to fuel cell 3224. Fuel cell 3224 generates a DC electrical signal 3226 in response to the hydrogen and oxygen supplied to the fuel cell 3224. The DC electrical signal 3226 from fuel cell 3224 is then applied to the inverter/converter/controller 3210. The fuel cell 3224 can be housed in the housing 3004 (FIG. 30B), together with other components illustrated in FIG. 32. Fuel cell 3224 may comprise any suitable fuel cell system, such as manufactured by Plug Power, Inc., located at 968 Albany-Shaker Road, Latham, N.Y., 12110.

As also illustrated in FIG. 32, the hydrogen storage tank 3262 can also supply hydrogen to a pipeline 3272 to pipe hydrogen to other locations. Further, hydrogen from the hydrogen storage tank 3262 can be used to fill portable hydrogen tanks 3274 for transport to other locations. Further, hydrogen storage tank 3262 can be connected to a dispensing station 3276 to dispense hydrogen for various purposes, such as for use in hydrogen vehicle. Various additional pumping and compressing devices may be used in the dispensing station 3276. Hydrogen stored in the hydrogen storage tank 3262 may also be supplied to a hydrogen storage tank in a stator 3278. Alternatively, the hydrogen storage tank 3262 may comprise a hydrogen storage tank disposed in a stator. Hydrogen 3280 from hydrogen storage tank 3262 or stator hydrogen storage tank 3278 can also be supplied to a hydrogen engine 3282 that can be used to run a generator 3286. Clutch 3284, as well as the hydrogen engine 3282 and various valves, can be controlled by control signals 3208 generated by the computer control system 3202.

As also illustrated in FIG. 32, mechanical energy from the wind turbine 3216 can be used to operate mechanical pumps 3257. Clutch 3255 can be used to activate the mechanical pumps 3257 in response to a control signal 3208 generated by the computer control system 3202. Mechanical pumps can be used to pump water to a water tower to provide a supply of pressurized water. Also, the mechanical pumps can pump water to a higher reservoir for generation of hydroelectric power using a water turbine 3296. Direct usage of the mechanical energy to operate the mechanical pumps 3257 prevents losses in the conversion of mechanical energy to electrical energy and back. However, electrical pumps can be used to pump water to a higher elevation if desired. The water can then be used to run a water turbine that is coupled to a generator for later use in generating hydroelectric power, such as during peak usage hours, or when electricity is needed by local electrical devices 3230.

One of the problems in generating electrical energy from renewable energy sources has been that peak usage of energy, or even primary uses of energy, do not necessarily coincide with the times when renewable energy is generated. For example, it has been found in California that much of the wind energy is generated at night, when there is very low energy usage. Hence, there is an oversupply on the grid at night when wind energy is usually at its peak. Hence, storage of energy for use during peak usage periods has become a prime concern for generation of electrical energy using renewable energy sources. Pumping water uphill is one way of storing energy for use during peak periods when the supply of energy is needed the most. Customers are charged very high rates for usage of electricity during peak hours. Conversely, utility companies may be required to purchase energy generated during peak usage periods at similarly high rates. Hence, the ability to provide a source of stored energy that can be used to supply the grid during peak periods is an important aspect of all renewable energy sources. The ability to use the direct mechanical power with increased efficiency to pump water to a higher elevation using mechanical pumps 3257 provides a way of storing energy from the cross-flow wind turbine mechanical energy source, at any time, for usage when the electrical energy is needed. Of course, such a system may only be feasible if water sources are available and reservoirs or tanks can be provided economically, which is dependent upon the location and the geographical features adjacent to the location of the cross-flow wind turbine system. To generate electricity, water can be directed to water turbine 3296 from a reservoir or tank located at a higher elevation to operate the water turbine 3296 during certain periods of high energy usage, such as warm summer afternoons and evenings, or when electricity is needed, if the integrated power plant is not connected to the electrical grid 3242. Clutch 3298 can be activated in response to a control signal 3208. In addition, a water valve (not shown) may also be activated to supply the water to the water turbine 3296 in response to a control signal 3208 generated by the computer control system 3262.

The mechanical pumps 3257 illustrated in FIG. 32 may also be used for other purposes. The pumps may be used for sewage treatment in a sewage treatment plant that may be located near the integrated power plant. The integrated power plant of FIG. 32 also includes a generator 3286 for generating AC electrical power 3288 whenever electrical power is needed, such as when the electrical grid 3242 is down or the integrated power plant is not connected to the electrical grid 3242. The electrical power 3288 can be used by the local electrical devices 3230 or the various devices connected to the inverter/converter/controller 3210 when other power sources are not available. The generator 3286 can be operated using the hydrogen engine 3282, a water turbine 3296, a diesel/propane/natural gas engine 3292 or a biofuel engine 3251. All of these sources of power for the generator 3286 are low polluting or non-polluting sources of energy, which further adds to the environmentally friendly nature of the integrated power plant.

Biofuel engine 3251 may operate on a local source of biofuel that can be stored in a biofuel storage tank 3253, which may be located in one of the stators. The biofuel may comprise any desired mix of diesel and biofuel, including B20 or B30 fuel. Clutch 3253 can be activated in response to control signals 3208 to operate generator 3286 when the biofuel engine 3251 is activated.

As also illustrated in FIG. 32, a diesel/propane/natural gas engine 3292 can be activated in response to control signals 3208, which also activates clutch 3294 to operate the generator 3286. The diesel/propane/natural gas storage tank 3290 can be located in a stator, as disclosed above. The diesel/propane/natural gas engine 3292 may be activated if all of the other supplies of energy have been exhausted.

As indicated above, generator 3286, illustrated in FIG. 32, generates an AC electrical signal 3288 that is applied to the local electrical devices 3230. In addition, the output of the inverter/converter/controller 3210 is also applied to the local electrical devices 3230. The local electrical devices may include the electrical devices of one or more houses, one or more commercial buildings, a small village or neighborhood, a manufacturing plant, lights for illuminating the advertising displays on the stators, and other local electrical needs. In some cases, the integrated power plant may be isolated from an electrical grid and may operate to only supply the local electrical devices 3230. In other instances, the integrated power plant may be connected to the electrical grid 3242 and provide electrical energy to the grid. For example, as illustrated in FIG. 32, an electrical connector 3232 connects the energy that is not used by the local electrical devices to an electrical meter 3234. The electrical meter 3234 is in turn connected to a controller 3236 and then to a controller 3236 and then to a transformer 3240, that is connected to the electrical grid 3242. Each of the connections between the inverter/converter/controller 3210, the local electrical devices 3210, the electrical meter 3234, the controller 3236, and the transformer 3240 are shown as bidirectional arrows, since electrical energy may flow from the electrical grid 3242 into the systems shown in FIG. 32, or may flow outwardly from the systems shown on FIG. 32 to the electrical grid 3242 under the control of controller 3236. When excess energy is being generated by the system illustrated in FIG. 32, energy flows onto the electrical grid 3242 and the electrical meter 3234 is driven in a backwards direction so that the system is making money by supplying electrical energy to the electrical grid 3242. Control mechanisms, such as control mechanism 3236, controls the application of electrical energy onto the grid and may provide calculation of credits for application of energy onto the grid, rather than simply running the electrical meter backwards, which does not account for the application of electrical energy to the grid during different time periods.

In operation, the inverter/converter/controller 3210 may include a programmable logic controller, a processor, or programmable state machine that is controlled by the computer control system 3202 via link 3206. The controller 3210 can be programmed for various situations.

In a first situation, the integrated power plant is not connected to the grid and operates as an independent integrated source of electrical energy to operate the local electrical devices and may also be used to provide clean water, as well as medical grade oxygen and hydrogen for various uses. In addition, the system may use mechanical pumps to pump water to water towers or other locations and therefore provide a source of pressurized water. The mechanical pumps, as disclosed above, can also be used to pump water to a higher elevation for later use in running the water turbine 3296. In this manner, energy from the wind turbine 3216 and the solar collectors 3220 can be stored for later use. The mechanical pumps can also be used for waste treatment and to assist and operate a sanitation plant, as an integrated self-sufficient system. As indicated above, desalination and purification systems are incorporated in the integrated power plant that provide desalination and/or purification of water that can be stored within the structure of the device to provide a clean source of water and an independent, substantially self-sufficient electrical power plant. In this instance, the controller 3210 can be programmed to first provide for the electrical requirements of the local electrical devices 3230 from the wind turbine 3216 and solar collectors 3220. The DC voltage provided by the solar collectors 3230 is inverted by the inverter portion of the inverter/converter/controller 3210. The inverter produces a 60 cycle, 220 volt RMS AC electrical signal 3228 that is applied to the local electrical devices 3230. The wind turbine 3216 includes a generator that generates an AC electrical signal 3218 that has a frequency which varies with the speed of the rotation of the rotor device. That AC electrical signal is converted to a DC signal either in the converter portion of inverter/converter/controller 3210 or in a converter mounted on the generator. The inverter portion of inverter/converter/controller 3210 then inverts that DC electrical signal into AC electrical signal 3228, which is applied to the local electrical devices 3230. If the requirements of the local electrical devices 3230 are less than the amount of power that is being supplied by wind turbine 3216 and/or solar collectors 3230, the excess energy can then be used to charge batteries 3212, as well as other functions, as described herein. Also, inverter/converter/controller 3210 receives the DC voltage from solar collectors 3222 and converts the DC power from the solar collectors to a DC voltage signal for recharging batteries 3212 or for performing electrolysis in electrolysis device 3252 or other functions. Similarly, the AC electrical signal 3218 from wind turbine 3216 can be converted to a DC signal having a proper voltage to charge batteries 3212, or for performing electrolysis in electrolysis device 3252.

Once the batteries 3212 are charged, any excess energy can then be routed to desalination/purification device 3245 or electrolysis device 3252, depending upon the priorities that are set in computer control system 3202 for controlling the system illustrated in FIG. 32. The use of excess electrical energy to perform electrolysis or desalination/purification, or both simultaneously, can be programmed into the programmable logic controller or processor in inverter/converter/controller 3210 in accordance with the desired operating procedures and priorities that are set in the system. In addition, water level detectors can be used in the water storage tanks, such as water storage tank 3248, which can signal the controller 3210 to produce water if water levels go below a certain amount. If the generation of water is a high priority item for the independent, stand alone integrated power plant, energy from wind turbine 3216 and/or solar collectors 3220 may be directed to the desalination/purification device 3245 without supplying power to the local electrical devices 3230. Similarly, if water levels reach a very low level and energy is not available from the wind turbine 3216 or the solar collectors 3220, battery power from batteries 3212, fuel cells 3224, or engines that operate generator 3286, such as the hydrogen engine 3282, the water turbine 3296, the biofuel engine 3251, or the diesel propane engine 3292, can be used to generate power for the sole purpose of producing water when low levels are detected in the storage tanks. Of course, prioritization levels can be easily programmed into the controller 3210 using the computer control system 3202 and the network link 3204. Similarly, the priority level for generating hydrogen or oxygen supplies can also be set based upon the necessity of generating hydrogen and oxygen for various purposes, such as a stored fuel that can be used when alternative energy sources are not available. Also, storage of energy in the form of water that is pumped using mechanical pumps 3257 to a reservoir at a higher elevation or tank at a higher elevation for the purposes of storing energy can be prioritized, based upon the specific needs of the integrated energy plant. Also, supplying energy to the electrical grid 3242 can be prioritized according to the purposes of the integrated power plant, as described below.

In a second situation, the integrated power plant may be connected to the electrical grid 3242. In that case, different priorities may exist. For example, a primary purpose for the integrated power plant may be to generate electricity that can be supplied to the electrical grid. In those cases, it may be desirable to supply electrical energy to the grid such that the cross-flow wind turbine and solar collectors can reduce the usage of grid power by the local electrical devices 3230 and supply electrical power to the electrical grid 3242 in high wind conditions or sunny conditions when the usage by local electrical devices 3280 is low, so that the capital investment in the system can be reduced. Hence, the prioritization of the usage of the power generated by the integrated system for the various purposes shown and the storage of power, can be prioritized as desired.

Figure 33:
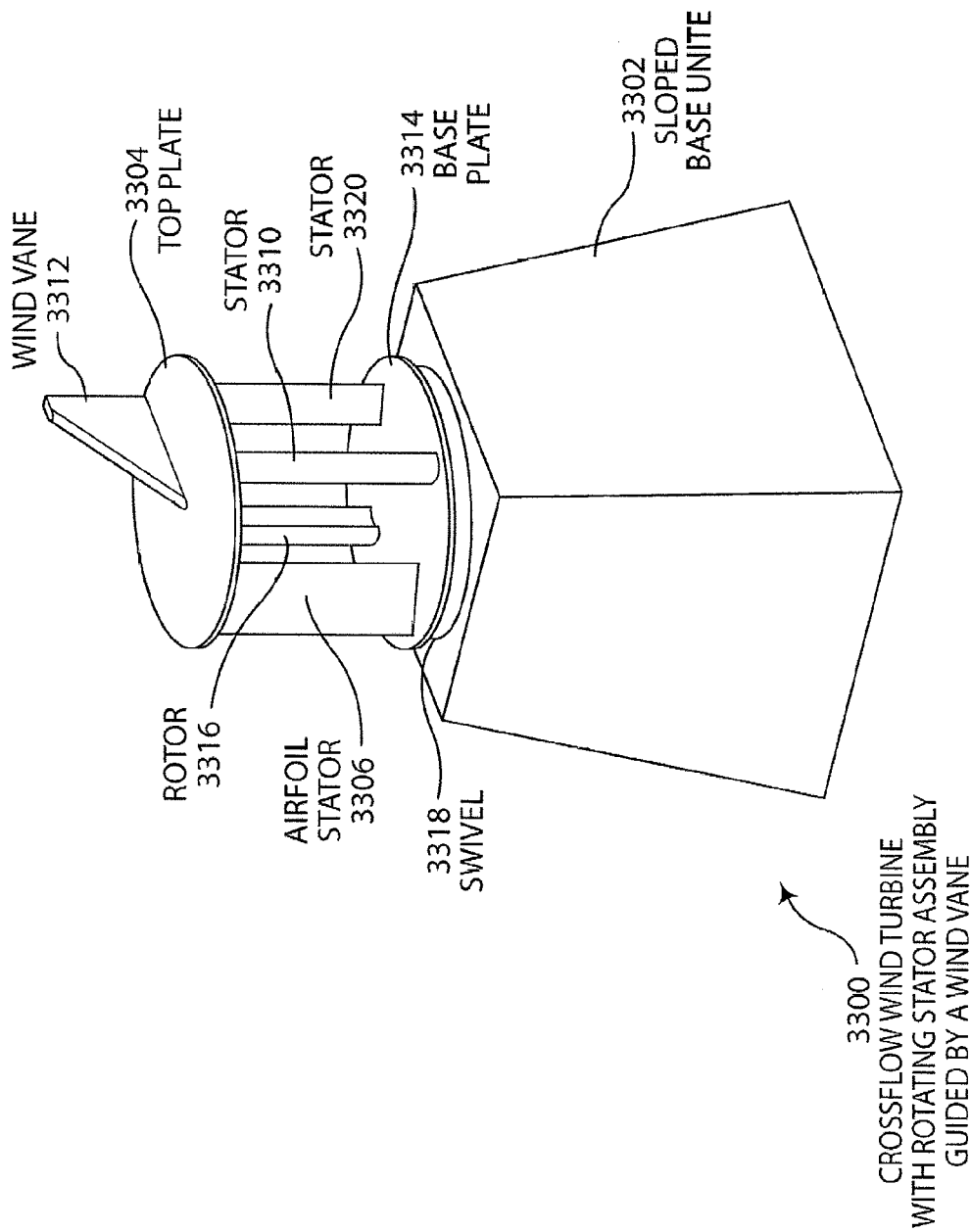
FIG. 33 is a schematic illustration of a cross-flow wind turbine with a rotating stator assembly guided by a wind vane.

FIG. 33 is a schematic illustration of an embodiment of a cross-flow wind turbine with a rotating stator assembly that is guided by a wind vane 3312. The rotating stator assembly includes a top plate 3304 and a base plate 3314. Stators 3306, 3310 and 3320 are attached to both the top plate 3304 and the base plate 3314. Swivel 3318 is connected to both the base plate 3314 and the sloped base unit 3302. Swivel 3318 allows the stator assembly, including the top plate 3304, stators 3306, 3310 and 3320 to rotate to a position relative to the wind in response to forces generated by wind vane 3312. In this manner, the cross-flow wind turbine 3300 will always be facing in the optimal direction for operation and will maximize the output of the cross-flow wind turbine 3300 for all wind directions.

Figure 34:
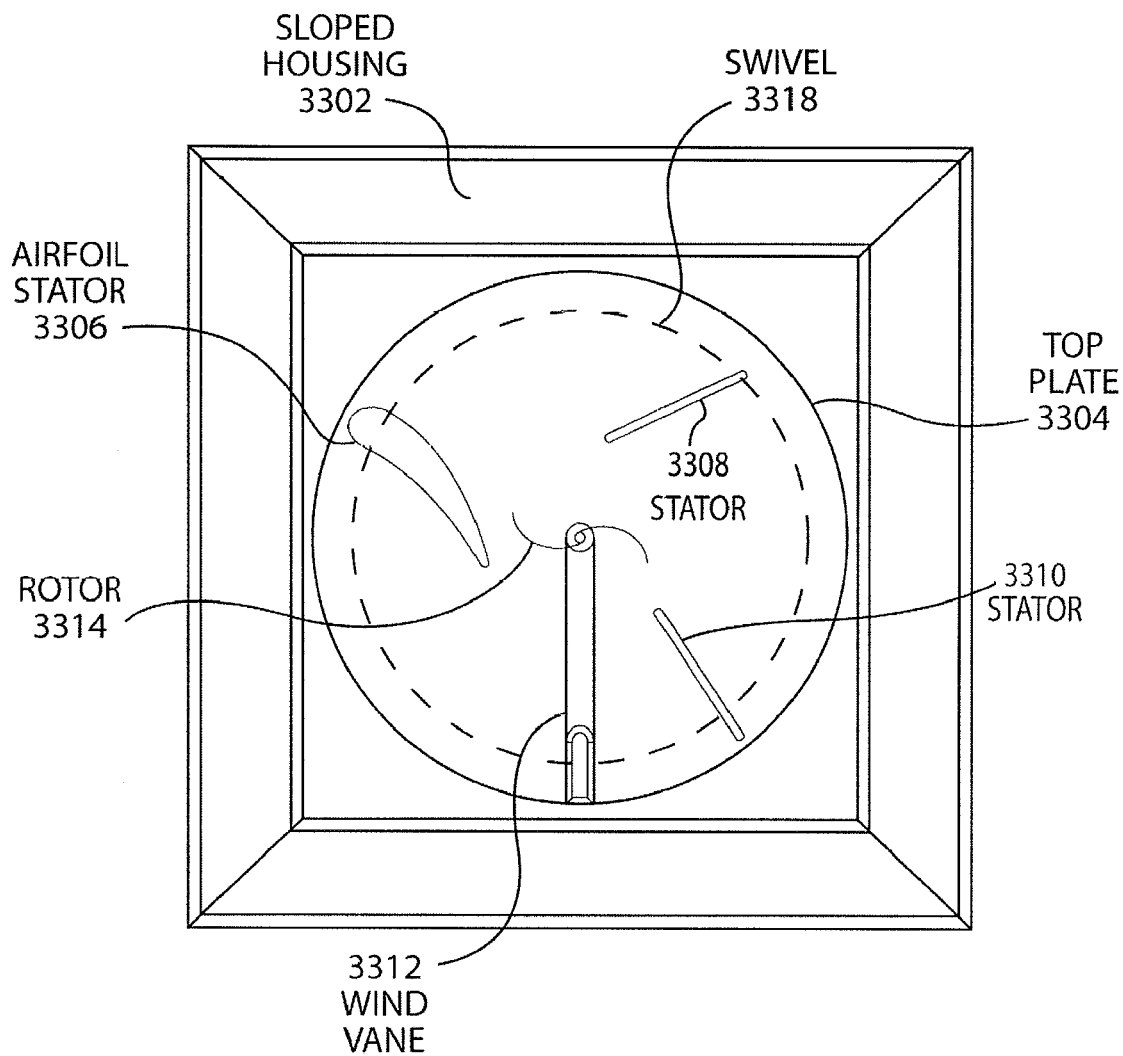
FIG. 34 is a top view of the embodiment illustrated in FIG. 33.

FIG. 34 is a top view of the embodiment of FIG. 33. As illustrated in FIG. 34, the sloped housing 3302 holds the cross-flow wind turbine assembly. Swivel 3318 is mounted to the top of the sloped housing 3302 and to the base plate 3314 (FIG. 33). FIG. 34 also illustrates the rotor 3314, airfoil stabilizer 3316, stator 3308, stator 3310 and the wind vane 3312. The wind vane 3312 positions the cross-flow wind turbine in a direction so that the wind flows in an optimal direction into the cross-flow wind turbine.

Figure 35:
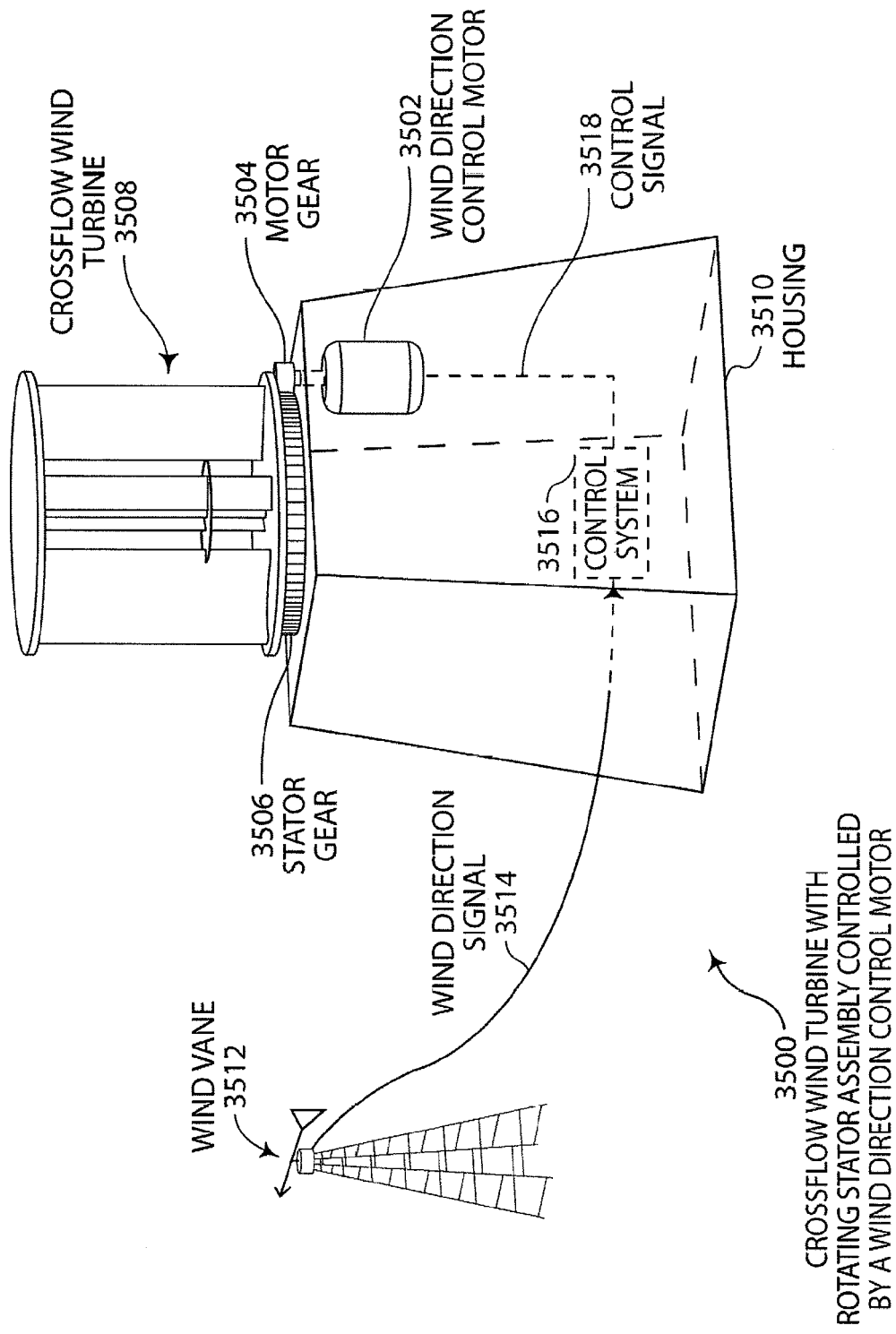
FIG. 35 is a schematic illustration of a cross-flow wind turbine with a rotating stator assembly that is controlled by a wind direction control motor.

FIG. 35 is a schematic illustration of a cross-flow wind turbine with a rotating stator assembly that is controlled by a wind direction control motor. As shown in FIG. 35, a cross-flow wind turbine 3508 is mounted on top of a housing 3510.

The cross-flow wind turbine can be rotated to different angular positions using a stator gear 3506 that is coupled to a motor gear 3504 that moves in response to a wind direction control motor 3502. The stator gear 3506 is coupled to the stator assembly of the cross-flow wind turbine 3508 and allows rotation of the cross-flow wind turbine 3508 to any desired angular rotational position on the top of housing 3510. Wind vane 3512 detects the direction of the wind and produces a wind direction signal 3514 that is transmitted to a control system 3516. The control system 3516 generates a control signal 3518 that is applied to the wind direction control motor 3502 to cause the wind direction control motor 3502 to rotate the motor gear 3504 to locate the cross-flow wind turbine 3508 to the desired angular position. The control system 3516 detects the wind direction from wind direction signal 3514 and compares the wind direction to the position of the stator assembly. This can be done by determining the count stored for the wind direction control motor 3502 if a stepper motor is used. In that case, control signal 3518 is generated by the control system 3516 to cause the wind direction control motor 3502 to move the proper number of steps to align the cross-flow wind turbine 3508 in the proper direction.

The embodiments illustrated in FIGS. 33, 34 and 35 may be integrated into the structure of the roof of a house or building, which has several advantages. First, the cost of the integrated power plant can be reduced by using the structure of the building. Secondly, the sloped features of the roof can be utilized to enhance airflow into the device.

Figure 36:
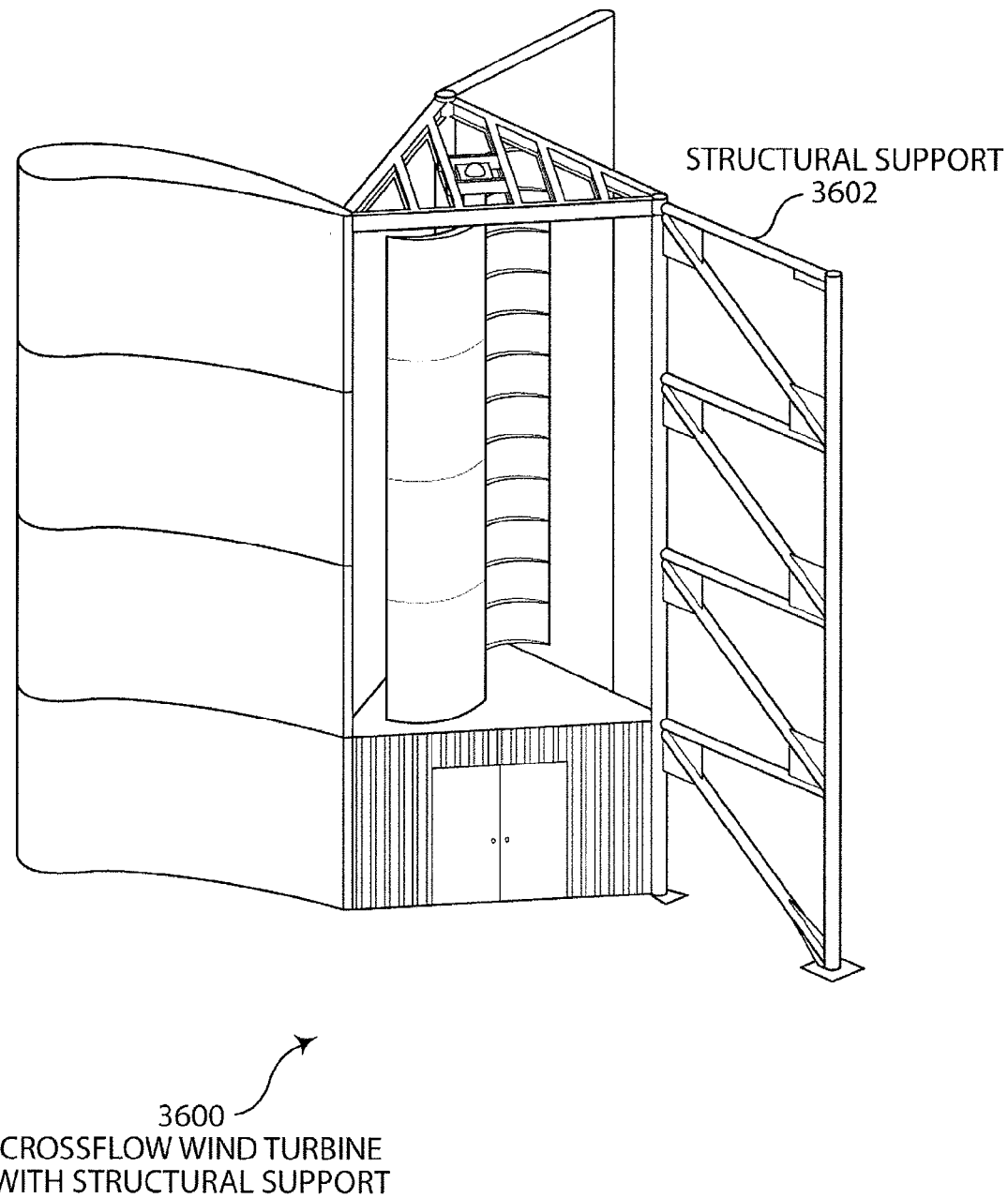
FIG. 36 is a schematic illustration of a cross-flow wind turbine that uses a structural support.

FIG. 36 is a schematic illustration of a cross-flow wind turbine with a structural support. Structural support 3502 provides structural stability for the cross-flow wind turbine structure. The structural support 3602 may replace a stator without substantially reducing the efficiency of the cross-flow wind turbine 3600. Hence, cost savings may be provided by simply building a structural support 3602, rather than building a complete stator assembly.

Figure 37:
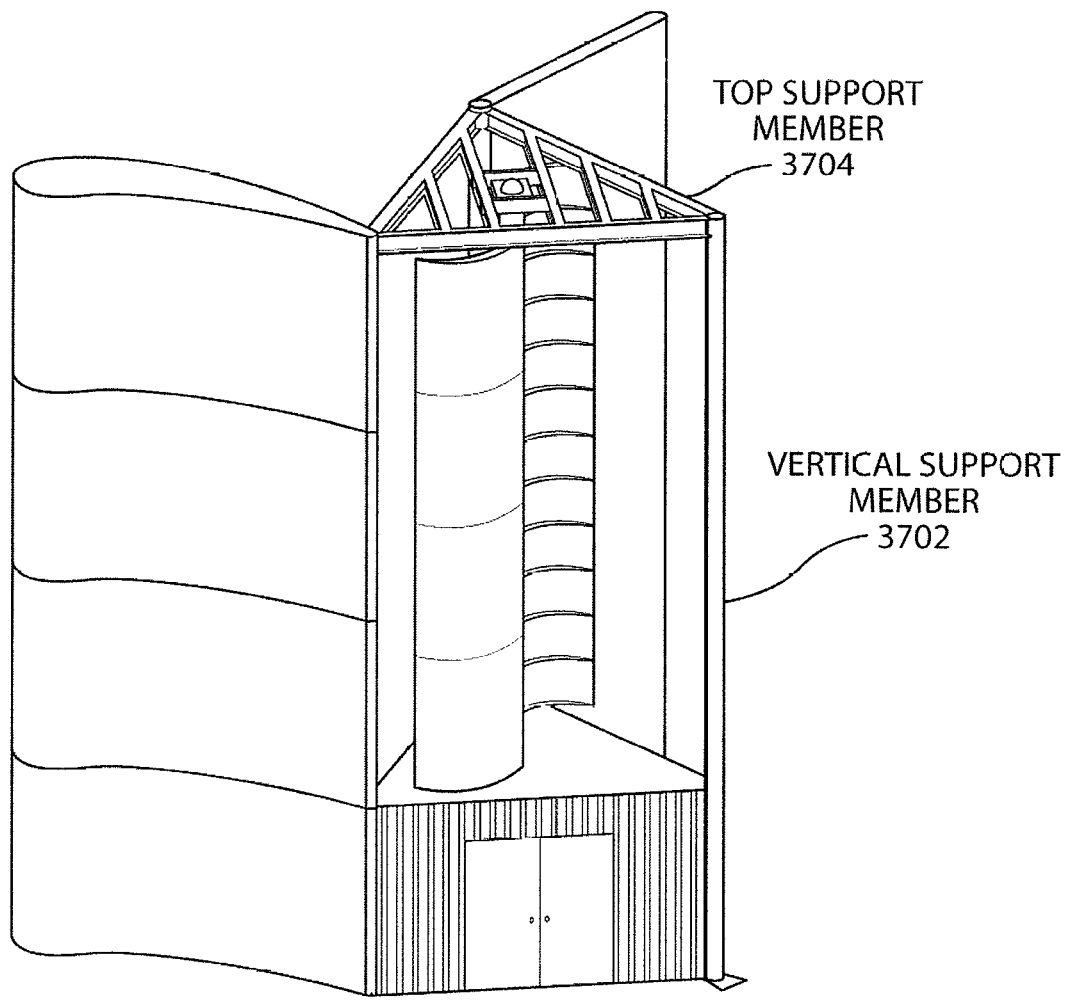
FIG. 37 is an illustration of a cross-flow wind turbine having two stators.

FIG. 37 illustrates a cross-flow wind turbine 3700 with two stators. As disclosed above, removal of the third stator may not significantly reduce the overall efficiency of the system. Hence, a vertical support member 3702 can be connected to the top support member 3704 to provide structural support so that the third stator can be removed to reduce the overall cost of the system.

Figure 38:
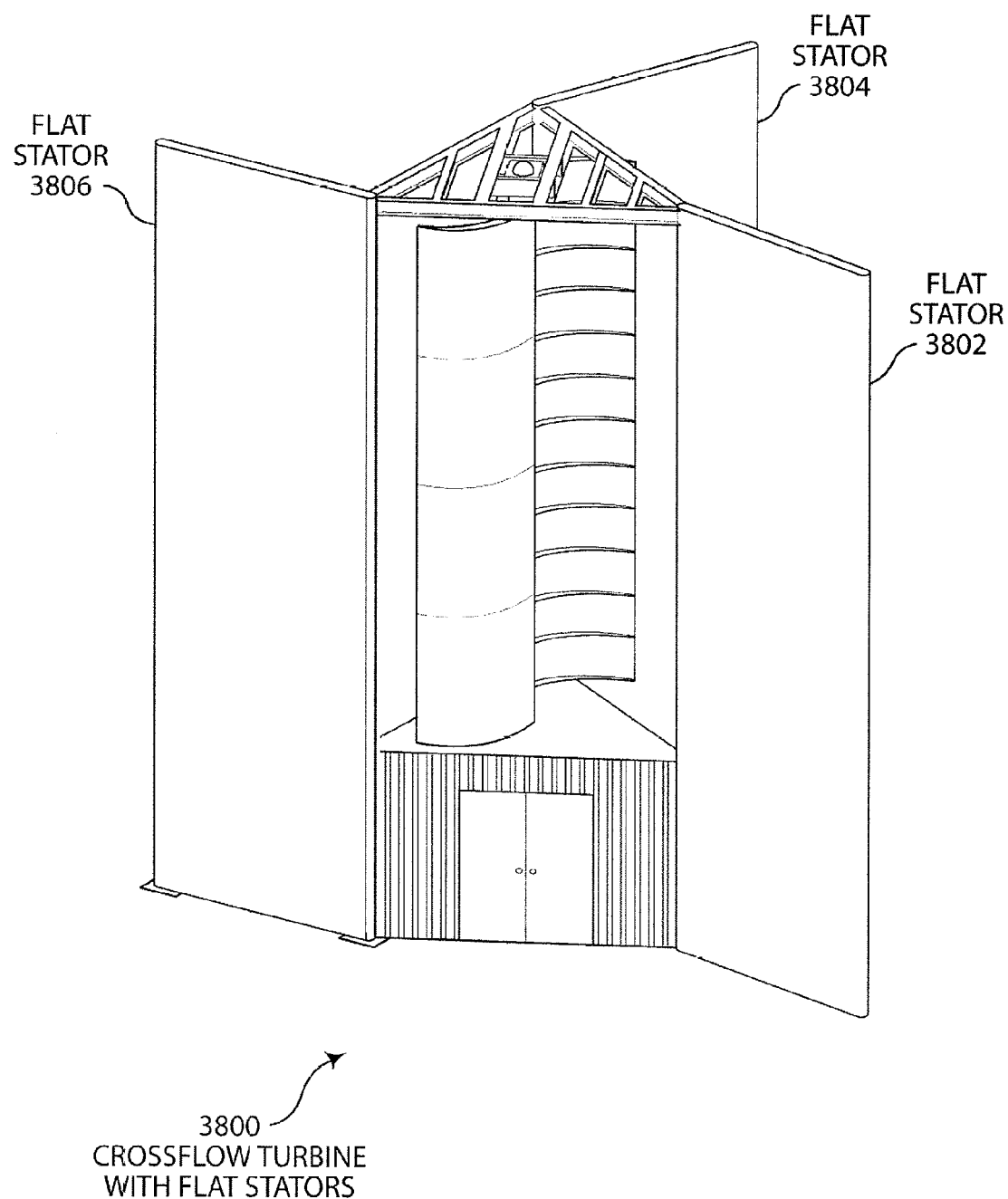
FIG. 38 is an illustration of a cross-flow wind turbine that uses flat stators.

FIG. 38 illustrates another embodiment of a cross-flow turbine 3800 that has flat stators. As shown in FIG. 38, flat stators 3802, 3804 and 3806 are disposed on the exterior portions of the cross-flow turbine 3800 to direct the flow of gases or liquids to the drive portion of the rotor and away from the return portion of the rotor, as described above. The cross-flow turbine 3800 illustrated in FIG. 38 has less efficiency than cross-flow wind turbines that use an airfoil as a stator. Airfoil stators operate by compressing gases to increase the flow and create a vacuum that pulls the rotor along its path during the power stroke, as described above. Since fluids are not compressible, airfoil stators have no effect on liquids and are not useful with liquids. Hence, the cross-flow turbine 3800 illustrated in FIG. 38 can be used for any type of gaseous flow or liquid flow, such as in streams and rivers, or ocean currents.

Figure 39:
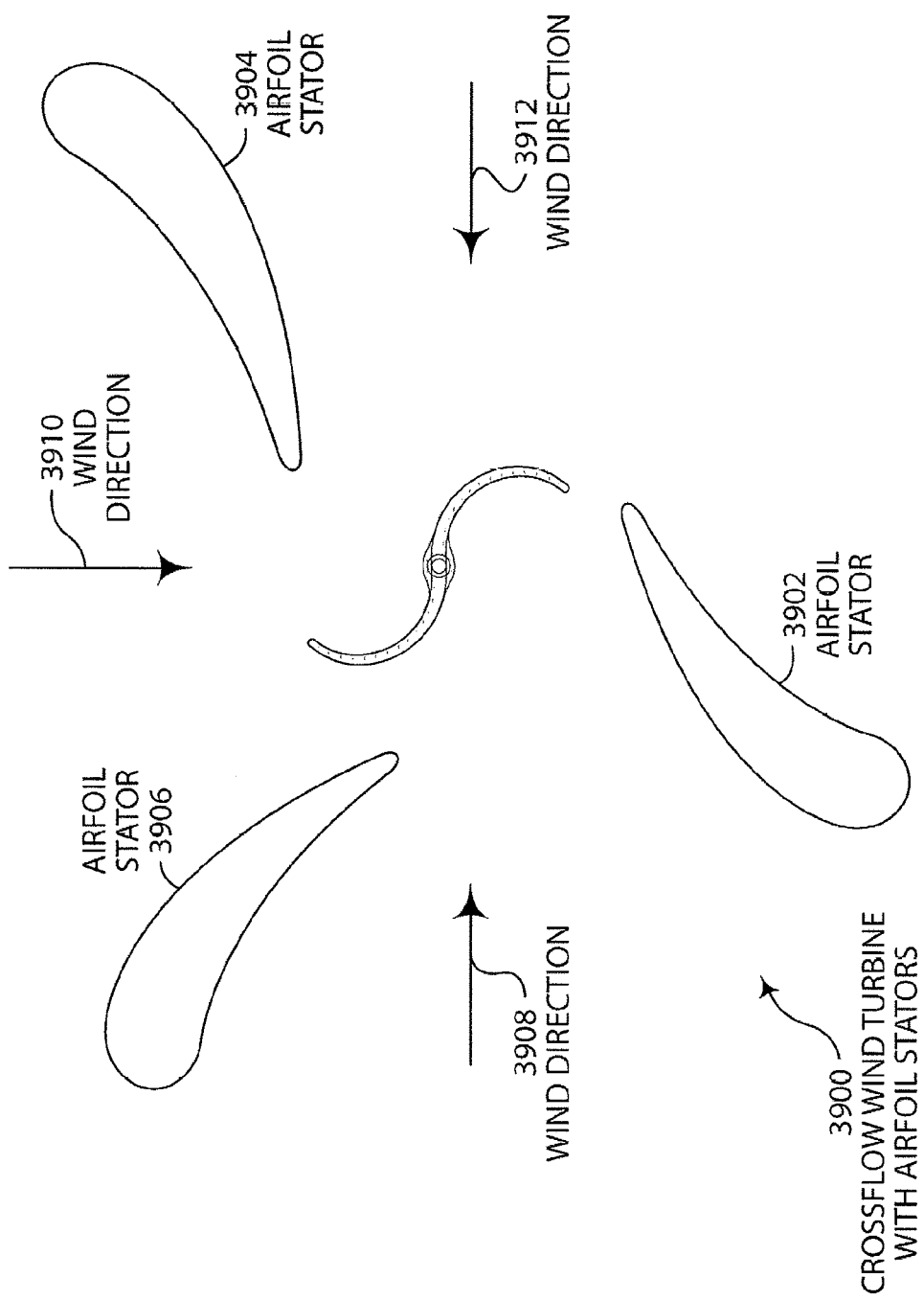
FIG. 39 is a top schematic illustration of a cross-flow wind turbine that uses airfoil stators.

FIG. 39 is an illustration of a cross-flow wind turbine 3900 that has three airfoil stators 3902, 3904 and 3906. The arrangement of the airfoil stators 3902, 3904 and 3906 allows for the efficient utilization of wind energy from wind directions 3908, 3910 and 3912. As indicated above, wind energy in many geographical locations comes primarily from a single direction, such as wind direction 3908. However, in the non-windy season, wind may come from a direction that is 90 degrees different from the primary wind direction, such as wind direction 3910, or, in many cases, from an opposite direction, such as wind direction 3912. In those cases, wind during the non-windy season can be efficiently used since airfoil stators 3906, 3904 increase the efficiency of the cross-flow wind turbine 3900 for wind coming from directions 3910 and 3912, respectively.

Figure 40:
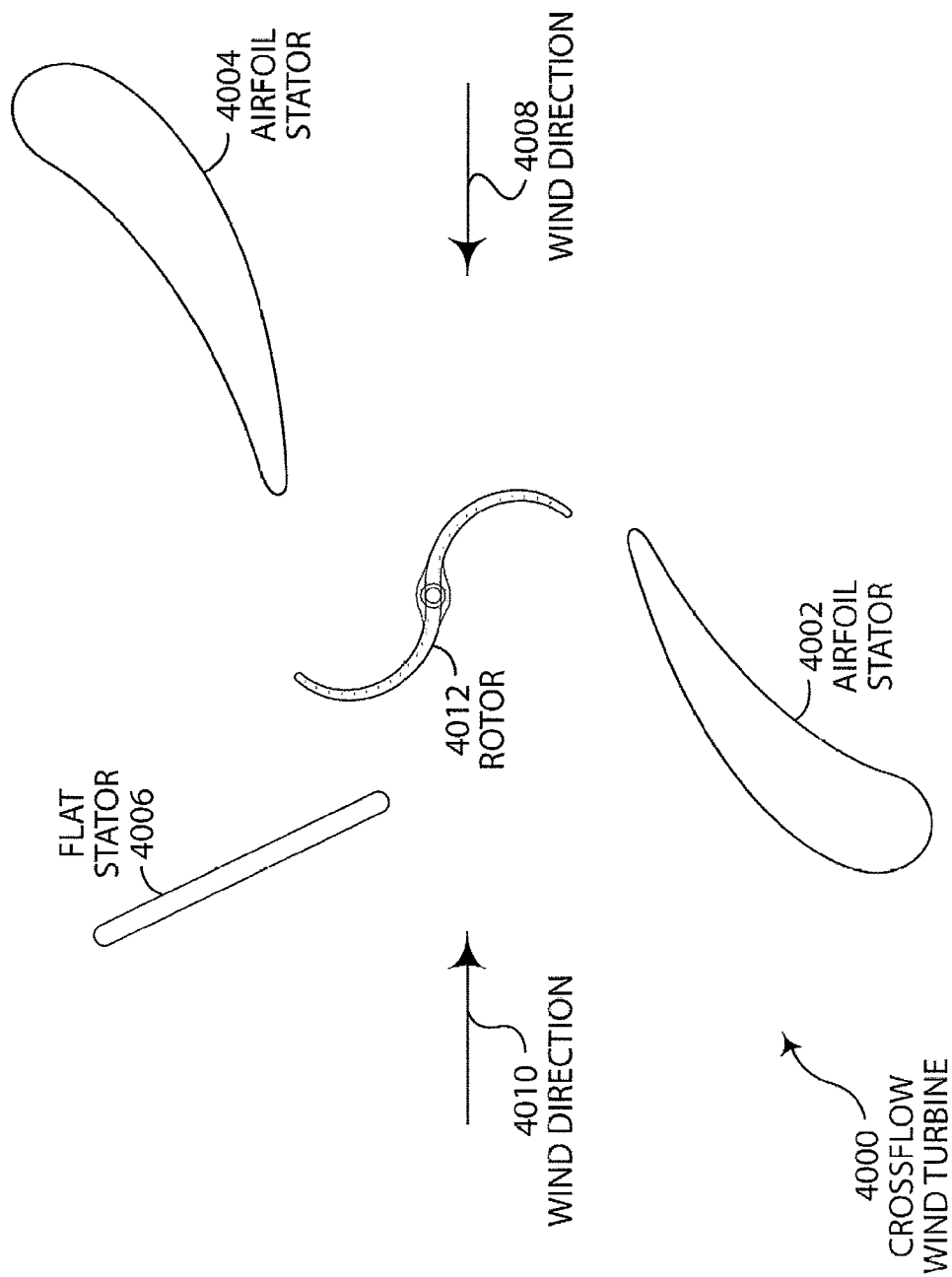
FIG. 40 is an illustration of a cross-flow wind turbine that uses two airfoil stators and a flat stator.

FIG. 40 is a schematic top view of a cross-flow wind turbine 4000 using two airfoil stators 4002, 4004 and a single flat stator 4006. In this instance, the primary wind direction may be wind direction 4010 and a secondary wind direction may be from wind direction 4008. Wind from the primary direction 4010 operates in a highly efficient manner to rotate the rotor 4012. Wind is accelerated along the front surface of the airfoil stator 4002 to draw the front side of the rotor 4012 through the power stroke. At the same time, flat stator 4006 blocks wind from the rotor 4012 during the return portion and causes that wind to be directed onto the trailing surface of the rotor 4012 during the power stroke. As described above, a very efficient system is provided. During the off season, when the wind flows from direction 4008, airfoil stator 4004 causes wind to accelerate along the front surface of the airfoil stator 4004 and create a low pressure behind the rotor blade 4012 as it passes adjacent to the airfoil stator 4004. Hence, wind from wind direction 4008 causes the cross-flow wind turbine 4000 to operate in a more efficient manner.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing and storing energy and water using a renewable energy integrated power plant comprising:
    providing a cross-flow wind turbine that has an airfoil stator and that generates electrical power and mechanical power in response to wind energy;
    providing solar cells that are mounted on said airfoil stator that generate electrical power;
    using said electrical power in local electrical devices;
    using said electrical power to desalinate and purify water so as to provide a source of purified drinking water; and
    storing said purified drinking water in a tank in said airfoil stator.

2. The method of claim 1 further comprising:
    storing electrical power in batteries for later use;
    using said electrical power to perform electrolysis to generate hydrogen and oxygen; and
    using said hydrogen and oxygen in a fuel cell to generate electrical power to supplement and replace electrical power from said cross-flow wind turbine, said solar cells and said batteries.

3. The method of claim 1 further comprising:
    using mechanical energy from said wind turbine to pump water to a higher elevation; and
    using said water that is pumped to a higher elevation to operate a water turbine.

4. The method of claim 1 further comprising:
providing an auxiliary generator to provide auxiliary power for said integrated power plant.

5. The method of claim 3 further comprising:
providing an auxiliary generator to provide auxiliary power for said integrated power plant.

6. The method of claim 4 further comprising:
using a diesel engine to operate said auxiliary generator.

7. The method of claim 4 further comprising:
using a hydrogen engine to operate said auxiliary generator using said hydrogen generated by said renewable energy integrated power plant.

8. The method of claim 5 further comprising:
using a water turbine that is driven by said water that is pumped to a higher elevation to operate said auxiliary generator.

9. The method of claim 4 further comprising:
using a propane engine to operate said auxiliary generator.

10. The method of claim 4 further comprising:
using a natural gas engine to operate said auxiliary generator.

11. The method of claim 4 further comprising:
using a biofuel engine to operate said auxiliary generator.

12. The method of claim 2 further comprising:
storing said oxygen in portable tanks for transport to other locations.

13. The method of claim 2 further comprising:
storing said hydrogen in portable tanks for transport to other locations.

14. The method of claim 2 further comprising:
dispensing said hydrogen to hydrogen vehicles at said renewable energy integrated power plant.

15. The method of claim 2 further comprising:
placing said hydrogen in a hydrogen pipeline for dispensing said hydrogen to hydrogen vehicles at a location other than said renewable energy integrated power plant.

16. The method of claim 4 further comprising:
storing fuel for said auxiliary generator in a tank formed in said airfoil stator.

17. A renewable energy integrated power plant that provides electrical energy and that generates and stores purified water comprising:
a cross-flow wind turbine that uses an airfoil stator and generates electrical power;
solar cells mounted on said cross-flow wind turbine that generate electrical power;
a desalinator that desalinates and purifies saltwater and brackish water and generates purified drinking water in response to said electrical power; and
a water storage tank formed in said airfoil stator that stores said purified drinking water.

18. The power plant of claim 17 further comprising:
batteries that store excess electric power for latter use; and
an electrolysis device that uses said electrical power from said cross-flow wind turbine and said solar cells to generate hydrogen and oxygen.

19. The power plant of claim 18 further comprising:
a fuel cell that uses said hydrogen and said oxygen to generate electrical power to supplement and replace electrical power from said cross-flow wind turbine and said solar cells whenever said electrical power from said wind turbine and said solar cells are insufficient.

20. The power plant of claim 17 further comprising:
mechanical pumps that are mechanically coupled to said cross-flow wind turbine that use mechanical energy to pump water to a higher elevation; and
a water turbine that operates in response to said water.

21. The power plant of claim 18 further comprising:
an auxiliary generator that generates auxiliary electrical power for said renewable energy integrated power plant.

22. The power plant of claim 21 further comprising:
a hydrogen engine that is coupled to and operates said auxiliary generator using hydrogen generated by said electrolysis device.

23. The power plant of claim 21 further comprising:
a diesel engine that is coupled to and operates said auxiliary generator using diesel fuel stored in a tank formed in said airfoil stator.

24. The power plant of claim 21 further comprising:
a propane engine that is coupled to and operates said auxiliary generator using propane fuel stored in a tank formed in said airfoil stator.

25. The power plant of claim 17 further comprising:
advertising displays placed on said airfoil stator that provide advertising that is visible to the public.

* * * * *